US012619647B2

(12) United States Patent
Neervannan et al.

(10) Patent No.: US 12,619,647 B2
(45) Date of Patent: May 5, 2026

(54) SYSTEMS AND METHODS FOR SEARCHING AND SUMMARIZING FINANCIAL RELATED DOCUMENTS, AND USER INTERFACE FOR DISPLAYING THE SAME

(71) Applicant: AlphaSense, Inc., New York, NY (US)

(72) Inventors: Rajmohan Neervannan, Irvine, CA (US); Jaakko Kokko, Espoo (FI); Chris Ackerson, New York, NY (US); Stephen Lynch, Longmeadow, MA (US)

(73) Assignee: AlphaSense, Inc., New York, NY (US)

( * ) Notice: Subject to any disclaimer, the term of this patent is extended or adjusted under 35 U.S.C. 154(b) by 0 days.

(21) Appl. No.: 18/807,572

(22) Filed: Aug. 16, 2024

(65) Prior Publication Data

US 2025/0061141 A1     Feb. 20, 2025

Related U.S. Application Data

(60) Provisional application No. 63/673,868, filed on Jul. 22, 2024, provisional application No. 63/520,505, filed on Aug. 18, 2023.

(51) Int. Cl.
| | |
|---|---|
| *G06F 16/00* | (2019.01) |
| *G06F 16/334* | (2025.01) |
| *G06F 16/34* | (2019.01) |
| *G06F 16/38* | (2019.01) |
| *G06Q 10/0639* | (2023.01) |

(52) U.S. Cl.
CPC ........ *G06F 16/345* (2019.01); *G06F 16/3344* (2019.01); *G06F 16/382* (2019.01); *G06Q 10/06393* (2013.01)

(58) Field of Classification Search
CPC .. G06F 16/345; G06F 16/3344; G06F 16/382; G06Q 10/06393
USPC ......................................................... 707/722
See application file for complete search history.

(56) References Cited

U.S. PATENT DOCUMENTS

| | | | | |
|---|---|---|---|---|
| 11,216,164 | B1 * | 1/2022 | Neervannan ........... | G06N 20/00 |
| 2019/0050478 | A1 * | 2/2019 | Byron ..................... | G06F 16/35 |
| 2021/0286832 | A1 * | 9/2021 | Prasad Tanniru ........ | G06N 5/02 |
| 2022/0092099 | A1 * | 3/2022 | Bae ..................... | G06F 16/3344 |
| 2023/0136861 | A1 * | 5/2023 | Tunstall-Pedoe ....... | G10L 15/16 704/9 |

(Continued)

FOREIGN PATENT DOCUMENTS

WO     WO-2023080425 A1 *   5/2023   ....... G06F 16/24522

*Primary Examiner* — Monica M Pyo
(74) *Attorney, Agent, or Firm* — NK Patent Law

(57)          ABSTRACT

Systems and methods for searching, summarizing, and automating workflows for financial related documents, and a user interface for displaying the same, are disclosed. The summaries are generated in response to a user query or through natural-language, conversational chat, and they provide the user with underlying supporting documentation to allow the user to follow-up and/or confirm as necessary. An AI-powered document search is performed to identify relevant documents and relevant snippets within the documents. The relevant snippets and/or documents are then summarized by one or more AI models. The models use metadata associated with the documents from the document search to rank the snippets for summarization. AI agents further automate the workflow.

18 Claims, 66 Drawing Sheets

(56)                  References Cited

U.S. PATENT DOCUMENTS

| 2023/0273944 A1* | 8/2023 | Rajakaruna | ......... | G06F 16/3329 |
| | | | | 707/718 |
| 2024/0311407 A1* | 9/2024 | Barron | ................ | G06F 16/3344 |
| 2025/0005050 A1* | 1/2025 | Krishnan | .............. | G06F 16/243 |

* cited by examiner

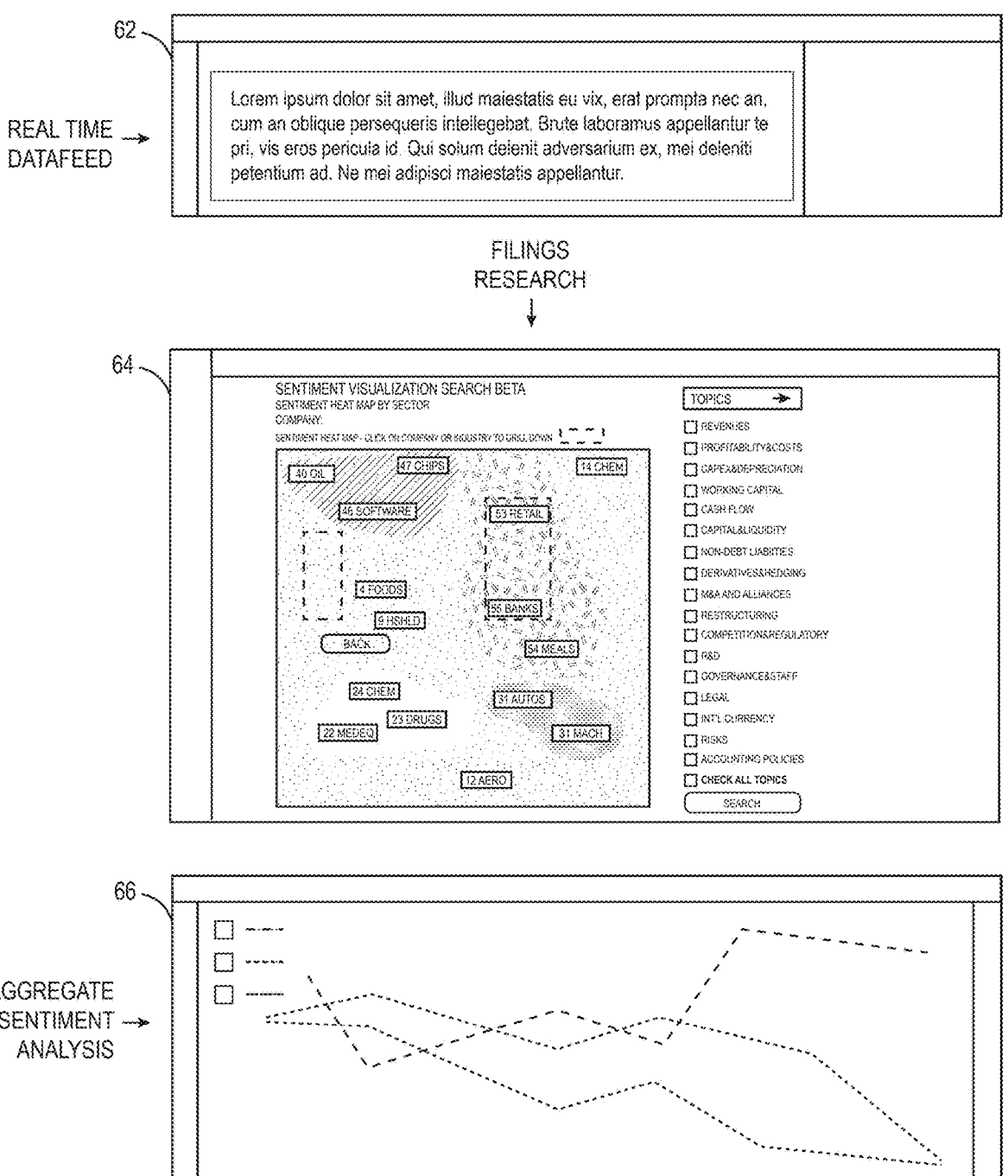

REAL TIME
DATAFEED →

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Ne mei adipisci maiestatis appellantur.

FILINGS
RESEARCH

SENTIMENT VISUALIZATION SEARCH BETA
SENTIMENT HEAT MAP BY SECTOR
COMPANY:
SENTIMENT HEAT MAP - CLICK ON COMPANY OR INDUSTRY TO DRILL DOWN

40 OIL    47 CHIPS    14 CHEM
46 SOFTWARE    53 RETAIL
4 FOODS    55 BANKS
9 HSHLD
BACK    54 MEALS
24 CHEM    31 AUTOS
22 MEDEQ    23 DRUGS    31 MACH
12 AERO

TOPICS →
☐ REVENUES
☐ PROFITABILITY&COSTS
☐ CAPEX&DEPRECIATION
☐ WORKING CAPITAL
☐ CASH FLOW
☐ CAPITAL&LIQUIDITY
☐ NON-DEBT LIABILITIES
☐ DERIVATIVES&HEDGING
☑ M&A AND ALLIANCES
☐ RESTRUCTURING
☐ COMPETITION®ULATORY
☐ R&D
☐ GOVERNANCE&STAFF
☐ LEGAL
☐ INT'L CURRENCY
☐ RISKS
☐ ACCOUNTING POLICIES
☐ CHECK ALL TOPICS
SEARCH

AGGREGATE
SENTIMENT →
ANALYSIS
☐ ─────
☐ ─────
☐ ─────

FIG. 3

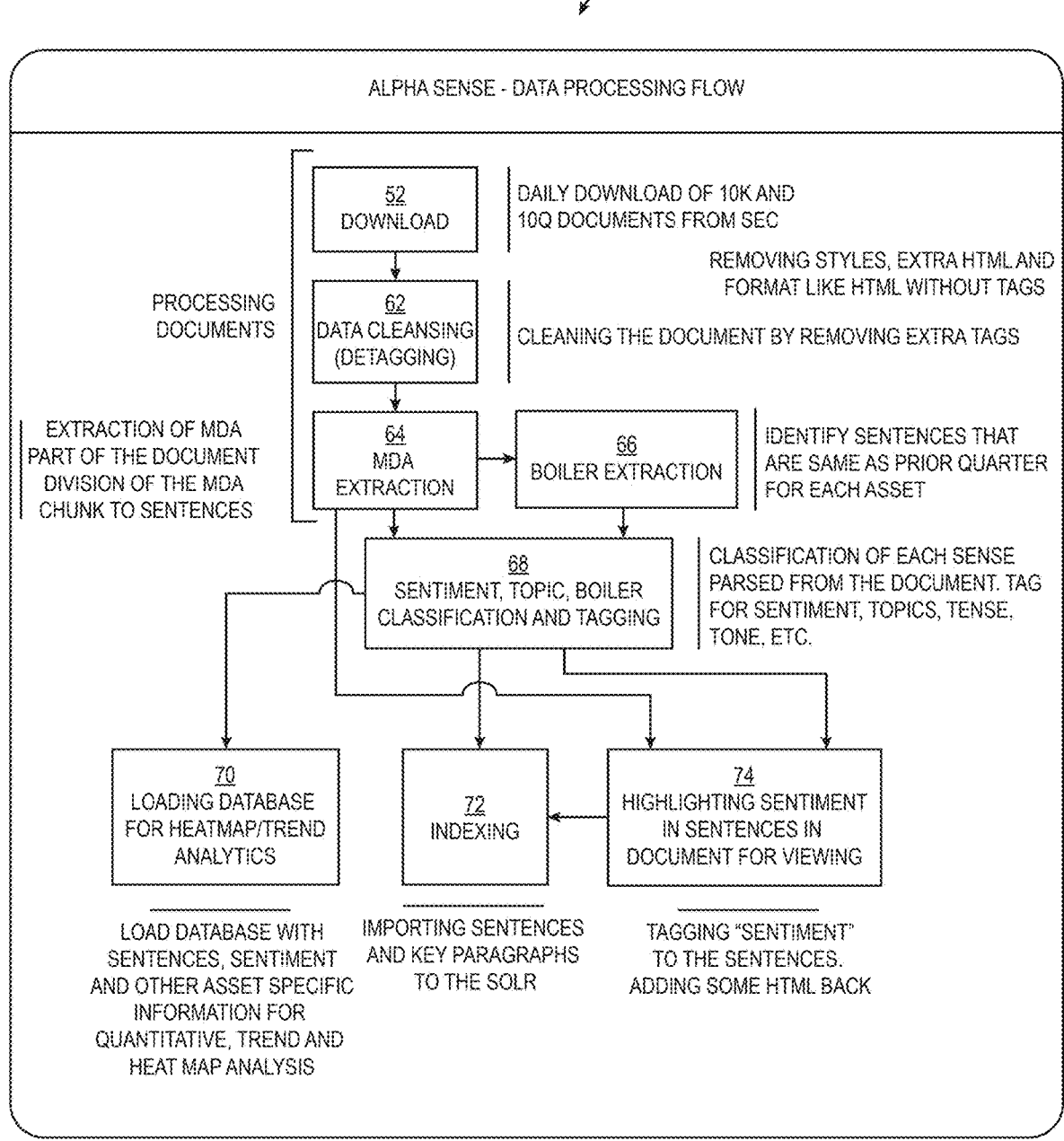

50

ALPHA SENSE - DATA PROCESSING FLOW

PROCESSING
DOCUMENTS

52
DOWNLOAD

DAILY DOWNLOAD OF 10K AND
10Q DOCUMENTS FROM SEC

REMOVING STYLES, EXTRA HTML AND
FORMAT LIKE HTML WITHOUT TAGS

62
DATA CLEANSING
(DETAGGING)

CLEANING THE DOCUMENT BY REMOVING EXTRA TAGS

EXTRACTION OF MDA
PART OF THE DOCUMENT
DIVISION OF THE MDA
CHUNK TO SENTENCES

64
MDA
EXTRACTION

66
BOILER EXTRACTION

IDENTIFY SENTENCES THAT
ARE SAME AS PRIOR QUARTER
FOR EACH ASSET

68
SENTIMENT, TOPIC, BOILER
CLASSIFICATION AND TAGGING

CLASSIFICATION OF EACH SENSE
PARSED FROM THE DOCUMENT. TAG
FOR SENTIMENT, TOPICS, TENSE,
TONE, ETC.

70
LOADING DATABASE
FOR HEATMAP/TREND
ANALYTICS

72
INDEXING

74
HIGHLIGHTING SENTIMENT
IN SENTENCES IN
DOCUMENT FOR VIEWING

LOAD DATABASE WITH
SENTENCES, SENTIMENT
AND OTHER ASSET SPECIFIC
INFORMATION FOR
QUANTITATIVE, TREND AND
HEAT MAP ANALYSIS

IMPORTING SENTENCES
AND KEY PARAGRAPHS
TO THE SOLR

TAGGING "SENTIMENT"
TO THE SENTENCES.
ADDING SOME HTML BACK

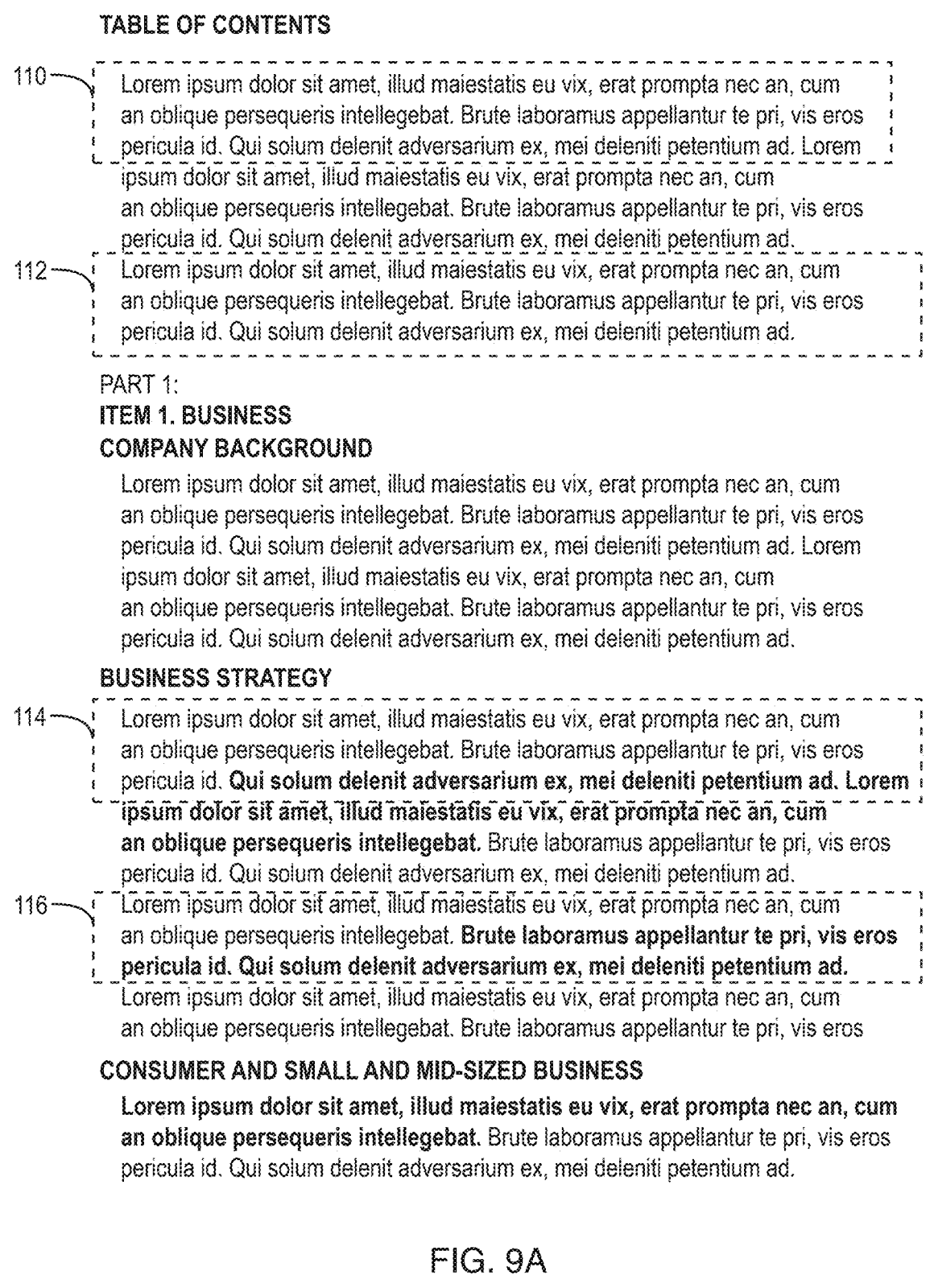

TABLE OF CONTENTS

110 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

112 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

PART 1:

ITEM 1. BUSINESS

COMPANY BACKGROUND

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

BUSINESS STRATEGY

114 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

116 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros

CONSUMER AND SMALL AND MID-SIZED BUSINESS

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

FIG. 9A

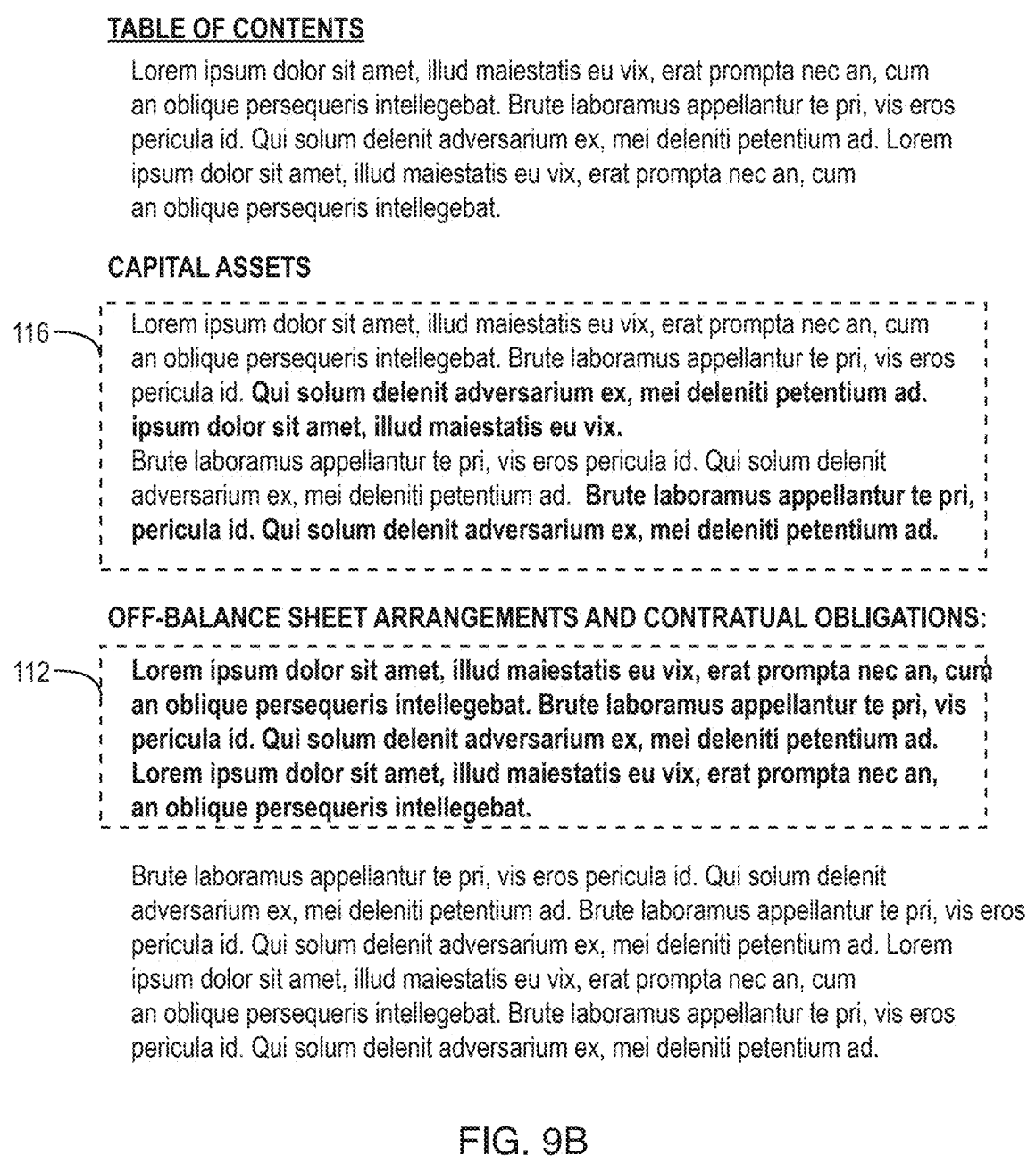

TABLE OF CONTENTS

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat.

CAPITAL ASSETS

116 — Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. ipsum dolor sit amet, illud maiestatis eu vix. Brute laboramus appellantur te pri, vis eros pericula id. Qui solum delenit adversarium ex, mei deleniti petentium ad. Brute laboramus appellantur te pri, pericula id. Qui solum delenit adversarium ex, mei deleniti petentium ad.

OFF-BALANCE SHEET ARRANGEMENTS AND CONTRATUAL OBLIGATIONS:

112 — Lorem ipsum dolor sit amet, illud maiestatis eu vix, erat prompta nec an, cum an oblique persequeris intellegebat. Brute laboramus appellantur te pri, vis pericula id. Qui solum delenit adversarium ex, mei deleniti petentium ad. Lorem ipsum dolor sit amet, illud maiestatis eu vix, erat prompta nec an, an oblique persequeris intellegebat.

Brute laboramus appellantur te pri, vis eros pericula id. Qui solum delenit adversarium ex, mei deleniti petentium ad. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

FIG. 9B

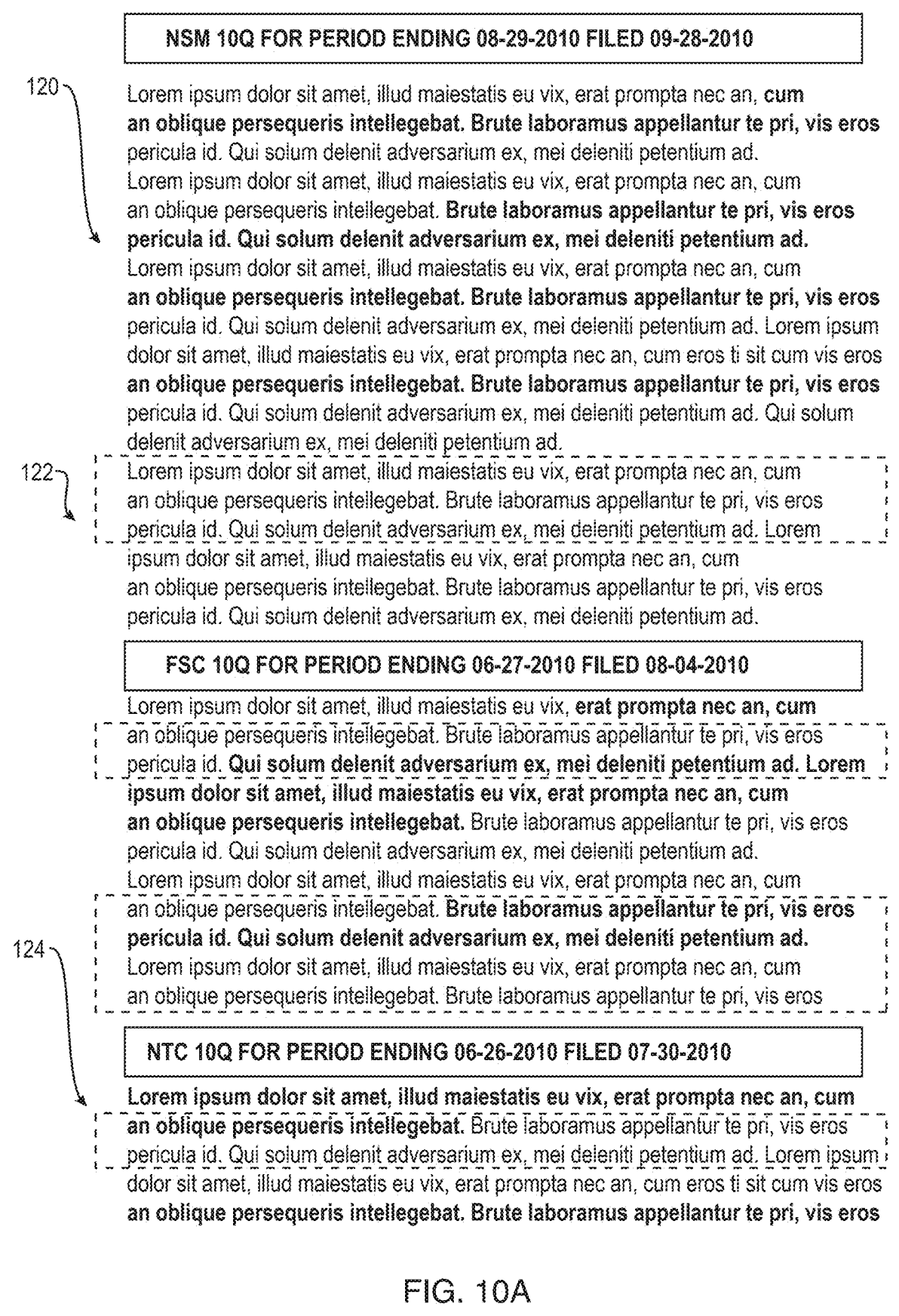

NSM 10Q FOR PERIOD ENDING 08-29-2010 FILED 09-28-2010

120

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum eros ti sit cum vis eros an oblique persequeris intellegebat. Brute laboramus appellantur te pri, vis eros pericula id. Qui solum delenit adversarium ex, mei deleniti petentium ad. Qui solum delenit adversarium ex, mei deleniti petentium ad.

122

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

FSC 10Q FOR PERIOD ENDING 06-27-2010 FILED 08-04-2010

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros

124

NTC 10Q FOR PERIOD ENDING 06-26-2010 FILED 07-30-2010

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum eros ti sit cum vis eros an oblique persequeris intellegebat. Brute laboramus appellantur te pri, vis eros

FIG. 10A

Figure 10B:
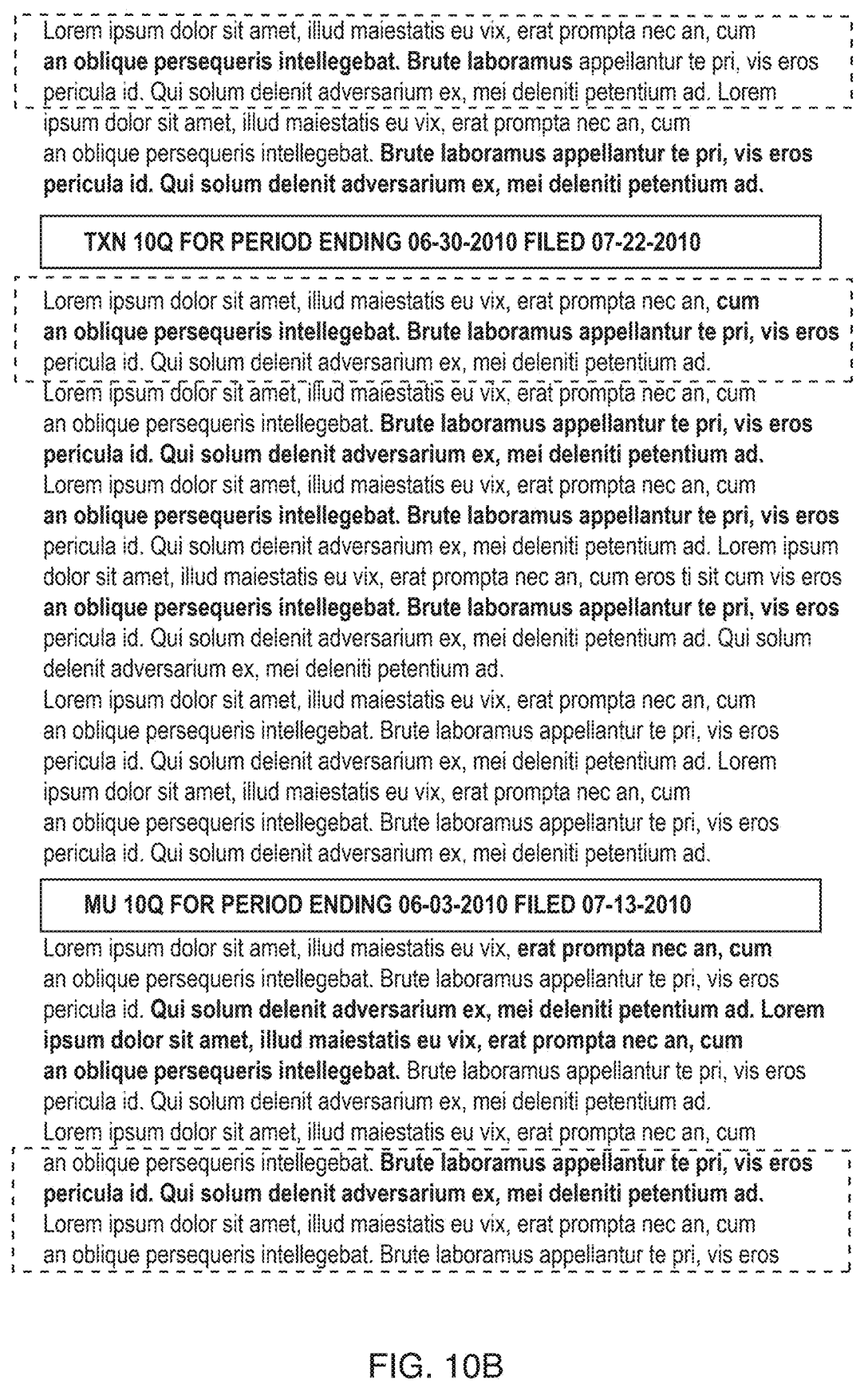

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

TXN 10Q FOR PERIOD ENDING 06-30-2010 FILED 07-22-2010

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum eros ti sit cum vis eros an oblique persequeris intellegebat. Brute laboramus appellantur te pri, vis eros pericula id. Qui solum delenit adversarium ex, mei deleniti petentium ad. Qui solum delenit adversarium ex, mei deleniti petentium ad.

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad.

MU 10Q FOR PERIOD ENDING 06-03-2010 FILED 07-13-2010

Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros pericula id. Qui solum delenit adversarium ex, mei deleniti petentium ad. Lorem ipsum dolor sit amet, illud maiestatis eu vix, erat prompta nec an, cum an oblique persequeris intellegebat. Brute laboramus appellantur te pri, vis eros

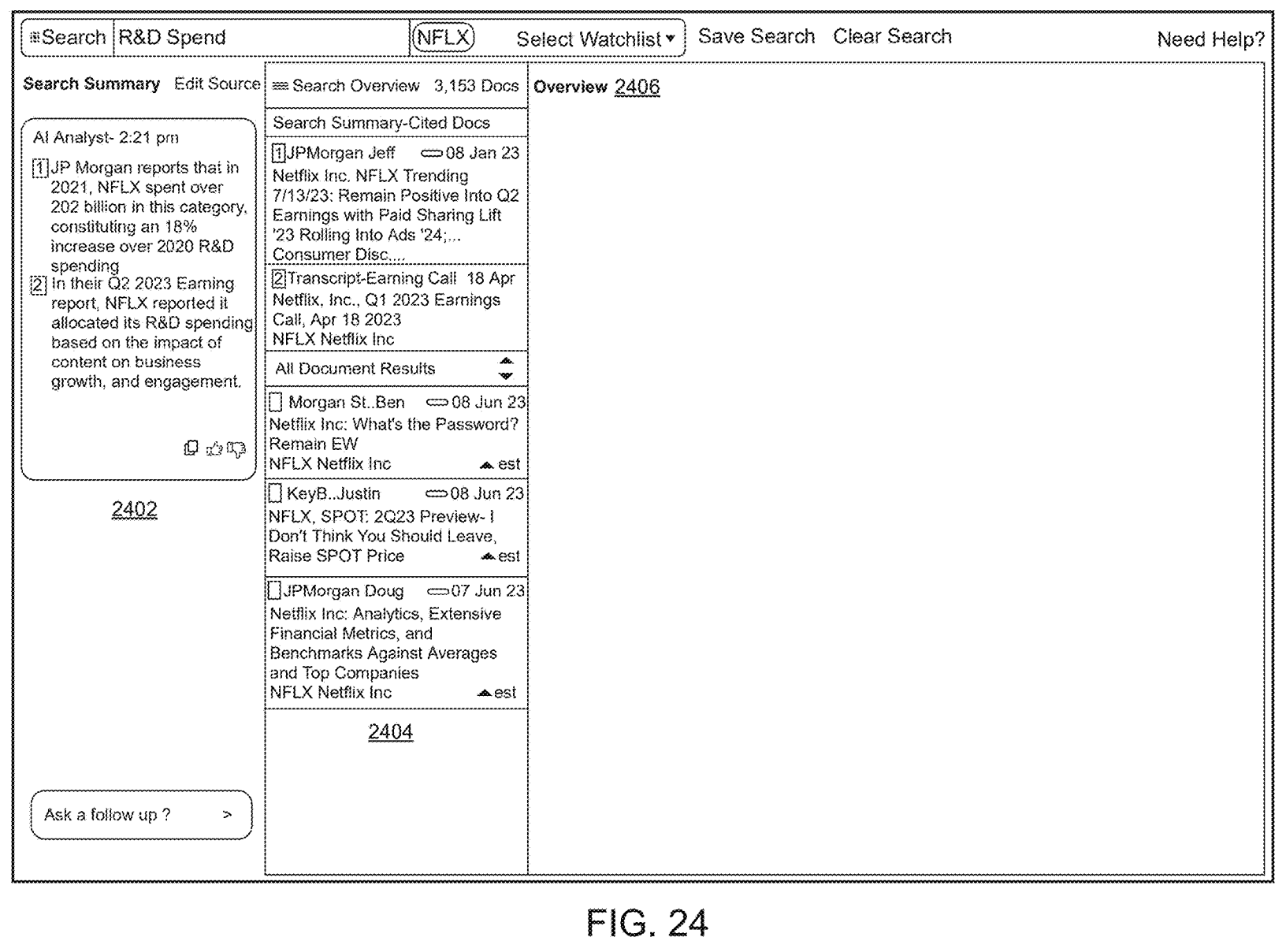

Search | R&D Spend    NFLX    Select Watchlist ▾    Save Search    Clear Search    Need Help?

Search Summary    Edit Source

≡ Search Overview    3,153 Docs    Overview 2406

Search Summary-Cited Docs

AI Analyst- 2:21 pm

[1] JP Morgan reports that in 2021, NFLX spent over 202 billion in this category, constituting an 18% increase over 2020 R&D spending

[2] In their Q2 2023 Earning report, NFLX reported it allocated its R&D spending based on the impact of content on business growth, and engagement.

[1] JPMorgan Jeff    ⇔ 08 Jan 23
Netflix Inc. NFLX Trending
7/13/23: Remain Positive Into Q2
Earnings with Paid Sharing Lift
'23 Rolling Into Ads '24;...
Consumer Disc...

[2] Transcript-Earning Call  18 Apr
Netflix, Inc., Q1 2023 Earnings
Call, Apr 18 2023
NFLX Netflix Inc All Document Results    ◆ ▶

☐ Morgan St..Ben    ⇔ 08 Jun 23
Netflix Inc: What's the Password?
Remain EW
NFLX Netflix Inc    ◀ est ☐ KeyB..Justin    ⇔ 08 Jun 23
NFLX, SPOT: 2Q23 Preview- I
Don't Think You Should Leave,
Raise SPOT Price    ◀ est
NFLX Netflix Inc ☐ JPMorgan Doug    ⇔ 07 Jun 23
Netflix Inc: Analytics, Extensive
Financial Metrics, and
Benchmarks Against Averages
and Top Companies
NFLX Netflix Inc    ◀ est

2402

2404

Ask a follow up ?    ∨

FIG. 24

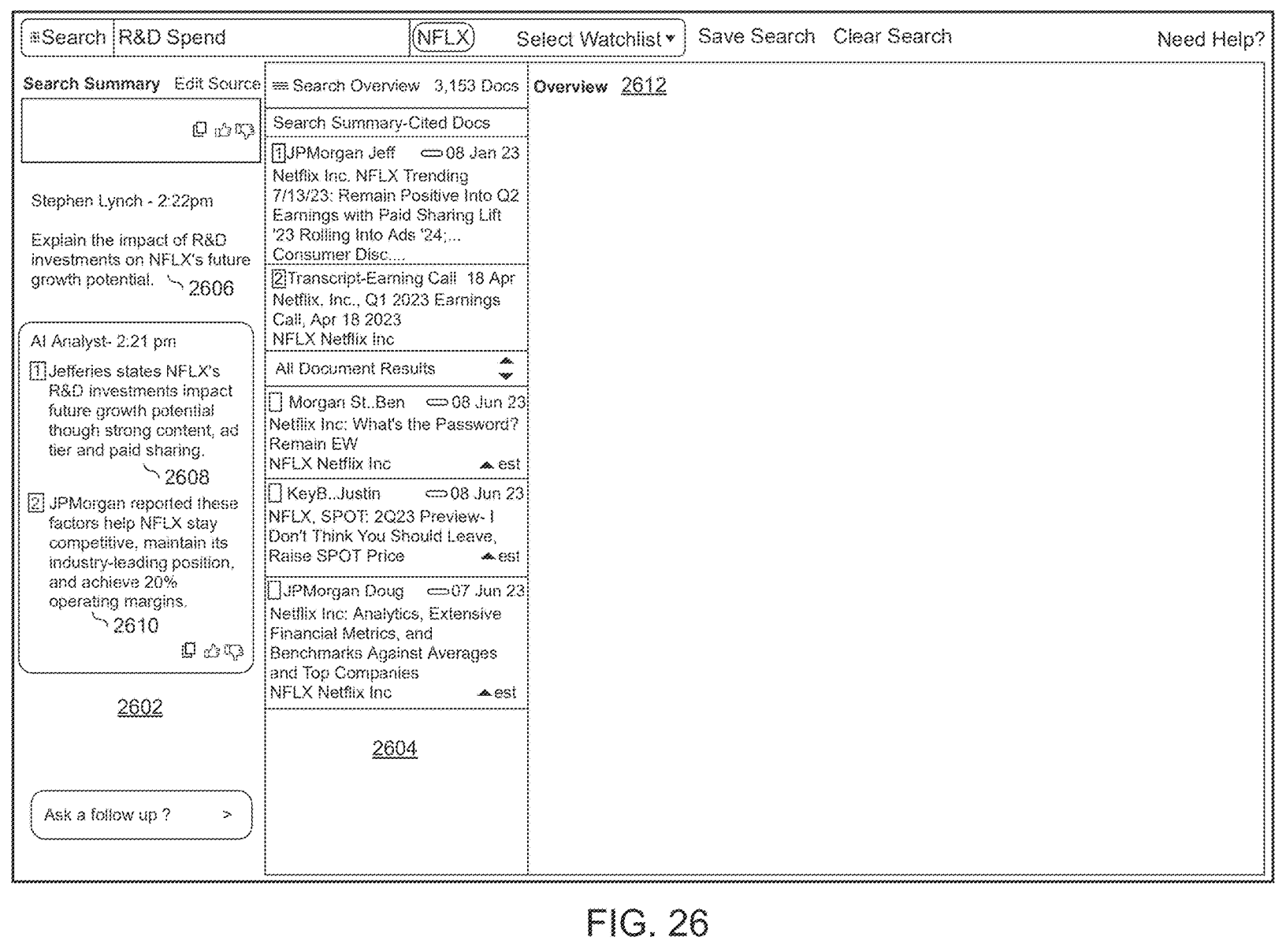

Search | R&D Spend          Select Watchlist ▼   Save Search   Clear Search        Need Help?

Search Summary   Edit Source          (NFLX)

Search Overview   3,153 Docs     Overview  2612

Search Summary-Cited Docs

[1] JPMorgan Jeff  ⊂⇒ 08 Jan 23
Netflix Inc. NFLX Trending
7/13/23: Remain Positive Into Q2
Earnings with Paid Sharing Lift
'23 Rolling Into Ads '24,...
Consumer Disc...

Stephen Lynch - 2:22pm

Explain the impact of R&D
investments on NFLX's future
growth potential.  ⌐ 2606

[2] Transcript-Earning Call  18 Apr
Netflix, Inc., Q1 2023 Earnings
Call, Apr 18 2023
NFLX Netflix Inc AI Analyst- 2:21 pm All Document Results

[1] Jefferies states NFLX's
R&D investments impact
future growth potential
though strong content, ad
tier and paid sharing.
⌐ 2608

[1] Morgan St..Ben  ⊂⇒ 08 Jun 23
Netflix Inc: What's the Password?
Remain EW
NFLX Netflix Inc                     ◀ est

[2] JPMorgan reported these
factors help NFLX stay
competitive, maintain its
industry-leading position,
and achieve 20%
operating margins.
⌐ 2610

[1] KeyB.Justin  ⊂⇒ 08 Jun 23
NFLX, SPOT: 2Q23 Preview- I
Don't Think You Should Leave,
Raise SPOT Price            ◀ est
NFLX Netflix Inc

[1] JPMorgan Doug  ⊂⇒ 07 Jun 23
Netflix Inc: Analytics, Extensive
Financial Metrics, and
Benchmarks Against Averages
and Top Companies
NFLX Netflix Inc            ◀ est

2604

2602

Ask a follow up ?        ∨

FIG. 26

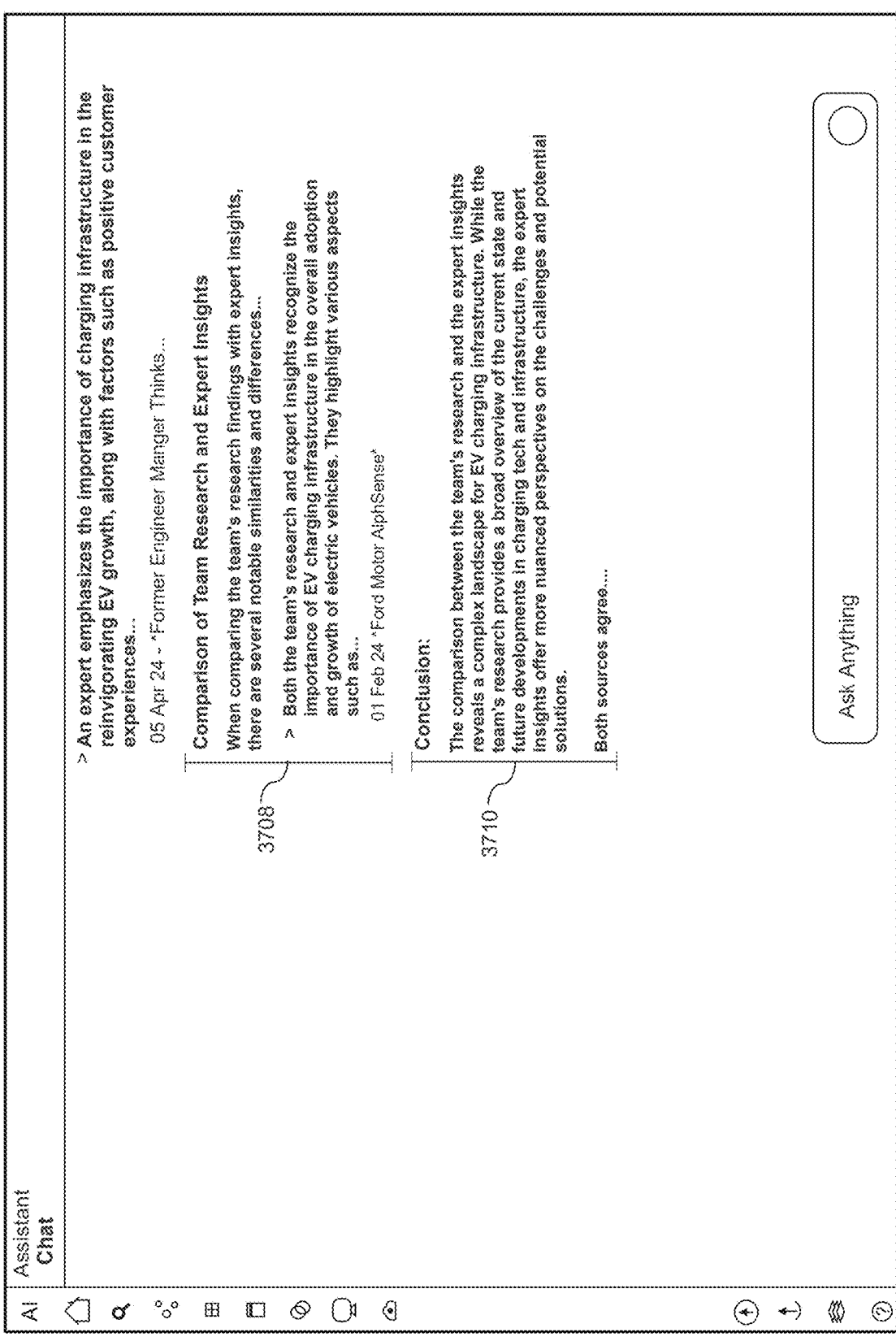

> An expert emphasizes the importance of charging infrastructure in the reinvigorating EV growth, along with factors such as positive customer experiences...

05 Apr 24 - "Former Engineer Manger Thinks...

Comparison of Team Research and Expert Insights

When comparing the team's research findings with expert insights, there are several notable similarities and differences....

> Both the team's research and expert insights recognize the importance of EV charging infrastructure in the overall adoption and growth of electric vehicles. They highlight various aspects such as...

01 Feb 24 "Ford Motor AlphSense"

Conclusion:

The comparison between the team's research and the expert insights reveals a complex landscape for EV charging infrastructure. While the team's research provides a broad overview of the current state and future developments in charging tech and infrastructure, the expert insights offer more nuanced perspectives on the challenges and potential solutions.

Both sources agree....

3708

3710

Ask Anything

FIG. 37C

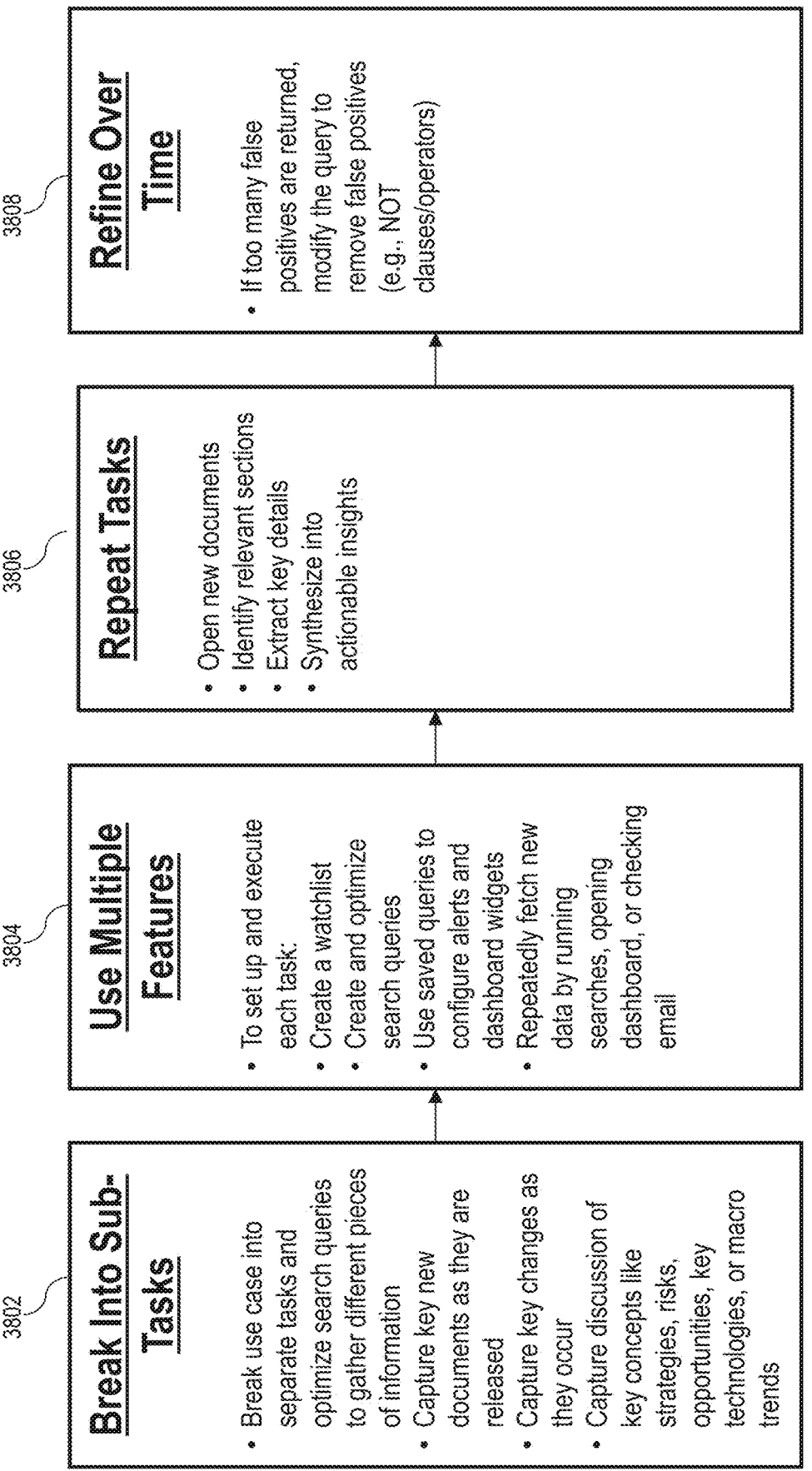

Break Into Sub-Tasks 3802

- Break use case into separate tasks and optimize search queries to gather different pieces of information
- Capture key new documents as they are released
- Capture key changes as they occur
- Capture discussion of key concepts like strategies, risks, opportunities, key technologies, or macro trends

Use Multiple Features 3804

- To set up and execute each task:
- Create a watchlist
- Create and optimize search queries
- Use saved queries to configure alerts and dashboard widgets
- Repeatedly fetch new data by running searches, opening dashboard, or checking email

Repeat Tasks 3806

- Open new documents
- Identify relevant sections
- Extract key details
- Synthesize into actionable insights

Refine Over Time 3808

- If too many false positives are returned, modify the query to remove false positives (e.g., NOT clauses/operators)

FIG. 38A

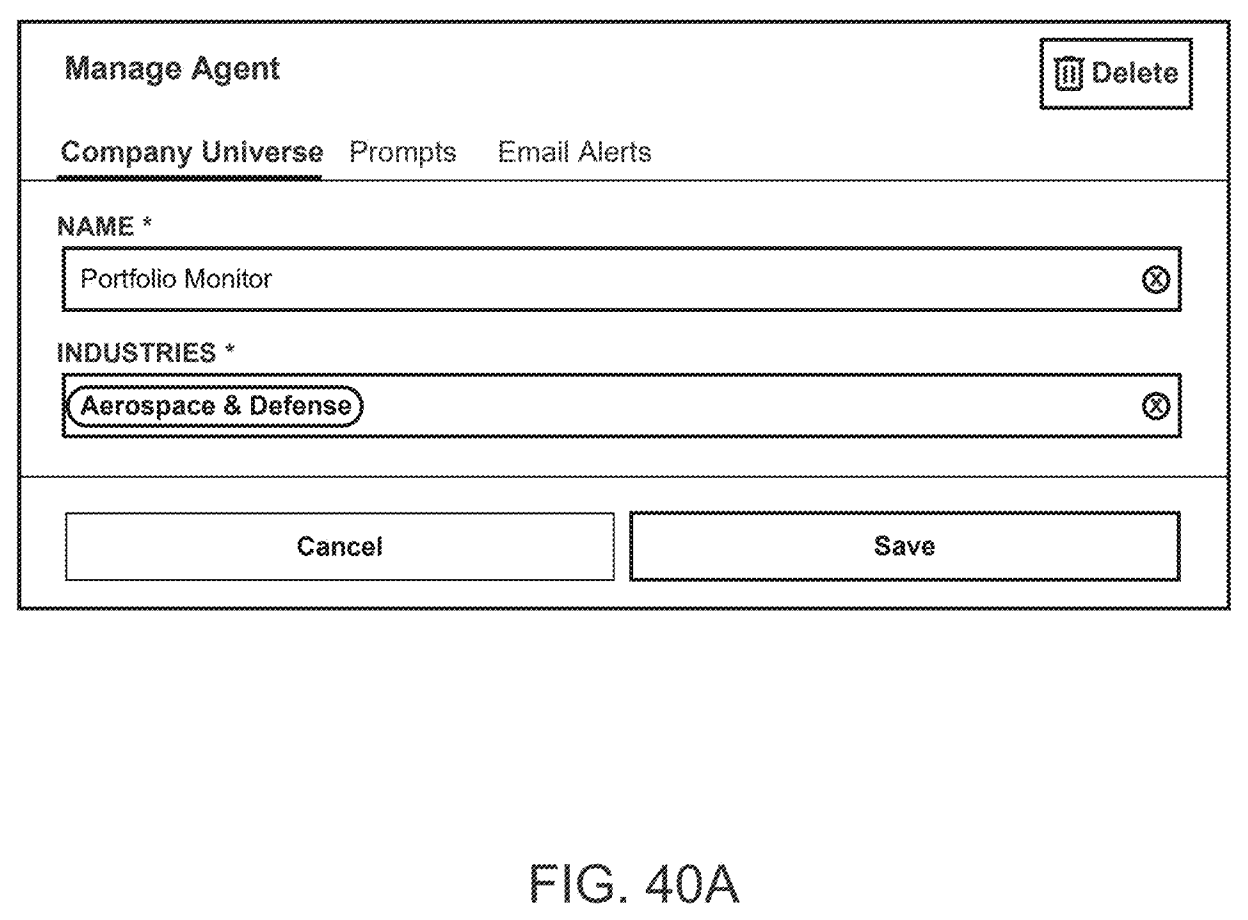

Manage Agent

Company Universe    Prompts    Email Alerts

🔳 Delete

NAME *

Portfolio Monitor    ⊗

INDUSTRIES *

( Aerospace & Defense )    ⊗

Cancel

Save

FIG. 40A

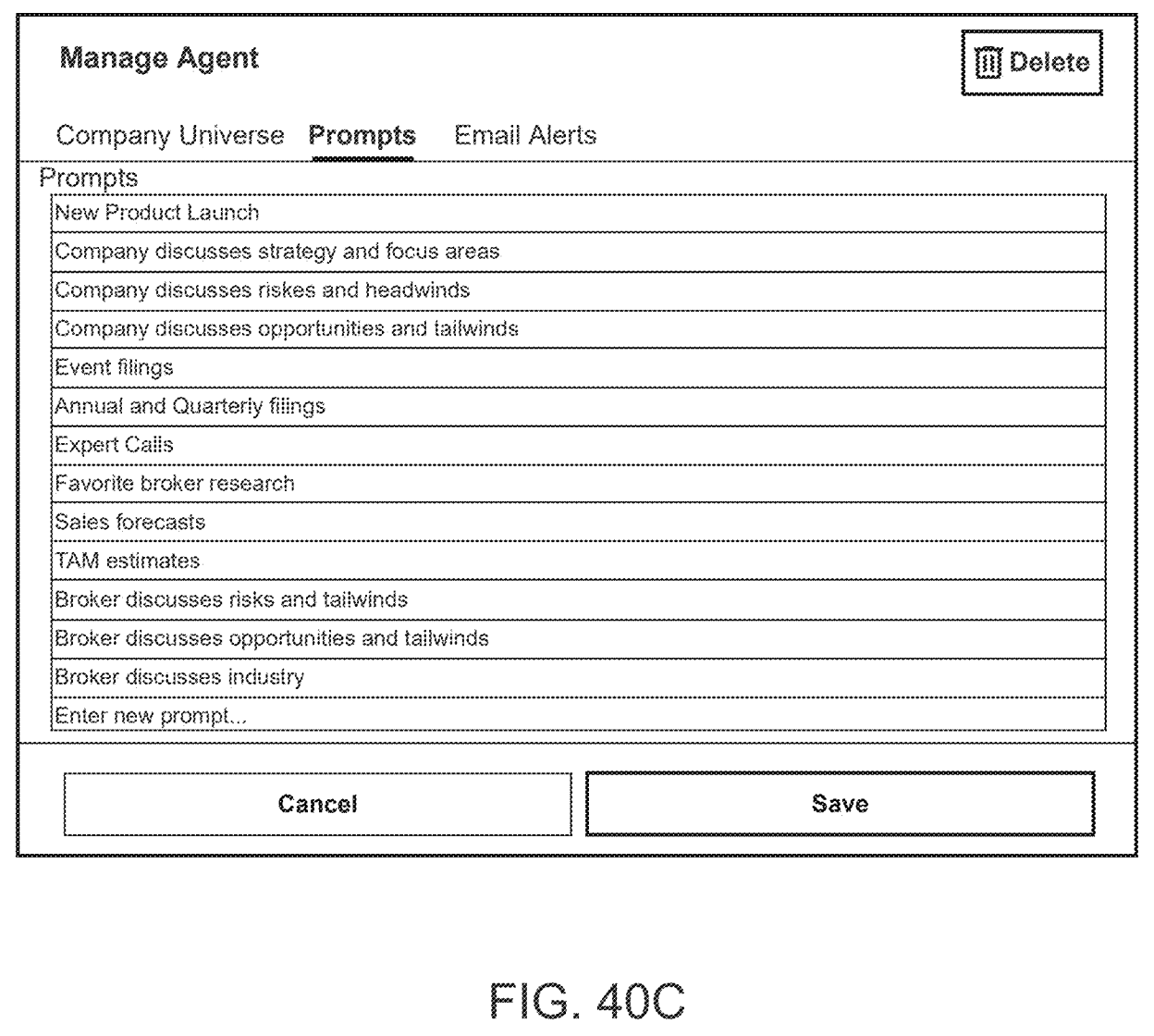

Manage Agent                                              ☐ Delete

Company Universe  Prompts  Email Alerts

Prompts

New Product Launch

Company discusses strategy and focus areas

Company discusses riskes and headwinds

Company discusses opportunities and tailwinds

Event filings

Annual and Quarterly filings

Expert Calls

Favorite broker research

Sales forecasts

TAM estimates

Broker discusses risks and tailwinds

Broker discusses opportunities and tailwinds

Broker discusses industry

Enter new prompt...

Cancel                                                    Save

FIG. 40C

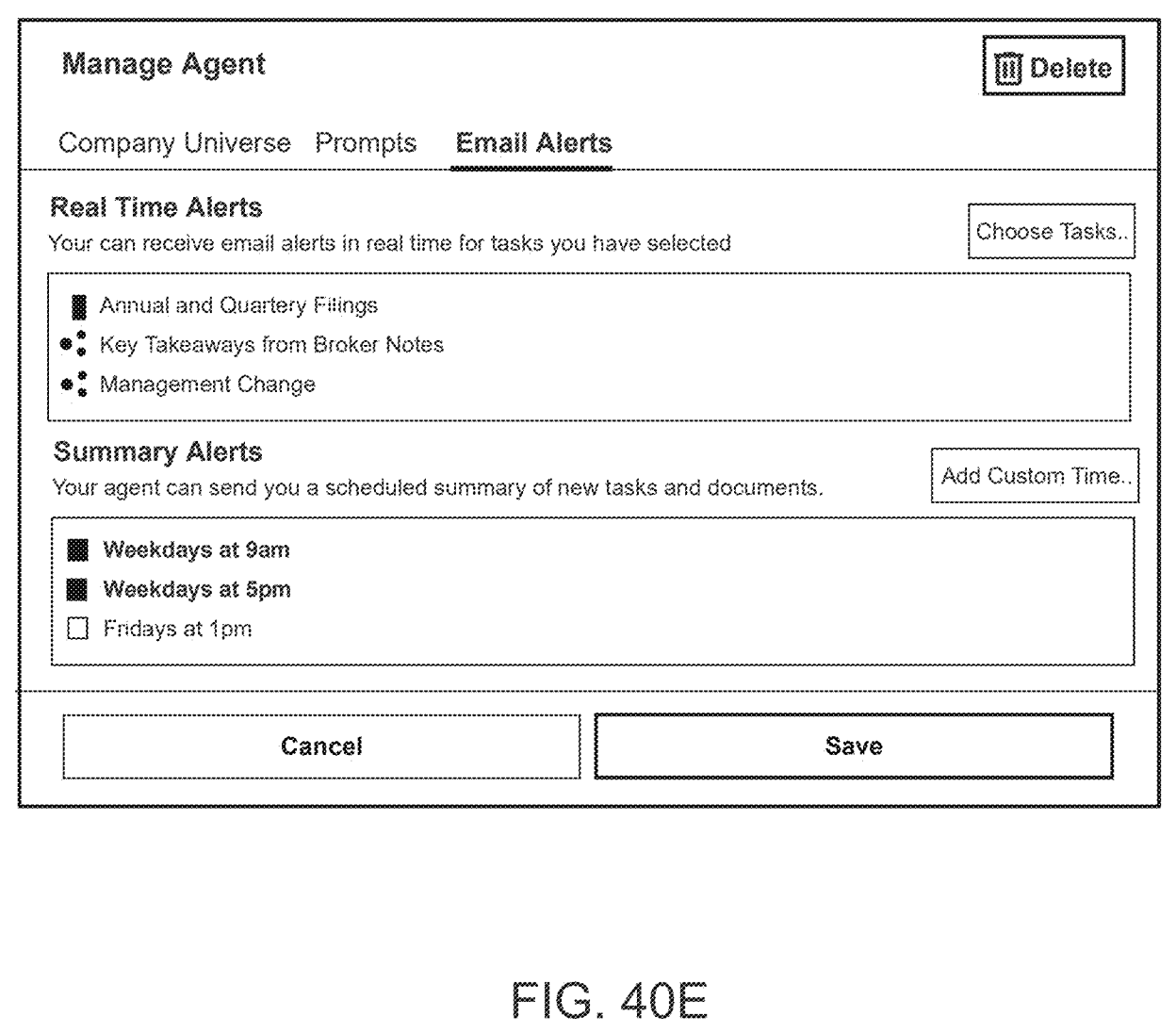

Manage Agent

Company Universe   Prompts   Email Alerts

[ Delete ]

Real Time Alerts

Your can receive email alerts in real time for tasks you have selected

[ Choose Tasks... ]

- ■ Annual and Quarterly Filings
- Key Takeaways from Broker Notes
- Management Change

Summary Alerts

Your agent can send you a scheduled summary of new tasks and documents.

[ Add Custom Time... ]

- ■ Weekdays at 9am
- ■ Weekdays at 5pm
- □ Fridays at 1pm

[ Cancel ]    [ Save ]

FIG. 40E

Share

RECIPIENTS

YUKKIE NG                                                    Viewer ▾

(ES)   Eric St. Onge (you)                                   Owner (WM)  Will Montague                                          Viewer ▾

▪ Send email notification to recipients

Add message to recipients (Optional)

Cancel                                                       Save

FIG. 40F

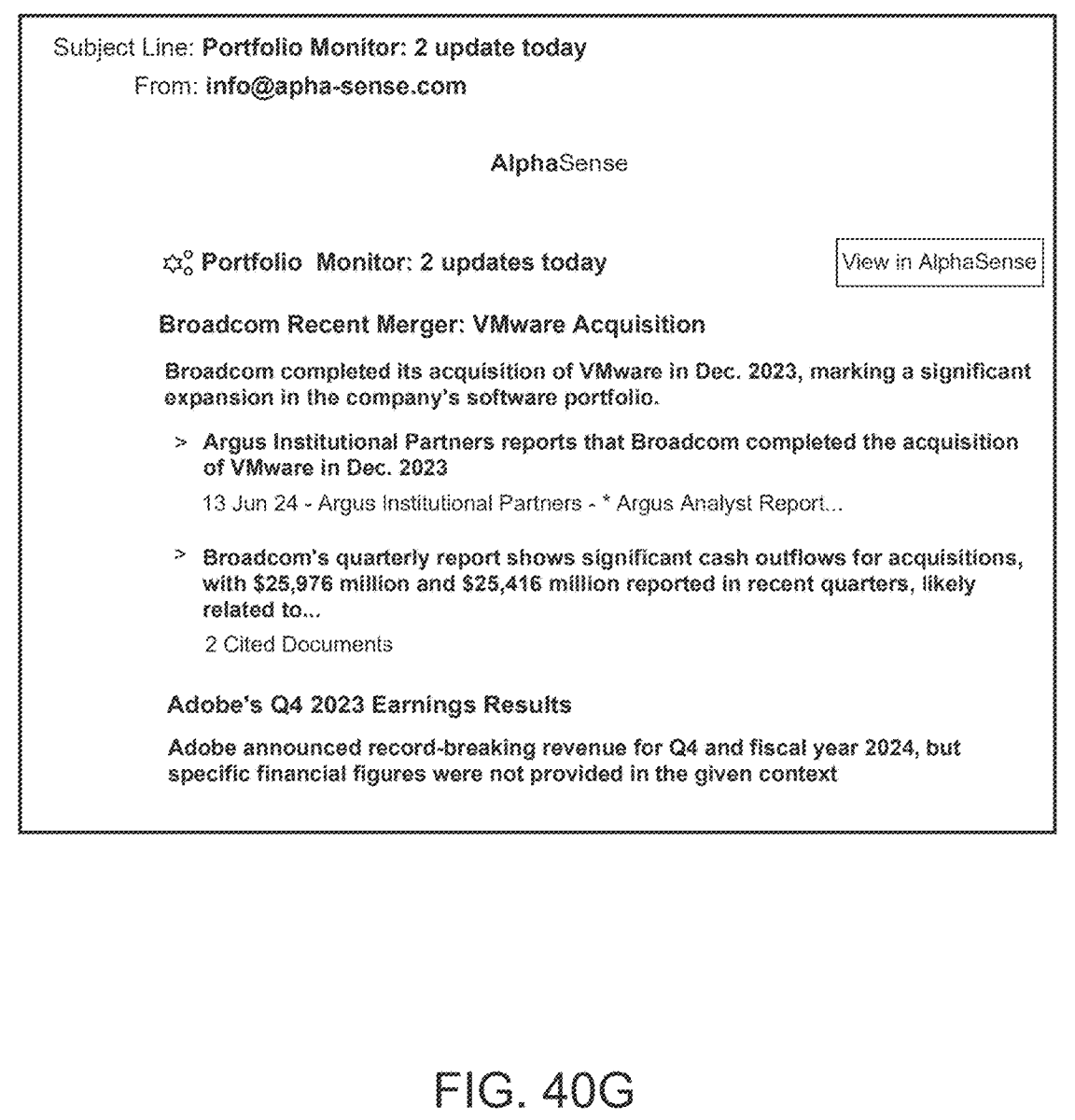

Subject Line: Portfolio Monitor: 2 update today

From: info@apha-sense.com

AlphaSense

View in AlphaSense

☆° Portfolio Monitor: 2 updates today

Broadcom Recent Merger: VMware Acquisition

Broadcom completed its acquisition of VMware in Dec. 2023, marking a significant expansion in the company's software portfolio.

> Argus Institutional Partners reports that Broadcom completed the acquisition of VMware in Dec. 2023

13 Jun 24 - Argus Institutional Partners - * Argus Analyst Report...

> Broadcom's quarterly report shows significant cash outflows for acquisitions, with $25,976 million and $25,416 million reported in recent quarters, likely related to...

2 Cited Documents

Adobe's Q4 2023 Earnings Results

Adobe announced record-breaking revenue for Q4 and fiscal year 2024, but specific financial figures were not provided in the given context

FIG. 40G

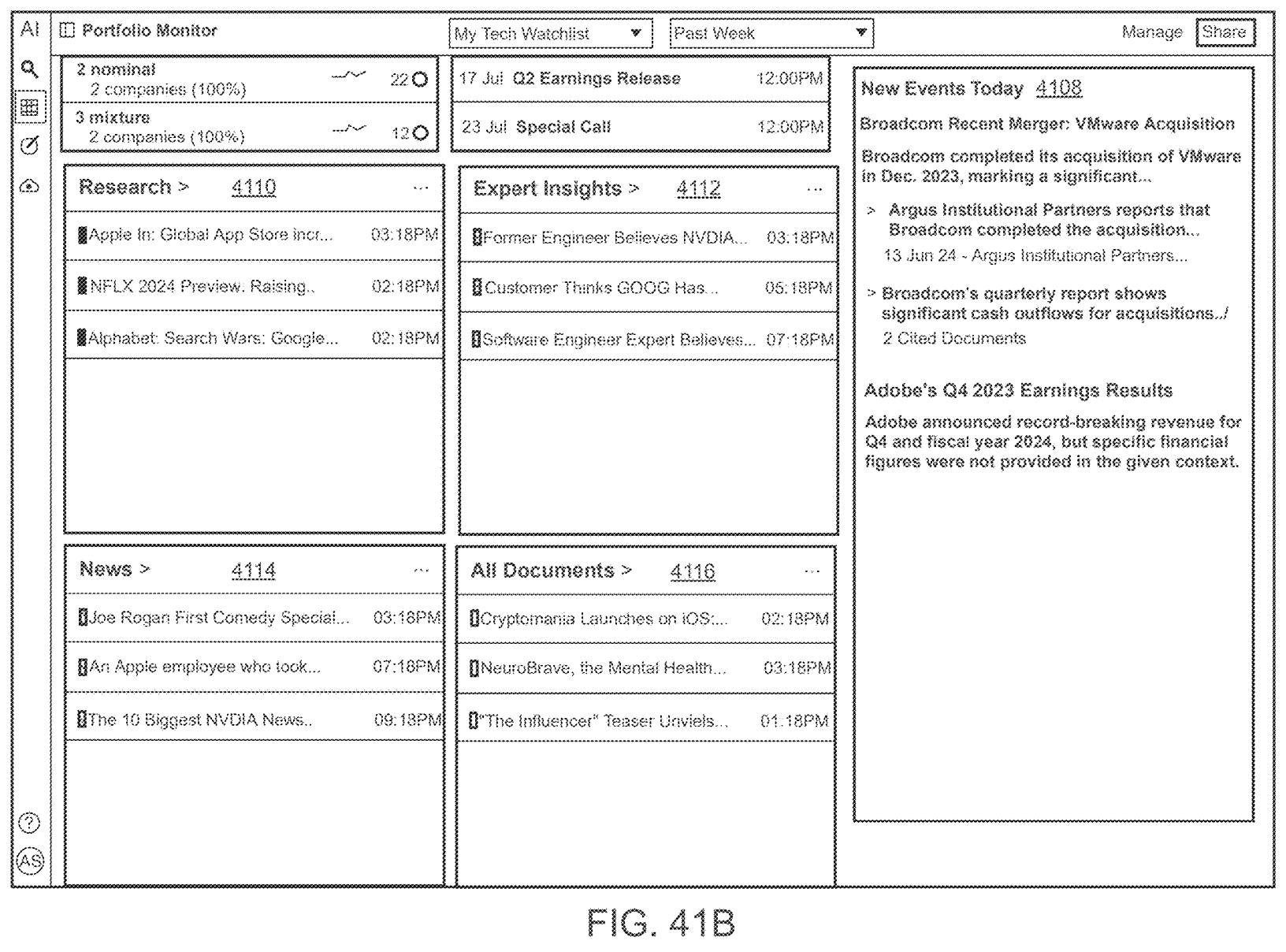

Portfolio Monitor                                    My Tech Watchlist ▼    Past Week ▼                      Manage  Share 2 nominal
  2 companies (100%)        ∿  22 ○        17 Jul Q2 Earnings Release        12:00PM        New Events Today 4108
3 mixture
  2 companies (100%)        ∿  12 ○        23 Jul Special Call              12:00PM        Broadcom Recent Merger: VMware Acquisition Broadcom completed its acquisition of VMware
                                                                                           in Dec. 2023, marking a significant...
Research >  4110                      ⋮     Expert Insights >  4112          ⋮
                                                                                           > Argus Institutional Partners reports that
▣ Apple In: Global App Store incr..  03:18PM  ▣ Former Engineer Believes NVDIA...  03:18PM     Broadcom completed the acquisition...
                                                                                             13 Jun 24 – Argus Institutional Partners...
▣ NFLX 2024 Preview. Raising..       02:18PM  ▣ Customer Thinks GOOG Has...        05:18PM
                                                                                           > Broadcom's quarterly report shows
▣ Alphabet. Search Wars: Google...   02:18PM  ▣ Software Engineer Expert Believes... 07:18PM    significant cash outflows for acquisitions../
                                                                                             2 Cited Documents News >  4114                          ⋮     All Documents >  4116           ⋮            Adobe's Q4 2023 Earnings Results ▣ Joe Rogan First Comedy Special...  03:18PM  ▣ Cryptomania Launches on iOS...     02:18PM  Adobe announced record-breaking revenue for
                                                                                           Q4 and fiscal year 2024, but specific financial
▣ An Apple employee who took..       07:18PM  ▣ NeuroBrave, the Mental Health...   03:18PM  figures were not provided in the given context.

▣ The 10 Biggest NVDIA News.         09:18PM  ▣ "The Influencer" Teaser Unviels.. 01:18PM

FIG. 41B

SYSTEMS AND METHODS FOR SEARCHING AND SUMMARIZING FINANCIAL RELATED DOCUMENTS, AND USER INTERFACE FOR DISPLAYING THE SAME

CROSS-REFERENCE TO RELATED APPLICATIONS

This application claims the benefit of U.S. Provisional Patent Application No. 63/673,868 filed on Jul. 22, 2024, entitled "SYSTEMS AND METHODS FOR SEARCHING AND SUMMARIZING FINANCIAL RELATED DOCU-MENTS, AND USER INTERFACE FOR DISPLAYING THE SAME," and U.S. Provisional Patent Application No. 63/520,505 filed on Aug. 18, 2023, entitled "SYSTEMS AND METHODS FOR SEARCHING AND SUMMARIZ-ING FINANCIAL RELATED DOCUMENTS, AND USER INTERFACE FOR DISPLAYING THE SAME." Each of the applications referenced herein are incorporated by ref-erence in their entirety.

TECHNICAL FIELD

The disclosure relates generally to an architecture for an artificial-intelligence (AI) based market intelligence system that provides an interactive user interface for use with a search engine for searching and summarizing financial related documents.

BACKGROUND

Conventional web search engines return links to entire documents in response to a search query consisting of keywords or phrases given by the user. In the financial domain, the end user is often a financial analyst who is researching the information source and looking to glean actionable intelligence from financial documents relating a specific company, and a specific industry, or one or more companies. Traditional search methods have provided for natural-language processing and sentiment analysis of finan-cial documents. However, in many cases, these types of analyses have been limited to the specific words and sen-tences found in the financial documents.

More recently, various artificial-intelligence models (e.g., large-language models (LLMs) or machine-learning mod-els) have been used for summarizing documents; however, one problem with using AI models, such as LLMs, to generate summaries is that it is difficult to aggregate existing content to know what information is relevant to the sum-mary being generated. The correct information needs to be fed into the models in order to get valuable and relevant summaries from the models. It is further difficult to generate timely, actionable insights from a volume of new docu-ments.

Thus, it is desirable to provide systems and methods for accurately and efficiently summarizing financial documents and generating timely, actionable insights from new docu-ments using artificial-intelligence models, such as LLMs.

SUMMARY

Systems and methods for searching and summarizing financial related documents, and a user interface for display-ing the same, are disclosed. Specifically, a comprehensive artificial-intelligence based market intelligence platform is disclosed. The market intelligence platform described herein combines and integrates the following components: (1) document search powered by one or more artificial-intelli-gence models; (2) summaries generated using one or more artificial-intelligence models; (3) a freeform, interactive conversational or chat-based user interface powered by one or more artificial-intelligence models for interacting with the document search and the summaries; (4) a private single-tenant enterprise cloud for generating summaries based on proprietary information without leaving the enterprise net-work; and (5) artificial-intelligence agents for automatically simplifying and performing workflows to surface actionable insights from new information in near real-time or on a scheduled basis. Each of these components is described in more detail below.

The market intelligence platform described herein solves two key problems. First, it identifies and summarizes trends across companies, sectors, and markets in real-time or near real-time. Second, it allows users to interact with the docu-ments and summaries in an intuitive, freeform manner.

FIG. F 3 illustrates examples of the user interface of the deep search system.

FIG. 4 illustrates more details of the deep search process in the financial domain.

Figure 5A:
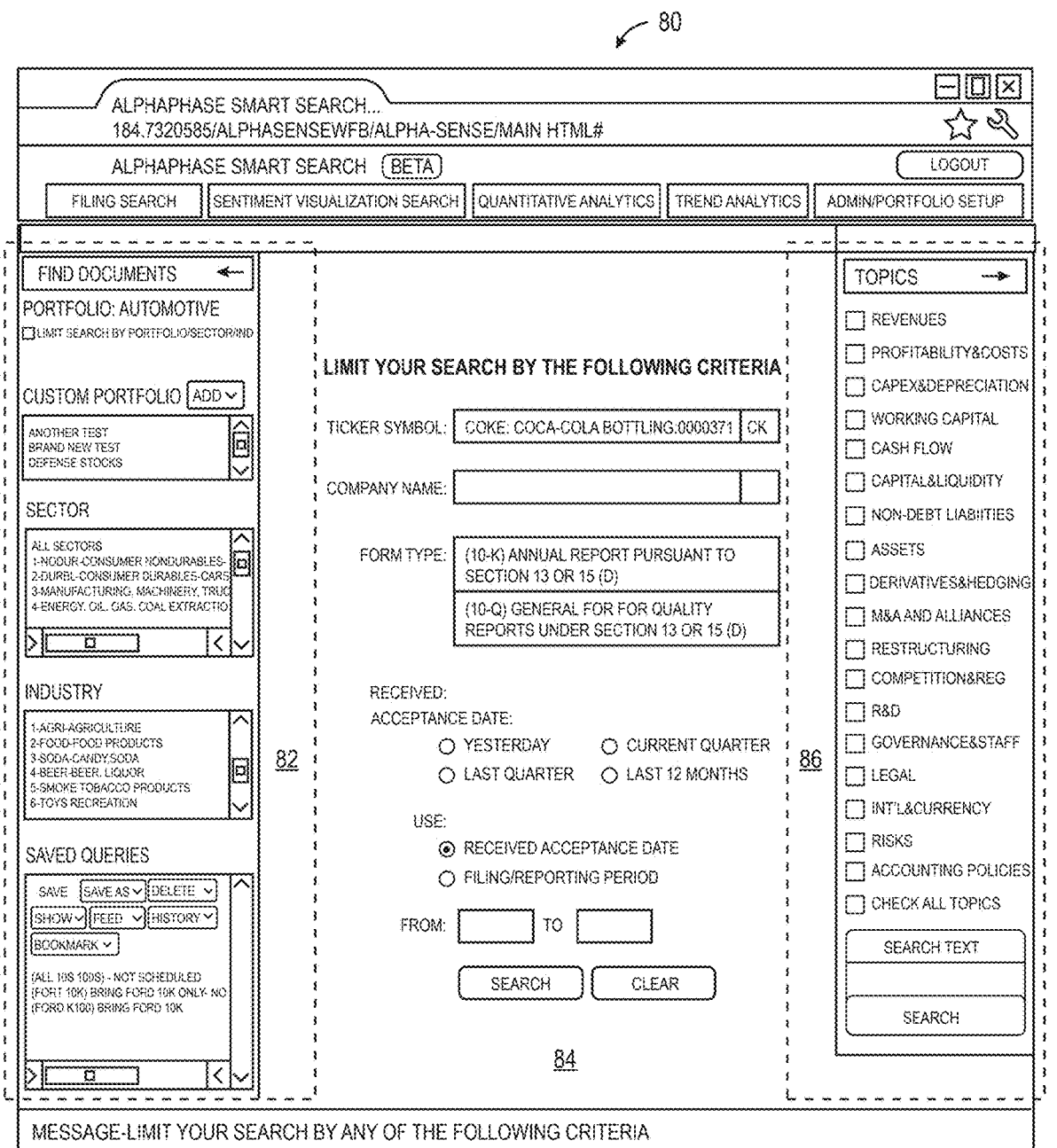
Figure 5B:
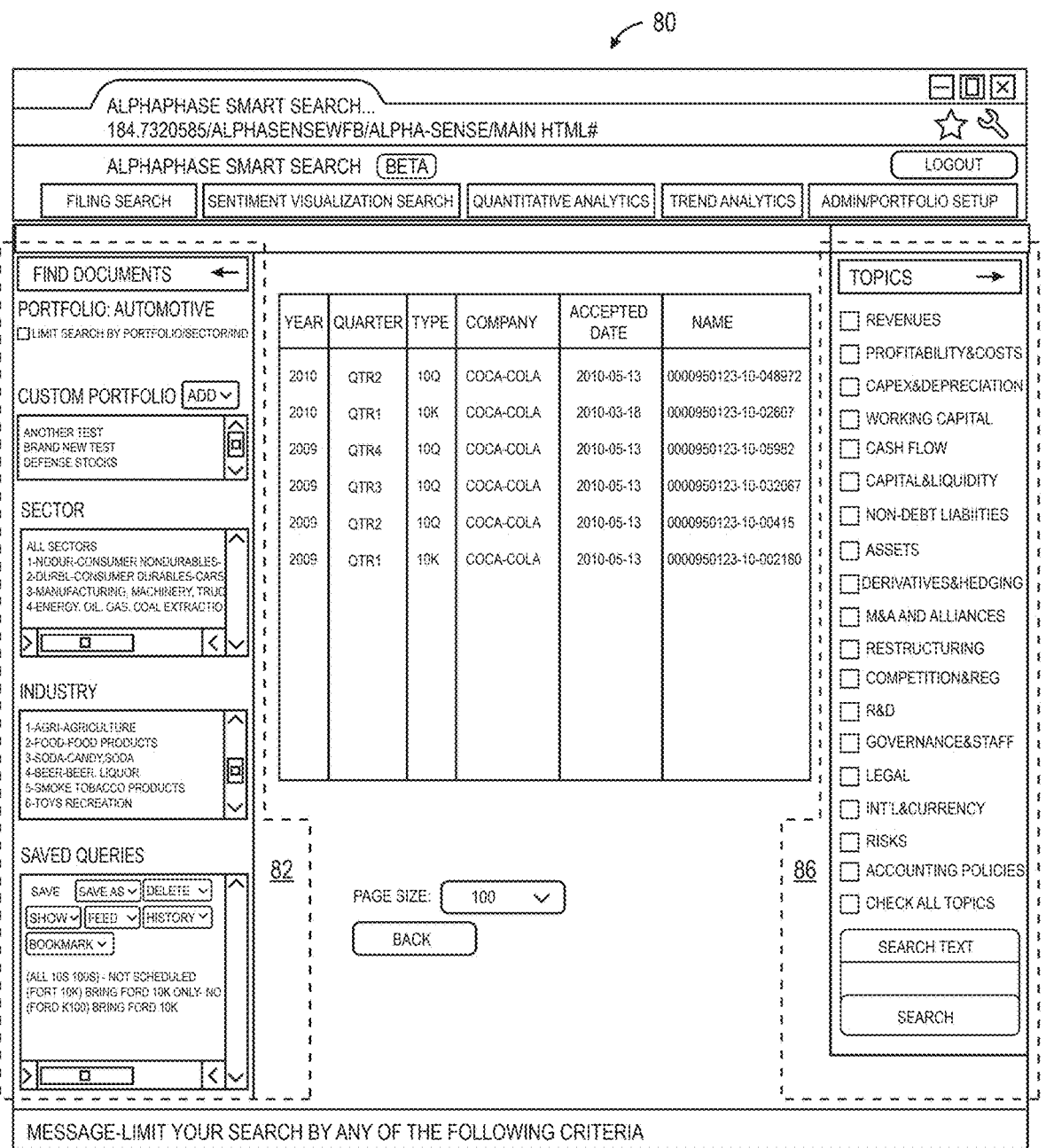

FIGS. 5A and 5B illustrate an example of a user interface for the deep search system for an initial query and a list of results, respectively, in the financial industry.

Figure 6:
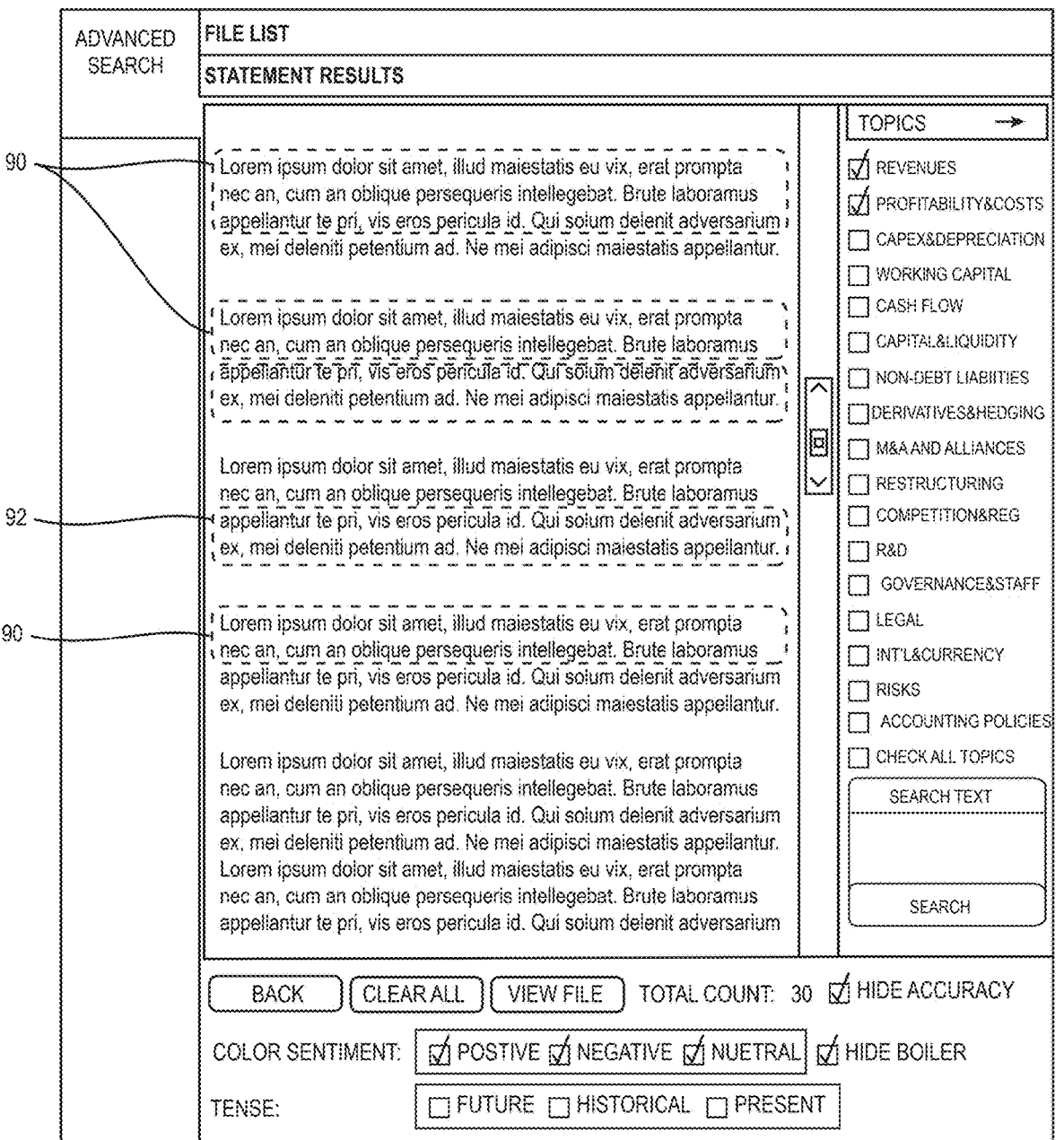

FIG. 6 illustrates an example of a sentiment heat map user interface of the deep search system.

Figure 7:
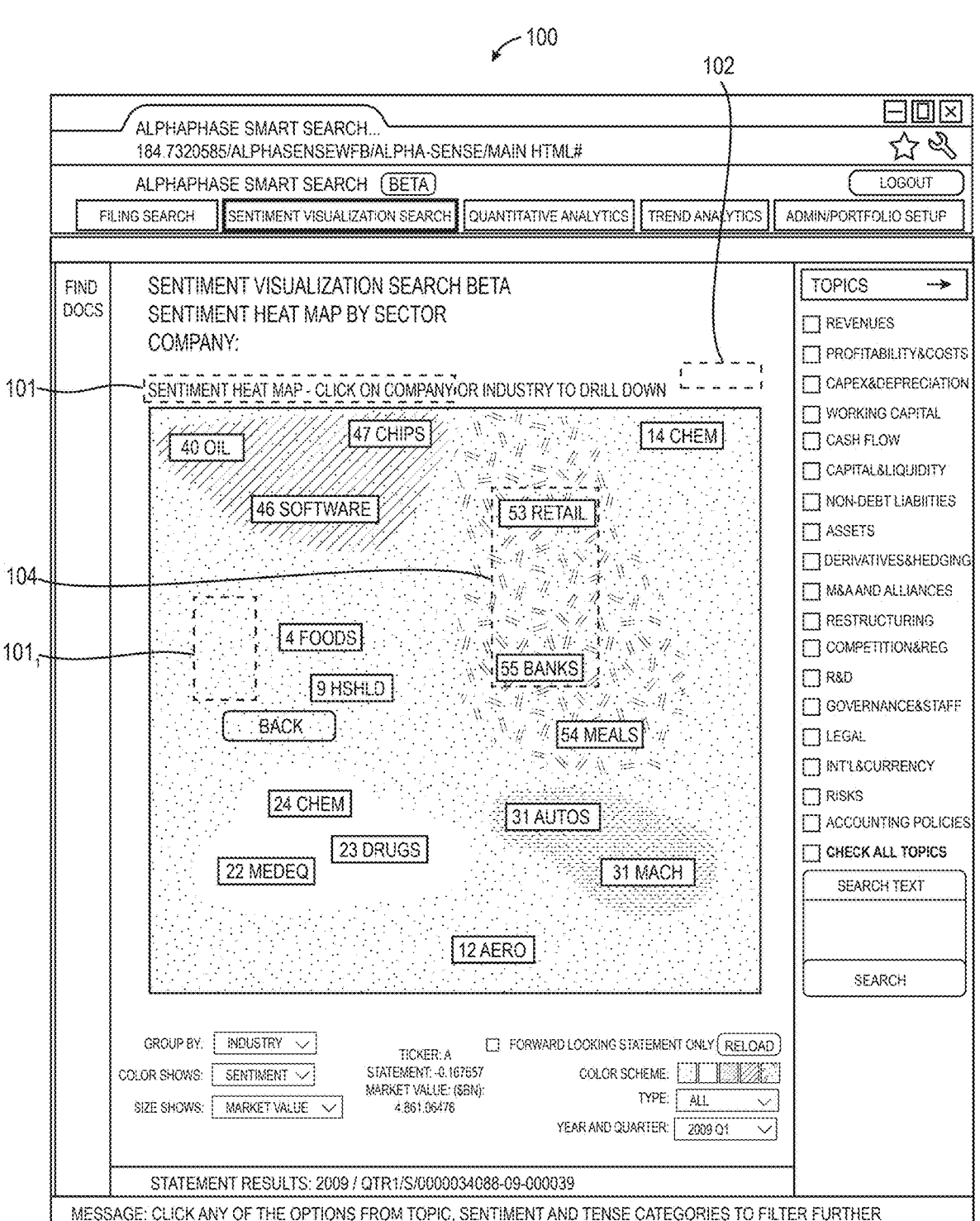

FIG. 7 illustrates another example of a search results user interface of the deep search system.

Figure 8:
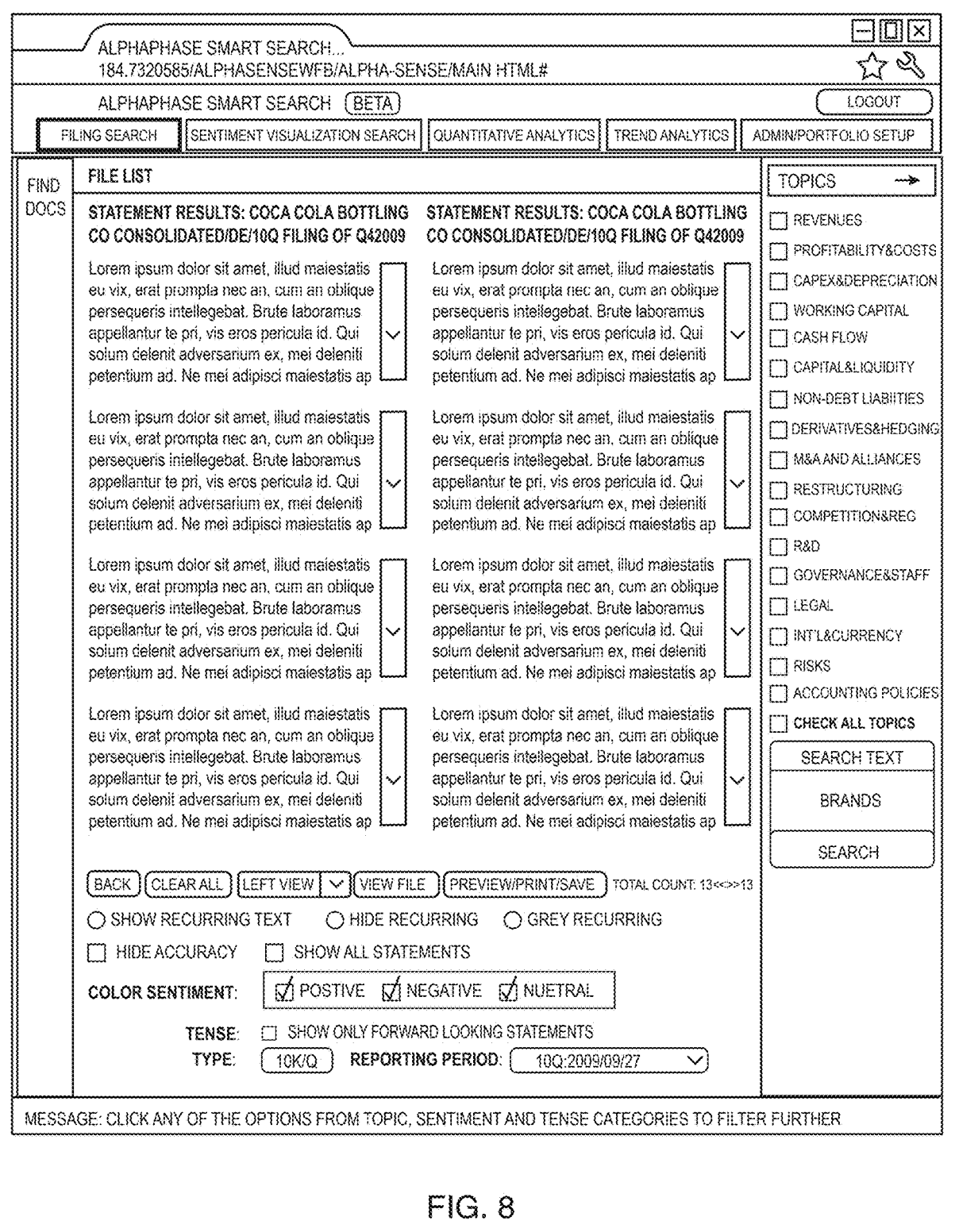

FIG. 8 illustrates an example of a search results user interface of the deep search system, where the viewing interface allows the user to compare documents side by side.

FIGS. 9A and 9B illustrate portions of a document high-lighted that is made possible by the deep search system.

FIGS. 10A and 10B illustrate an example of a multi-document summary that is made possible by the deep search system.

Figure 11:
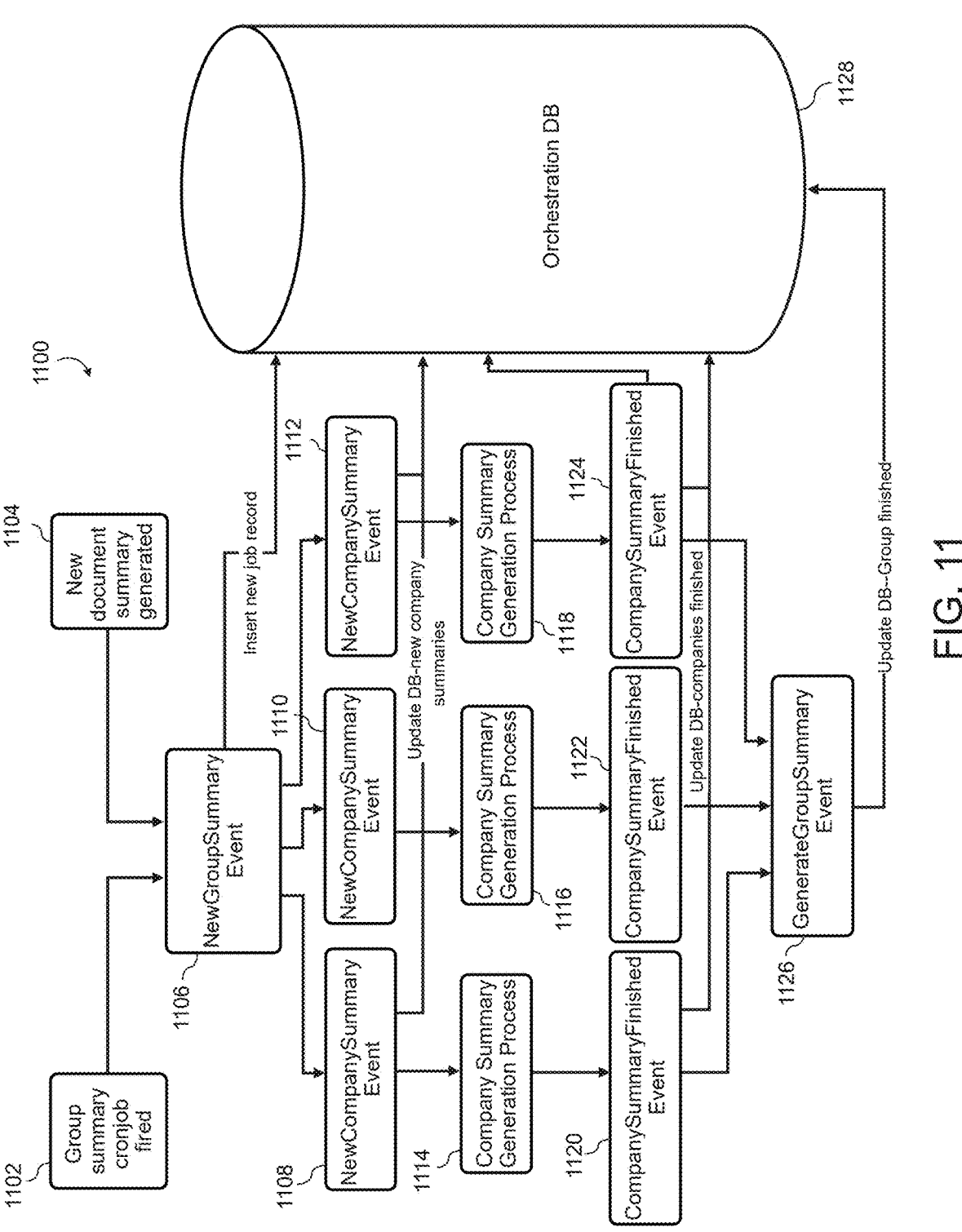

FIG. 11 depicts a group summary event process flow for both the regularly updated company summaries, triggered from the incoming document processing queue updates.

Figure 12:
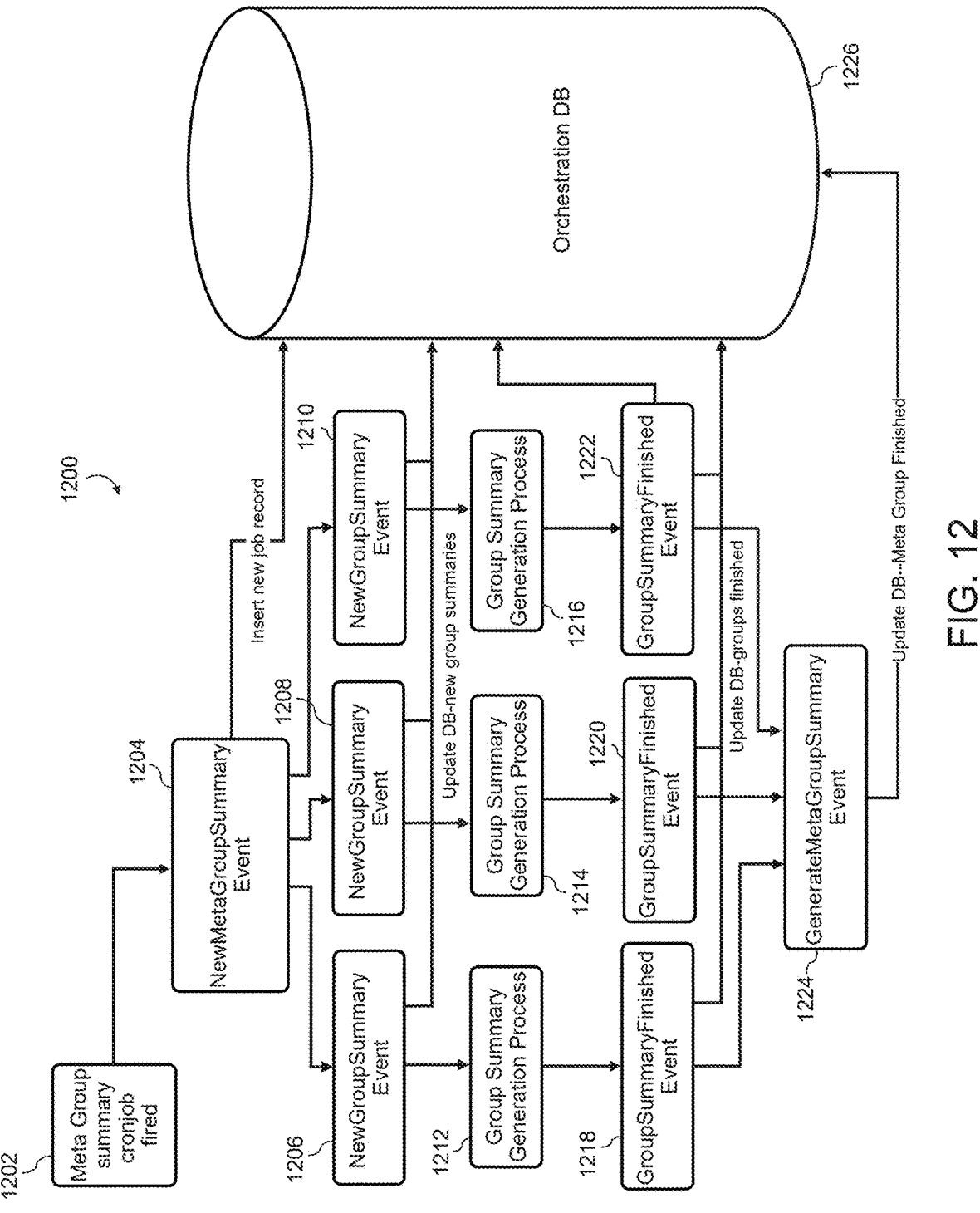

FIG. 12 depicts a meta group/industry summary event process flow for the peer-group, industry, and meta-group seven-day trailing digest updates and the earnings season updates.

Figure 13:
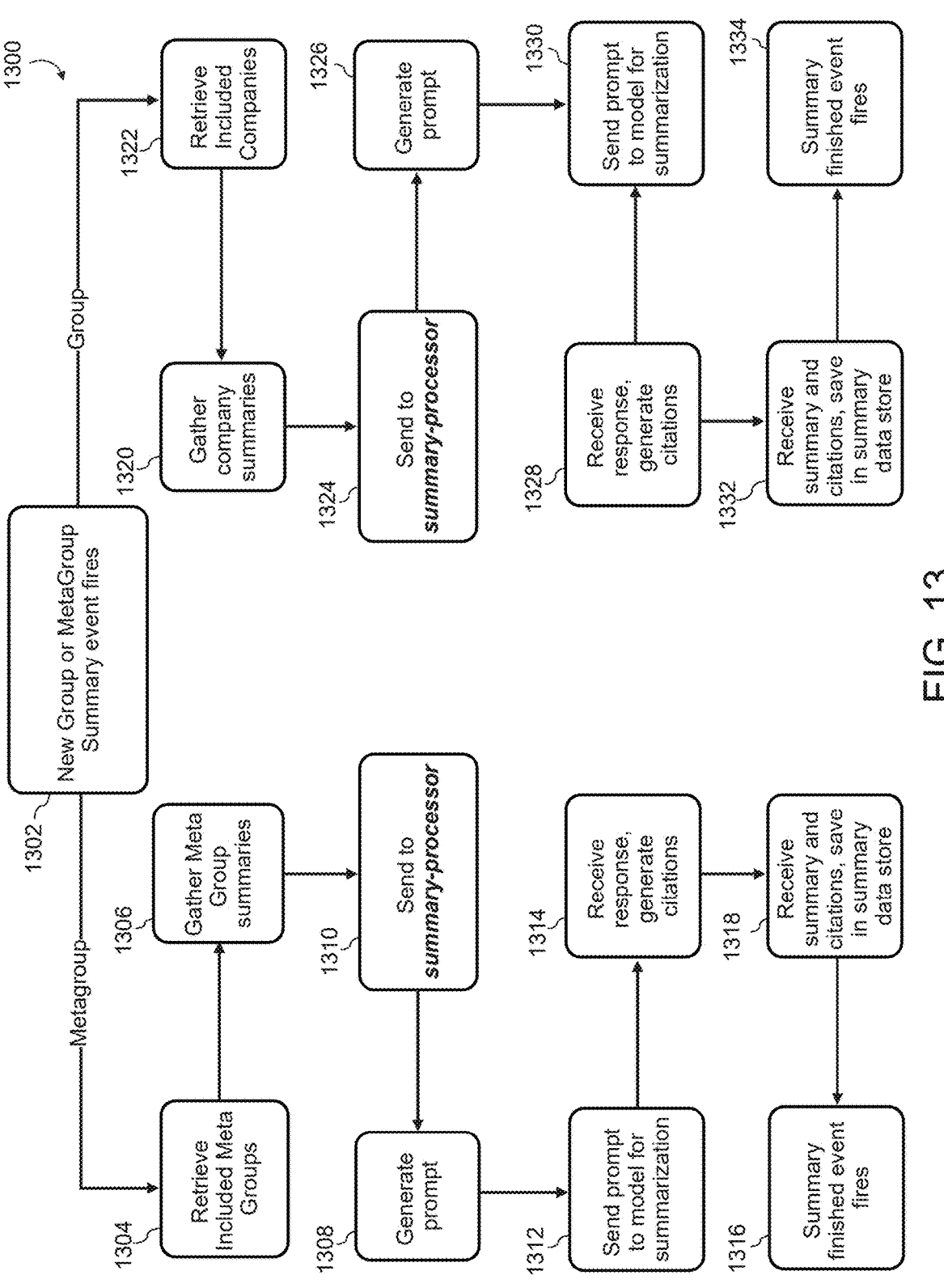

FIG. 13 depicts a group and meta group summary gen-eration process flow for generating summaries for something higher than the company level.

Figure 14:
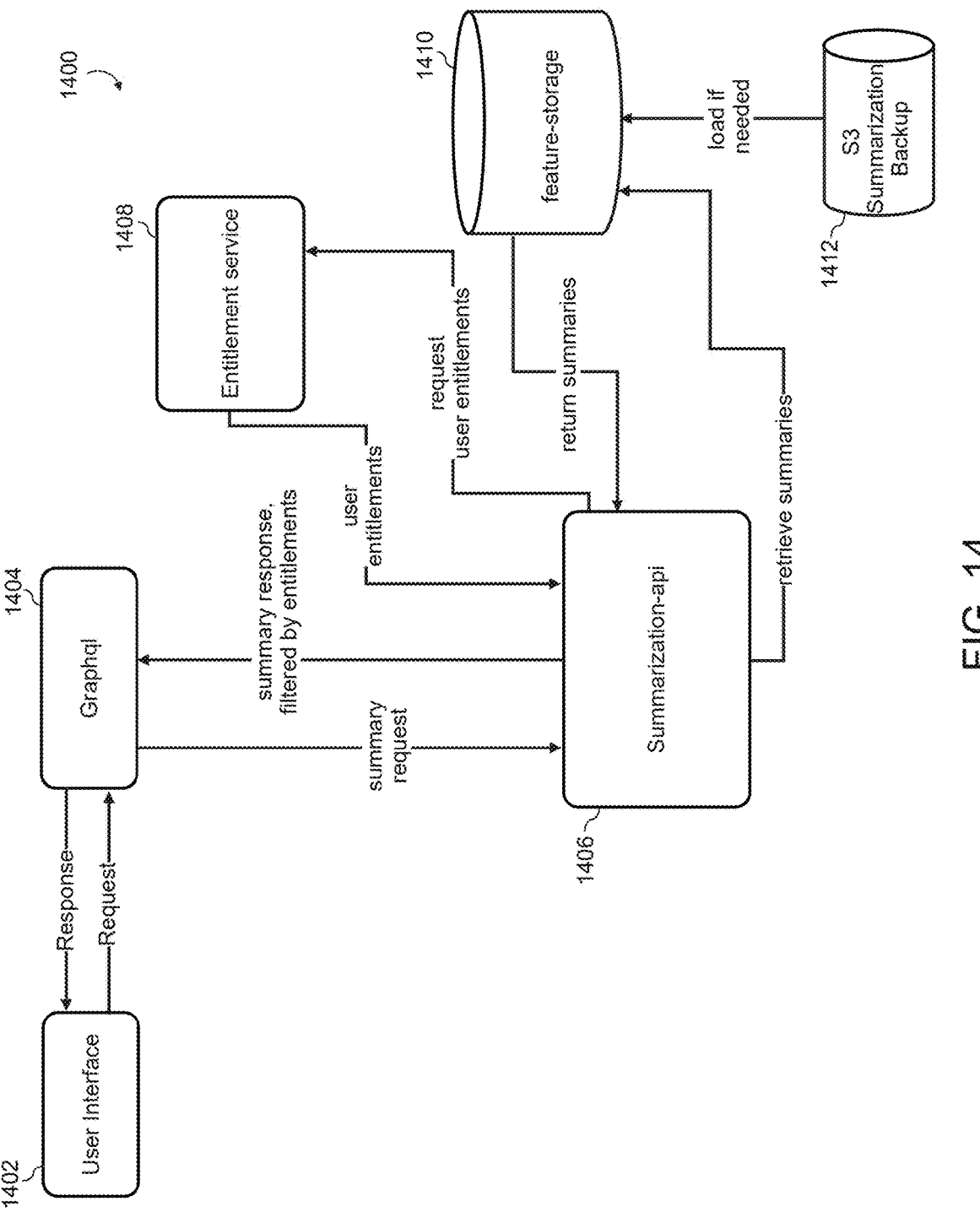

FIG. 14 depicts an embodiment of the systems and methods for providing a user interface for use with a search engine for searching and summarizing financial related documents.

Figure 15:
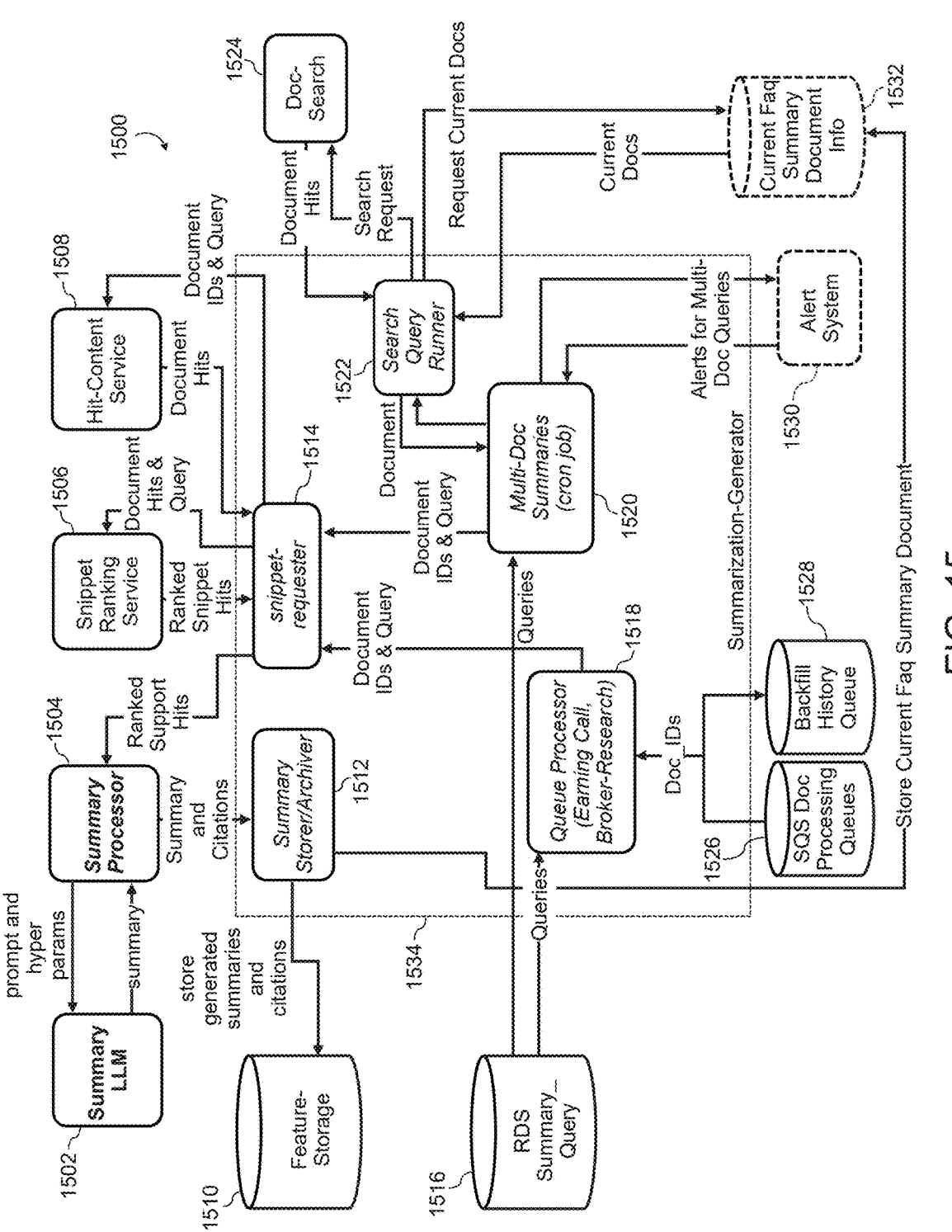

FIG. 15 depicts an embodiment of the systems and methods for providing a user interface for use with a search engine for searching and summarizing financial related documents.

Figure 16:
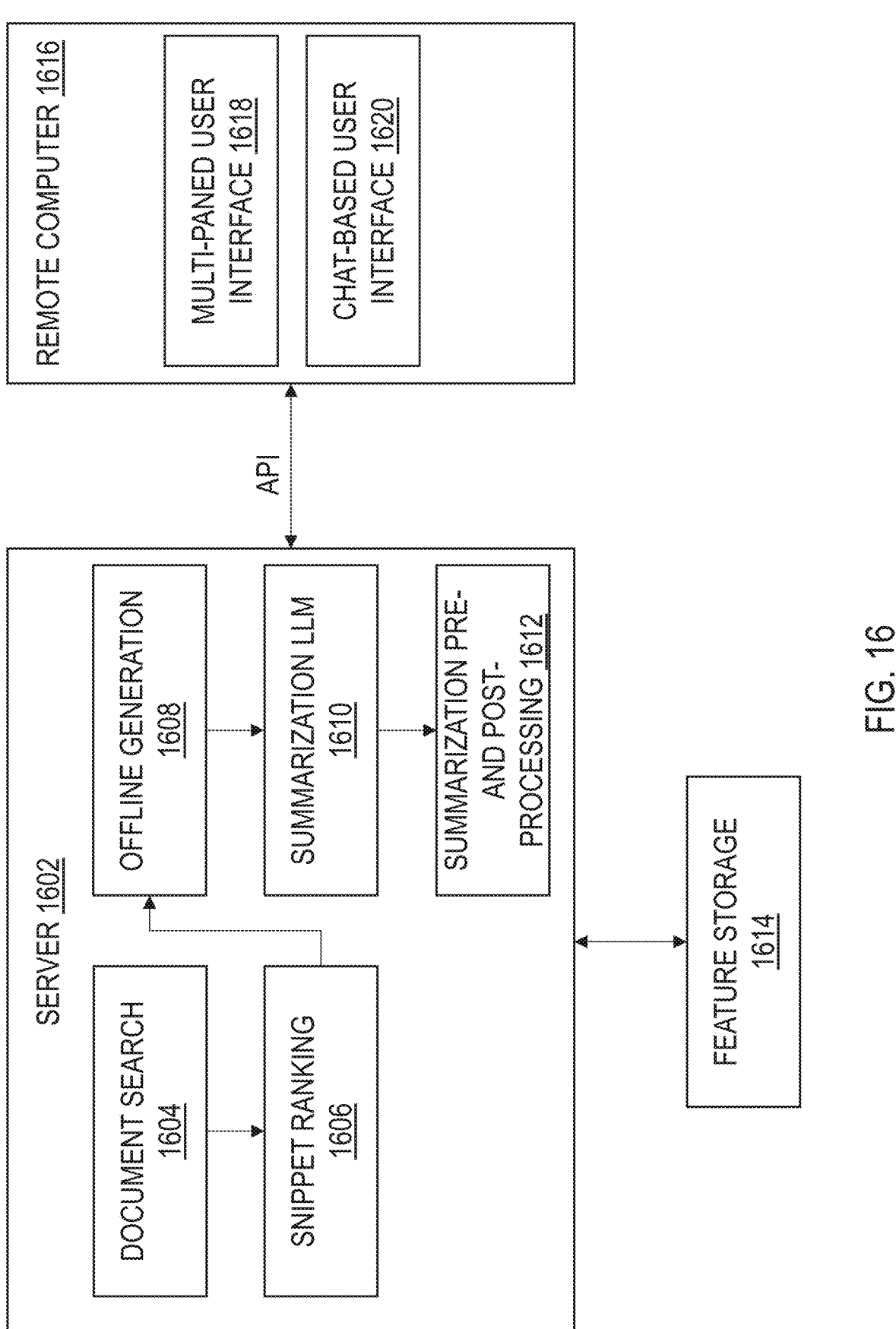

FIG. 16 depicts a block diagram of an embodiment of the systems and methods for providing a user interface for use with a search engine for searching and summarizing finan-cial related documents.

Figure 17A:
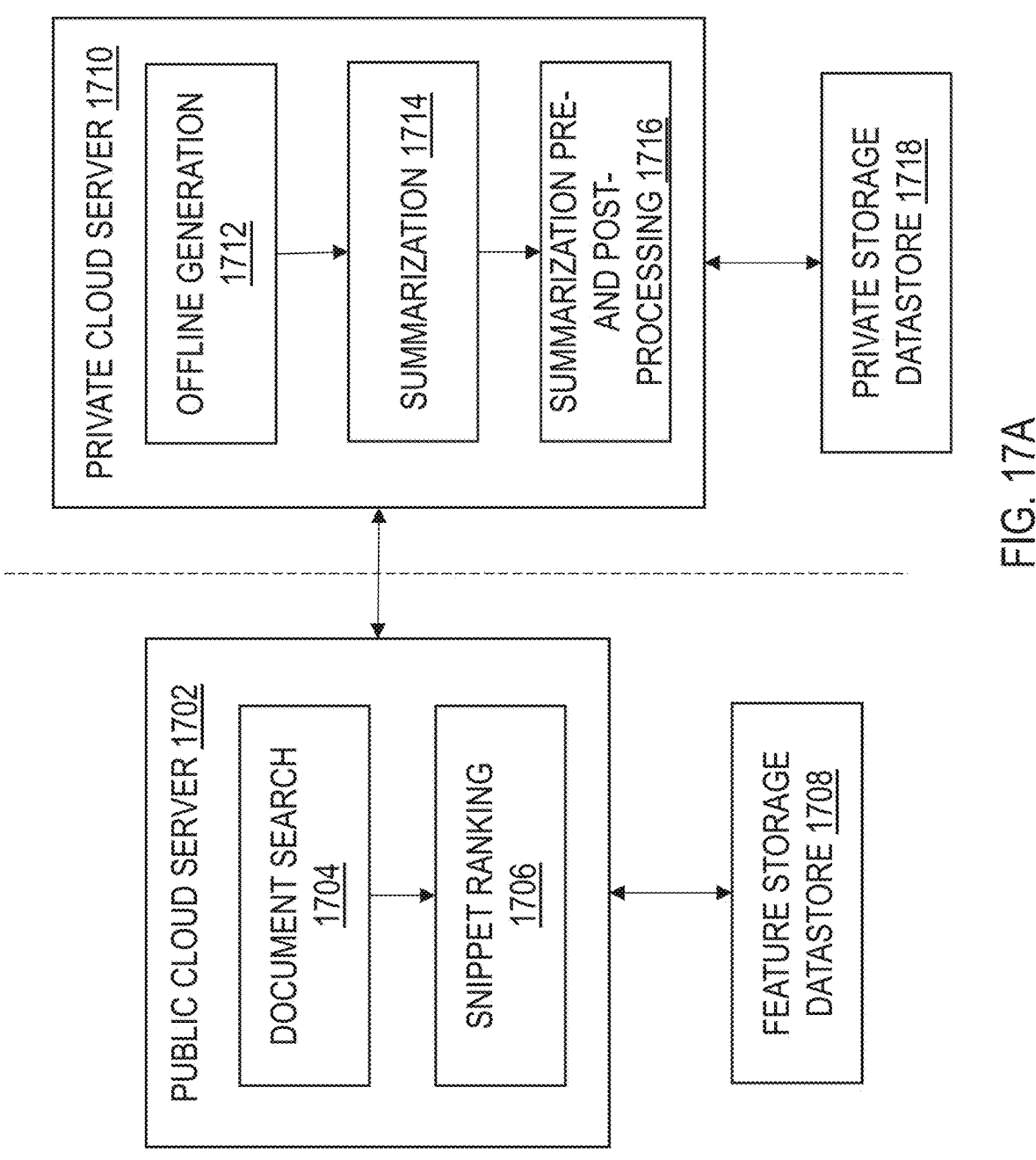

FIG. 17A depicts a block diagram of a first embodiment of the systems and methods for providing a user interface for use with a search engine for searching and summarizing financial related documents in which a federated private cloud is used.

Figure 17B:
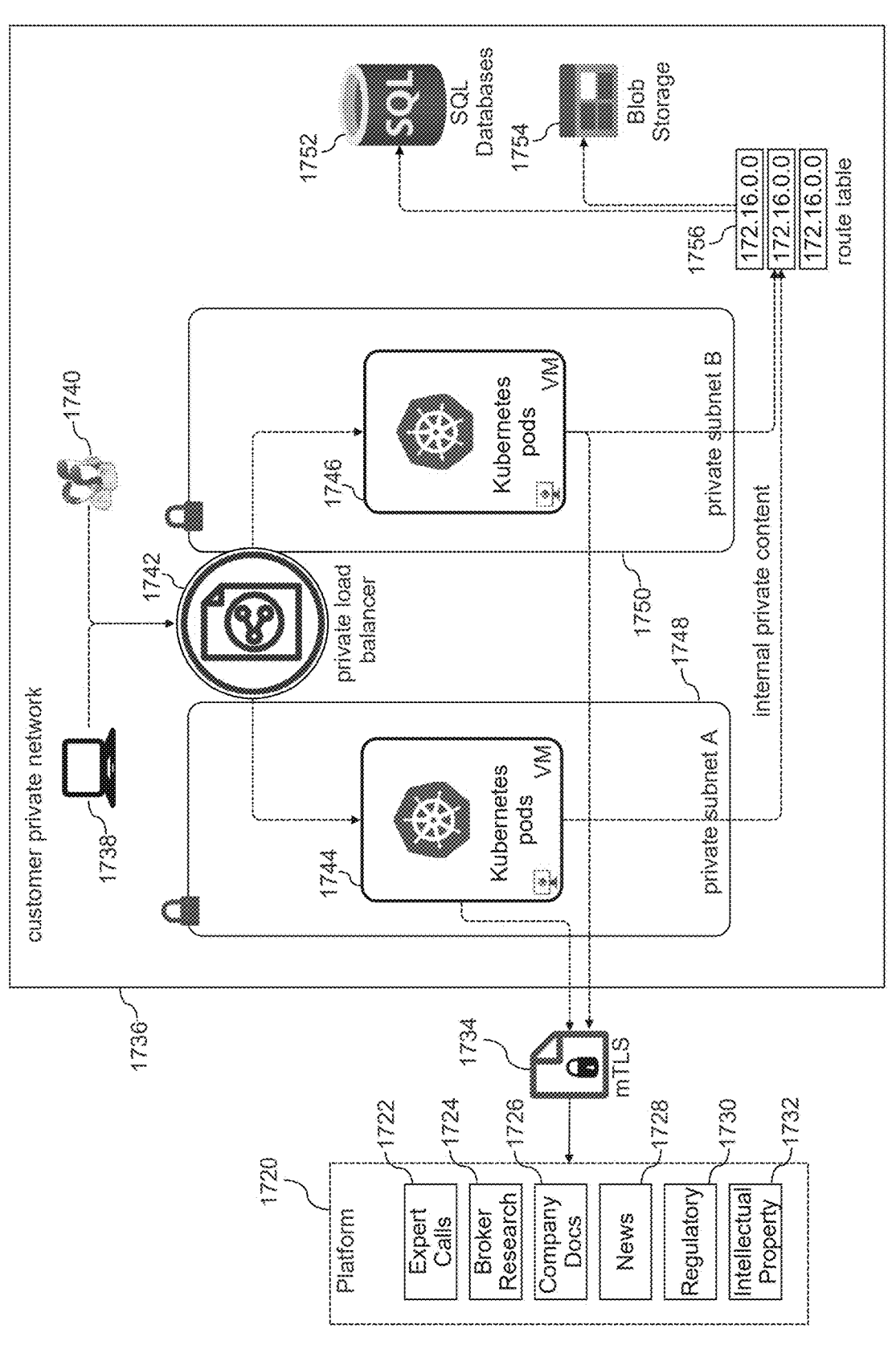

FIG. 17B depicts a block diagram of a second embodiment of the systems and methods for providing a user interface for use with a search engine for searching and summarizing financial related documents in which a federate private cloud is used.

Figure 18:
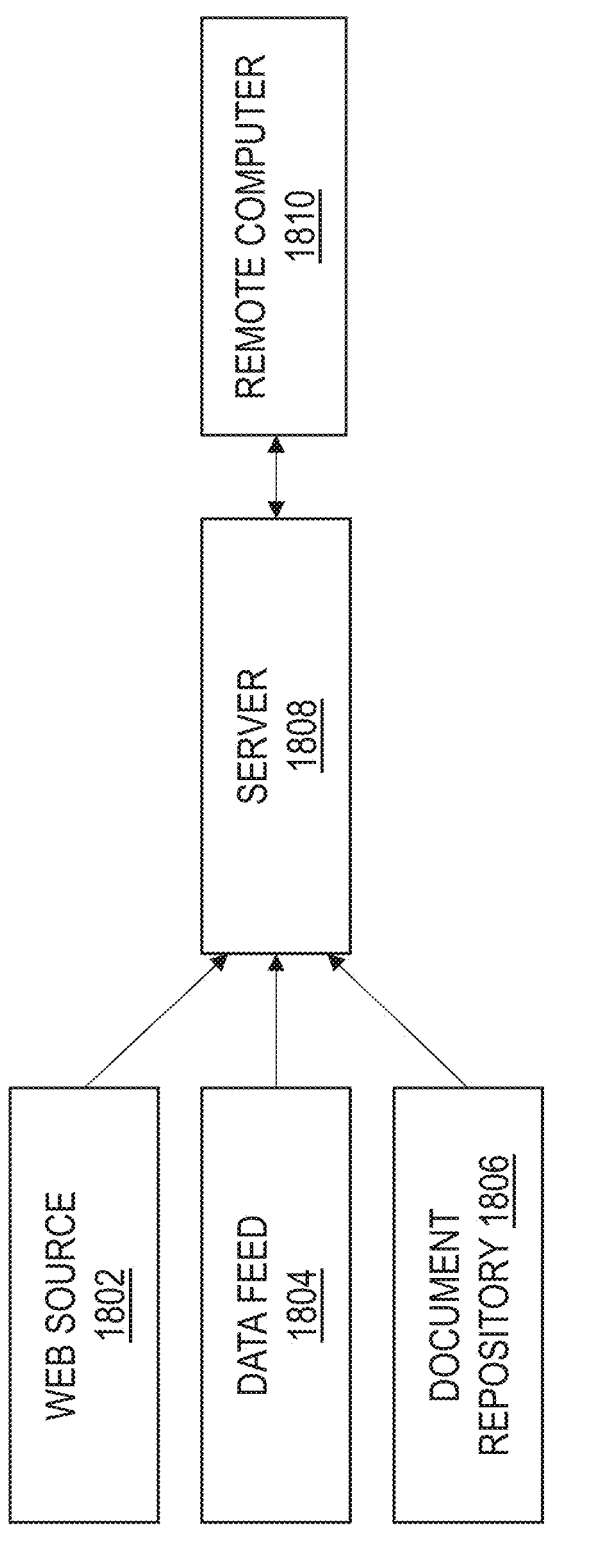

FIG. 18 depicts a block diagram showing data sources provided to the systems and methods described herein.

Figure 19:
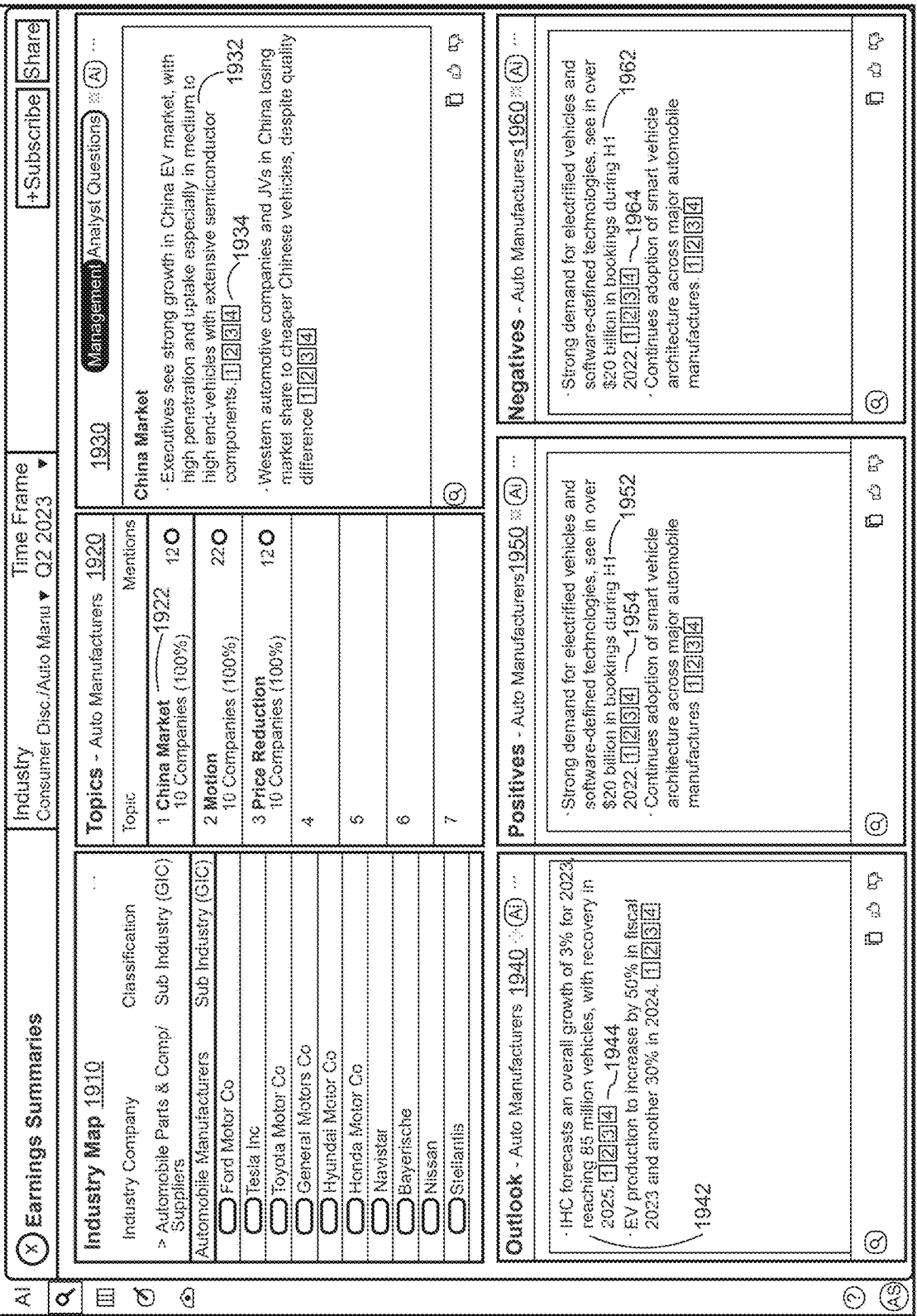

FIG. 19 depicts an example of a user interface providing earnings summaries according to the subject matter disclosed herein.

Figure 20:
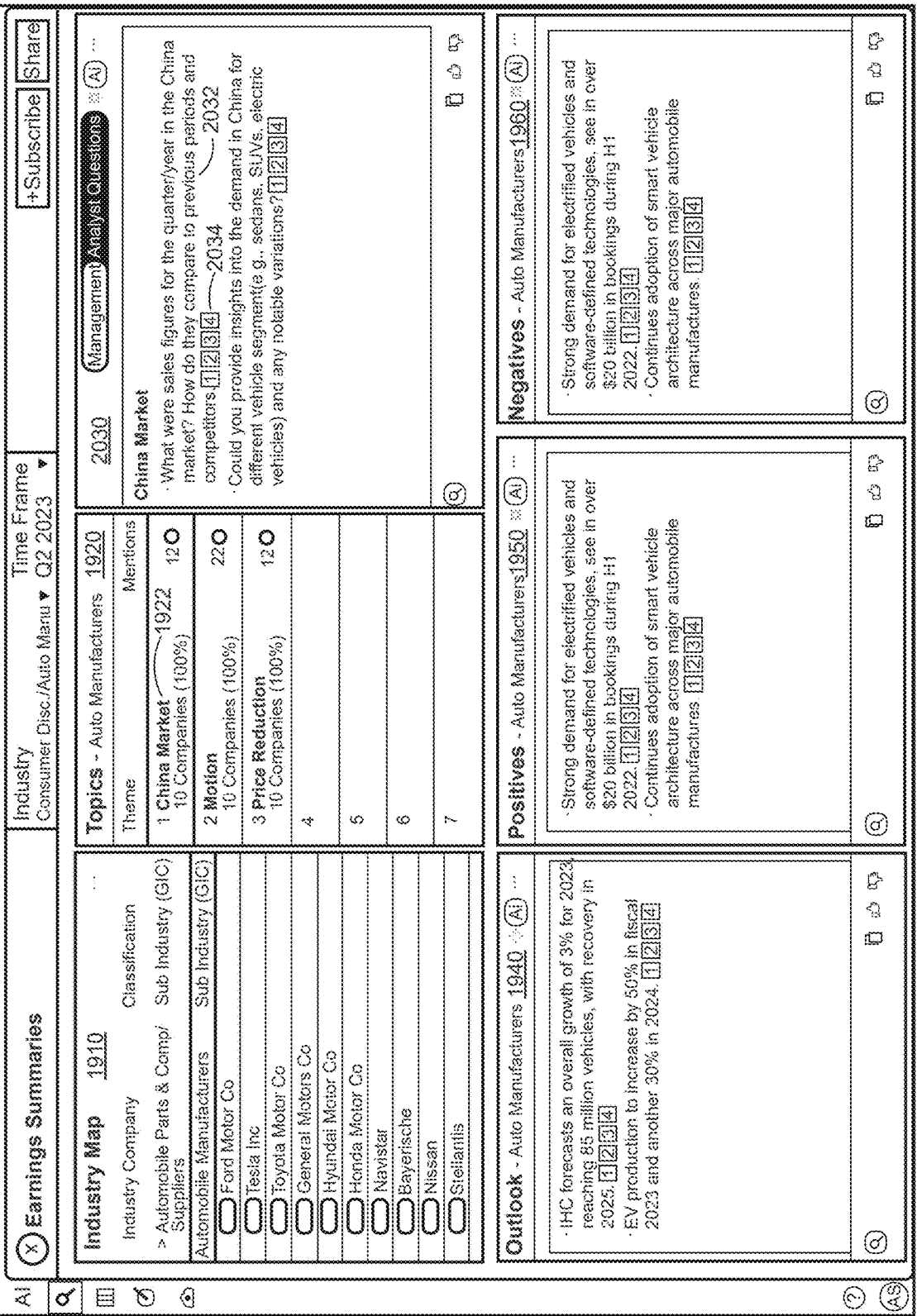

FIG. 20 depicts an example of a user interface providing earnings summaries according to the subject matter disclosed herein.

Figure 21:
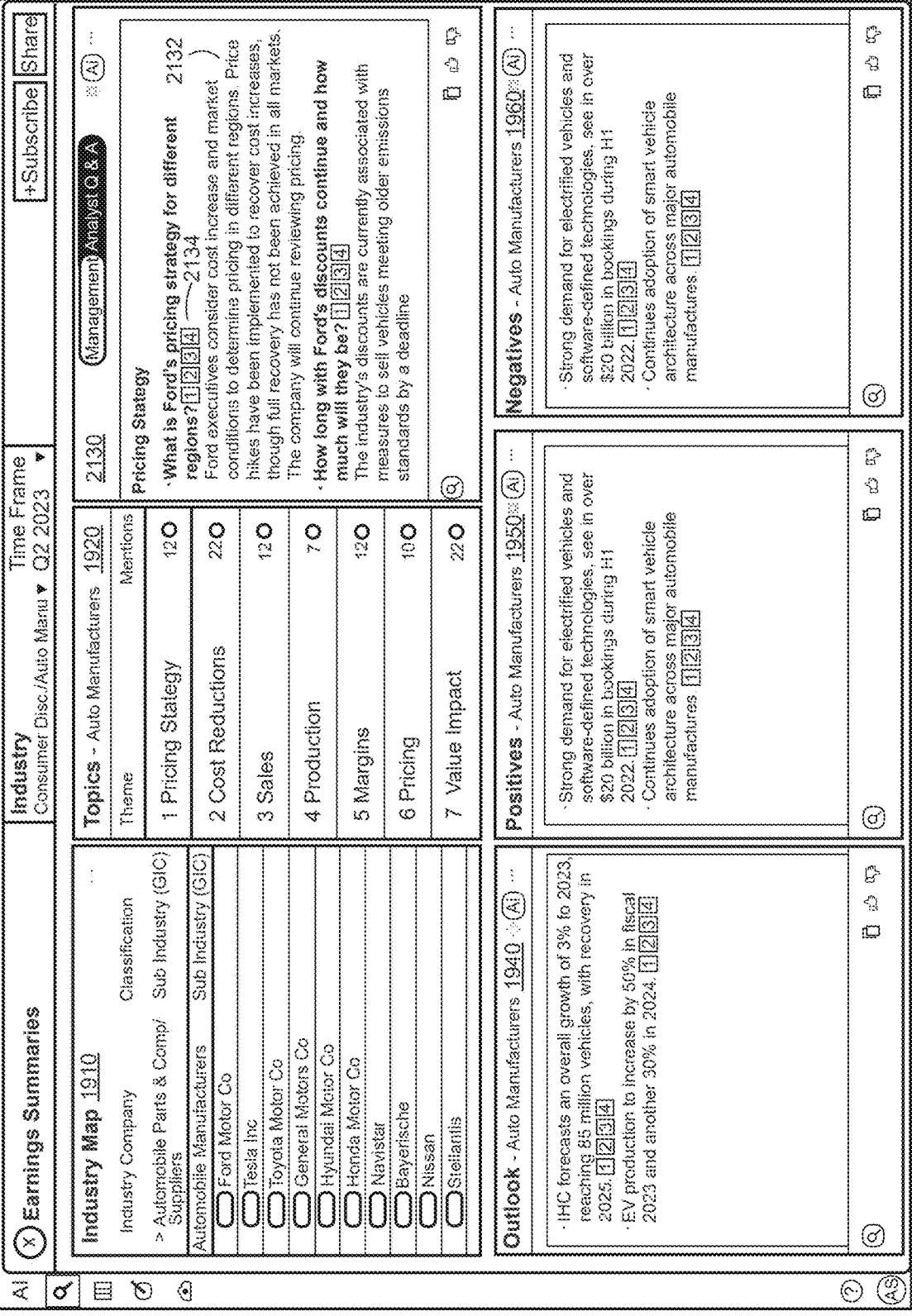

FIG. 21 depicts an example of a user interface providing earnings summaries according to the subject matter disclosed herein.

Figure 22:
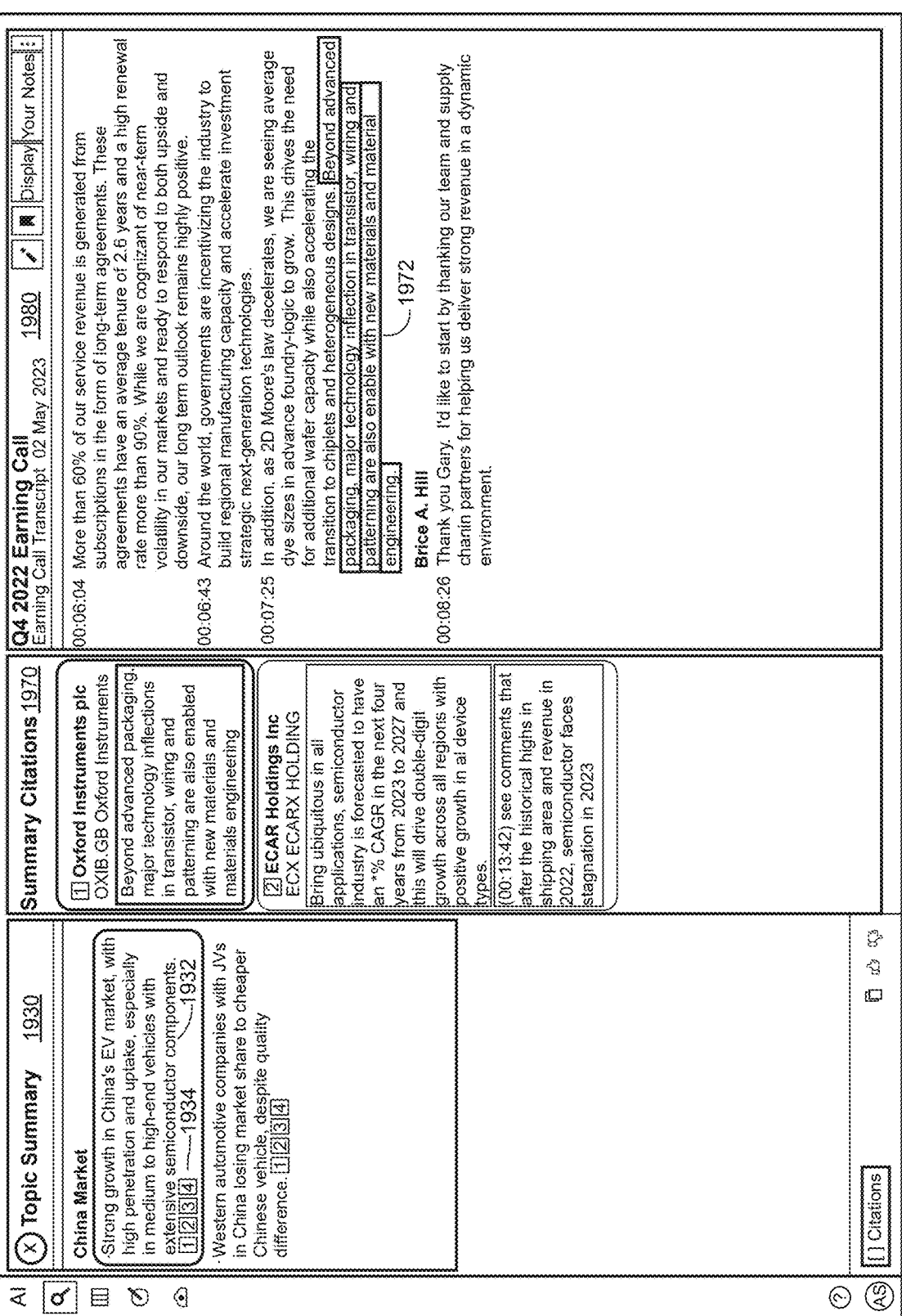

FIG. 22 depicts an example of a user interface providing topic summaries according to the subject matter disclosed herein.

Figure 23:
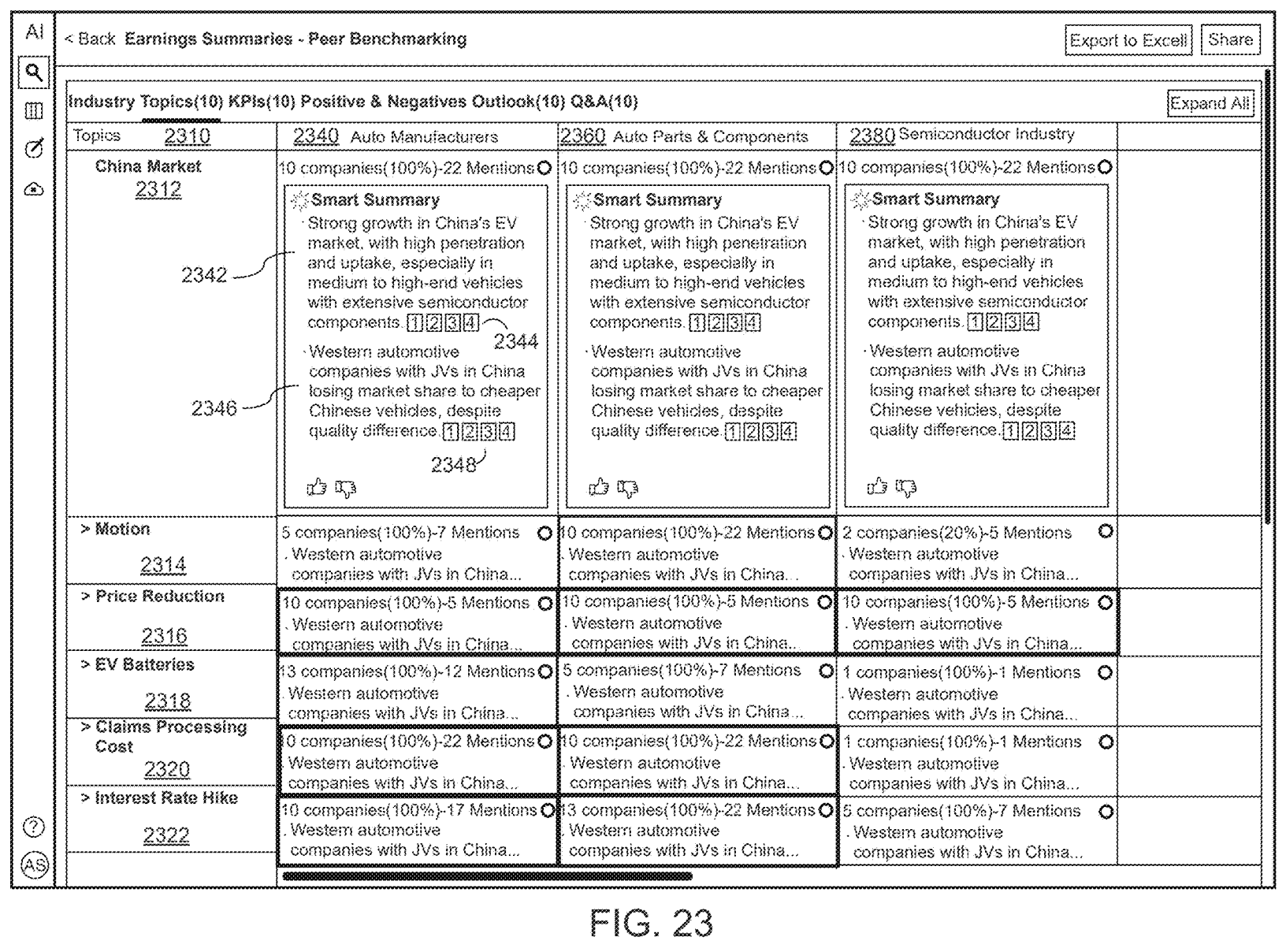

FIG. 23 depicts an example of a user interface providing sector summaries according to the subject matter disclosed herein.

FIG. 24 depicts an example of a multi-pane user interface showing search summaries according to the subject matter disclosed herein.

Figure 25:
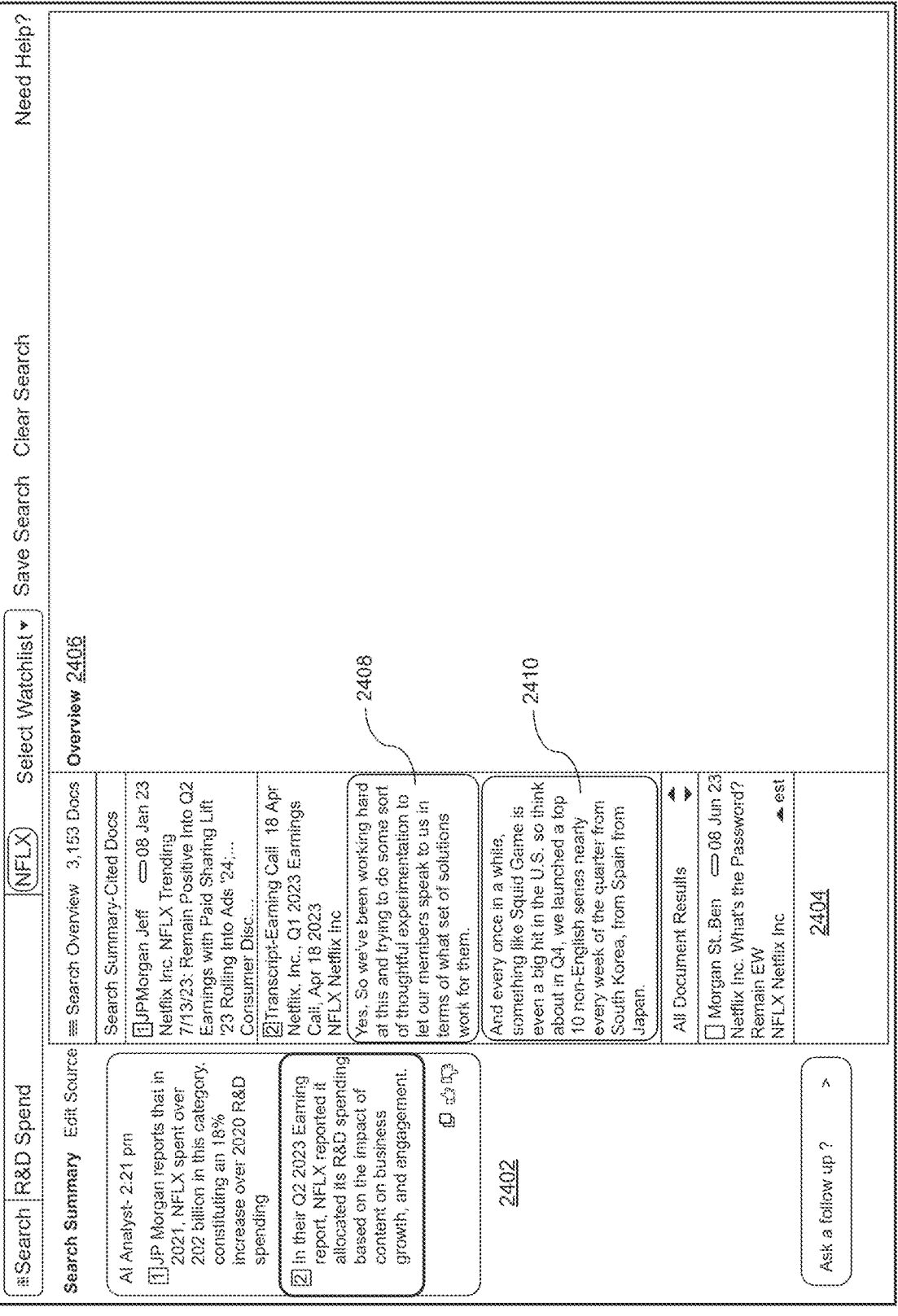

FIG. 25 depicts an example of a multi-pane user interface showing search summaries according to the subject matter disclosed herein.

FIG. 26 depicts an example of a multi-pane user interface showing search summaries according to the subject matter disclosed herein.

Figure 27:
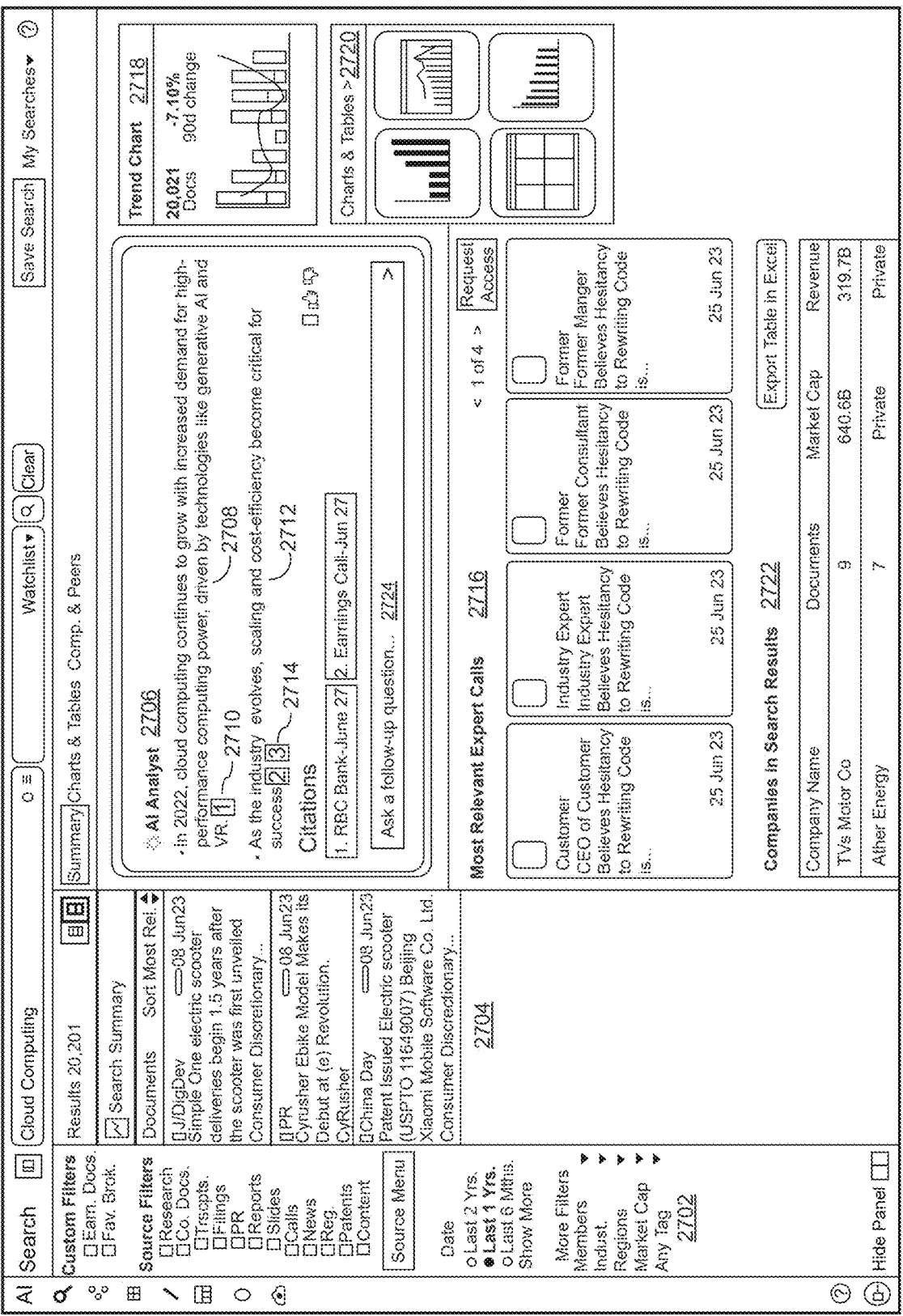

FIG. 27 depicts an example of a multi-pane user interface showing search summaries with an interactive chat-based user interface according to the subject matter disclosed herein.

Figure 28:
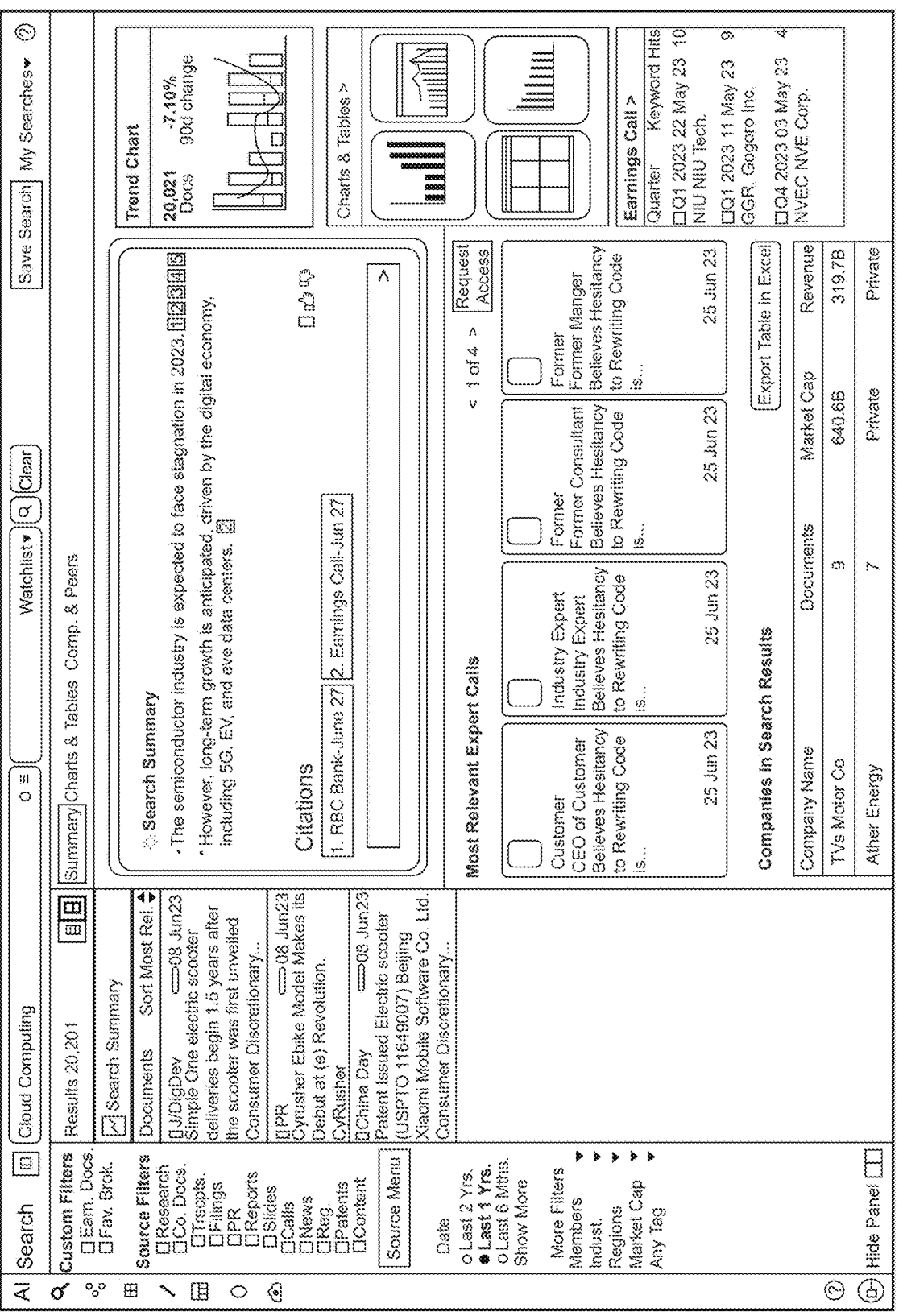

FIG. 28 depicts an example of a multi-pane user interface showing search summaries with an interactive chat-based user interface according to the subject matter disclosed herein.

Figure 29:
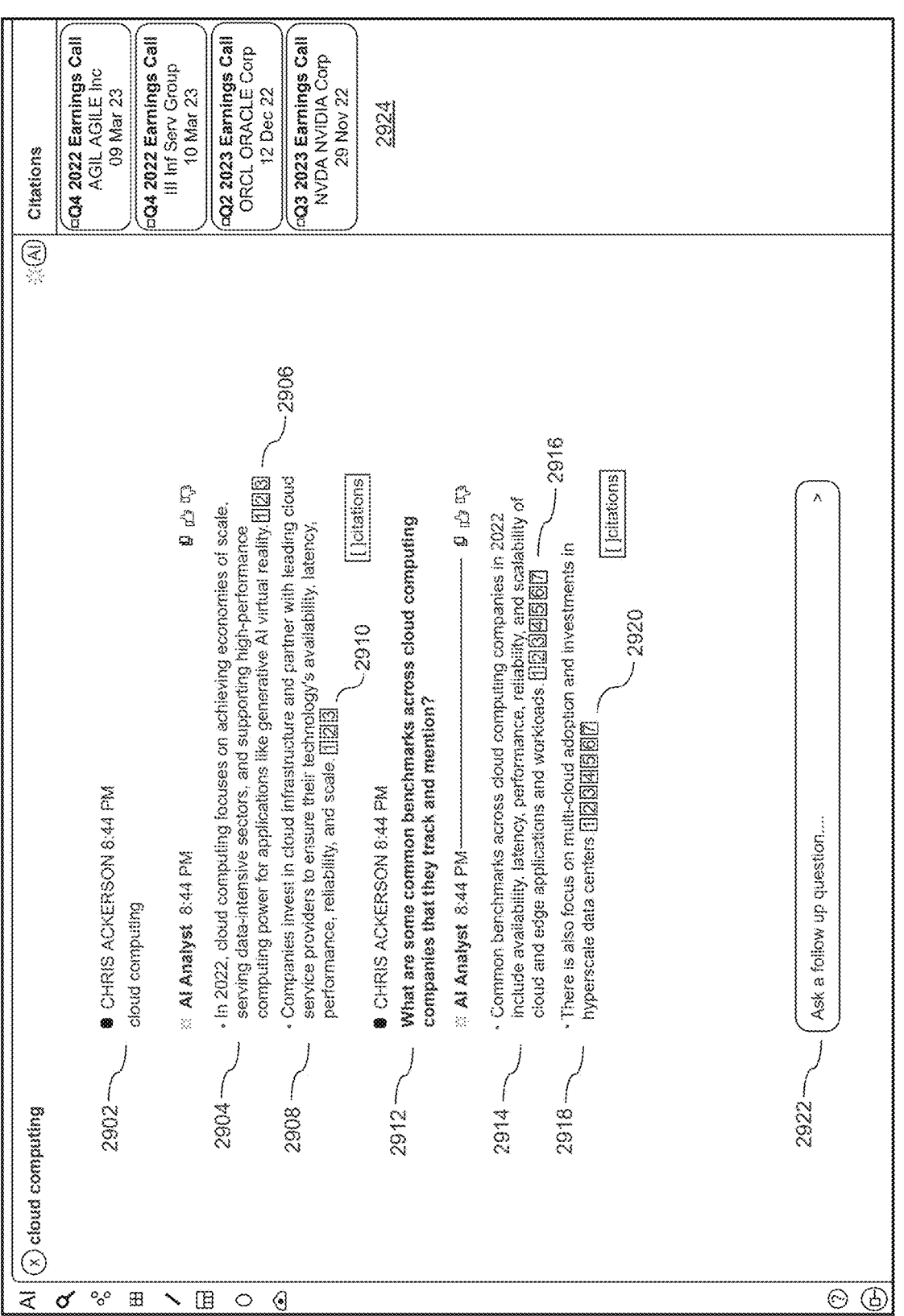

FIG. 29 depicts an example of an interactive chat-based user interface according to the subject matter disclosed herein.

Figure 30:
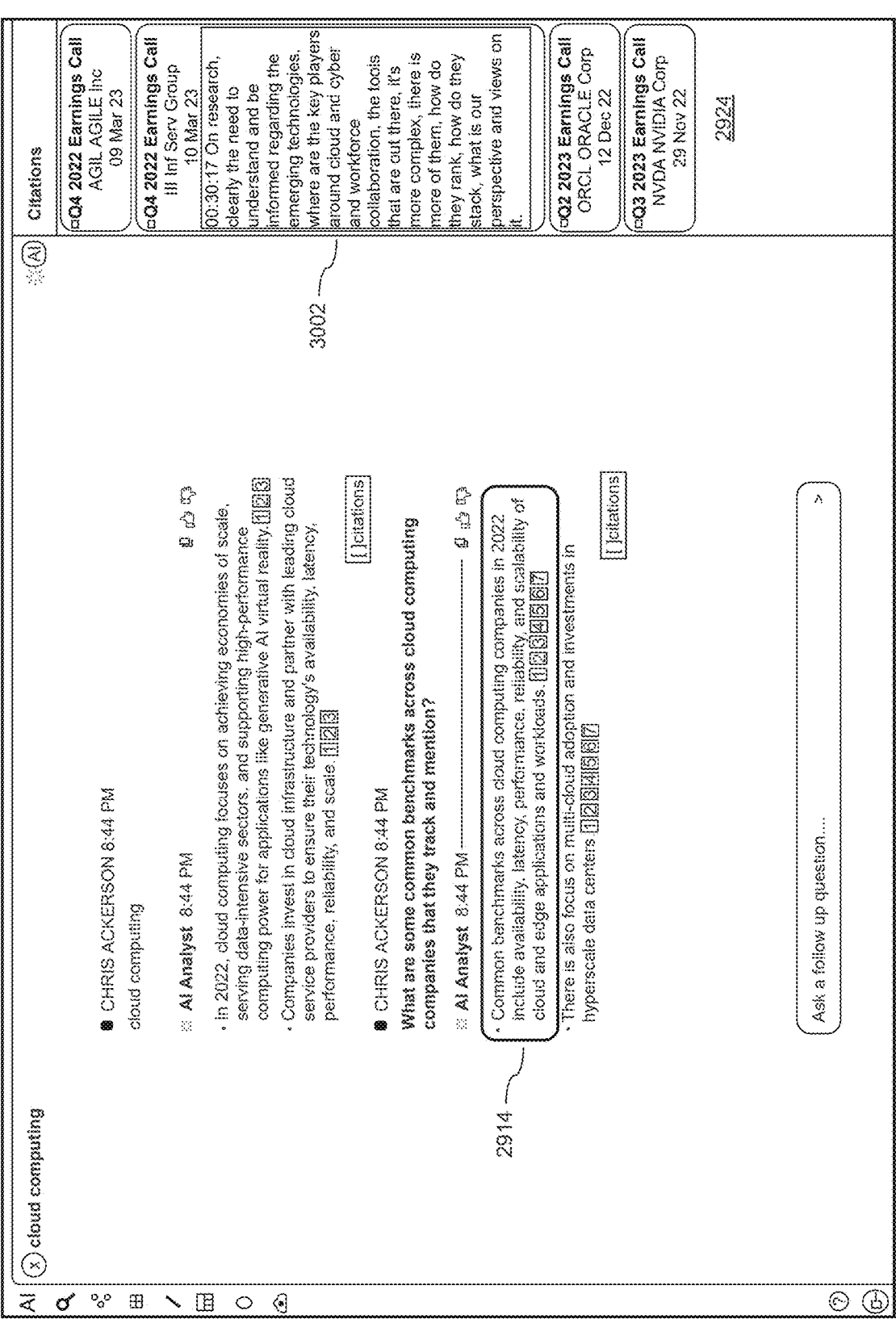

FIG. 30 depicts an example of an interactive chat-based user interface according to the subject matter disclosed herein.

Figure 31:
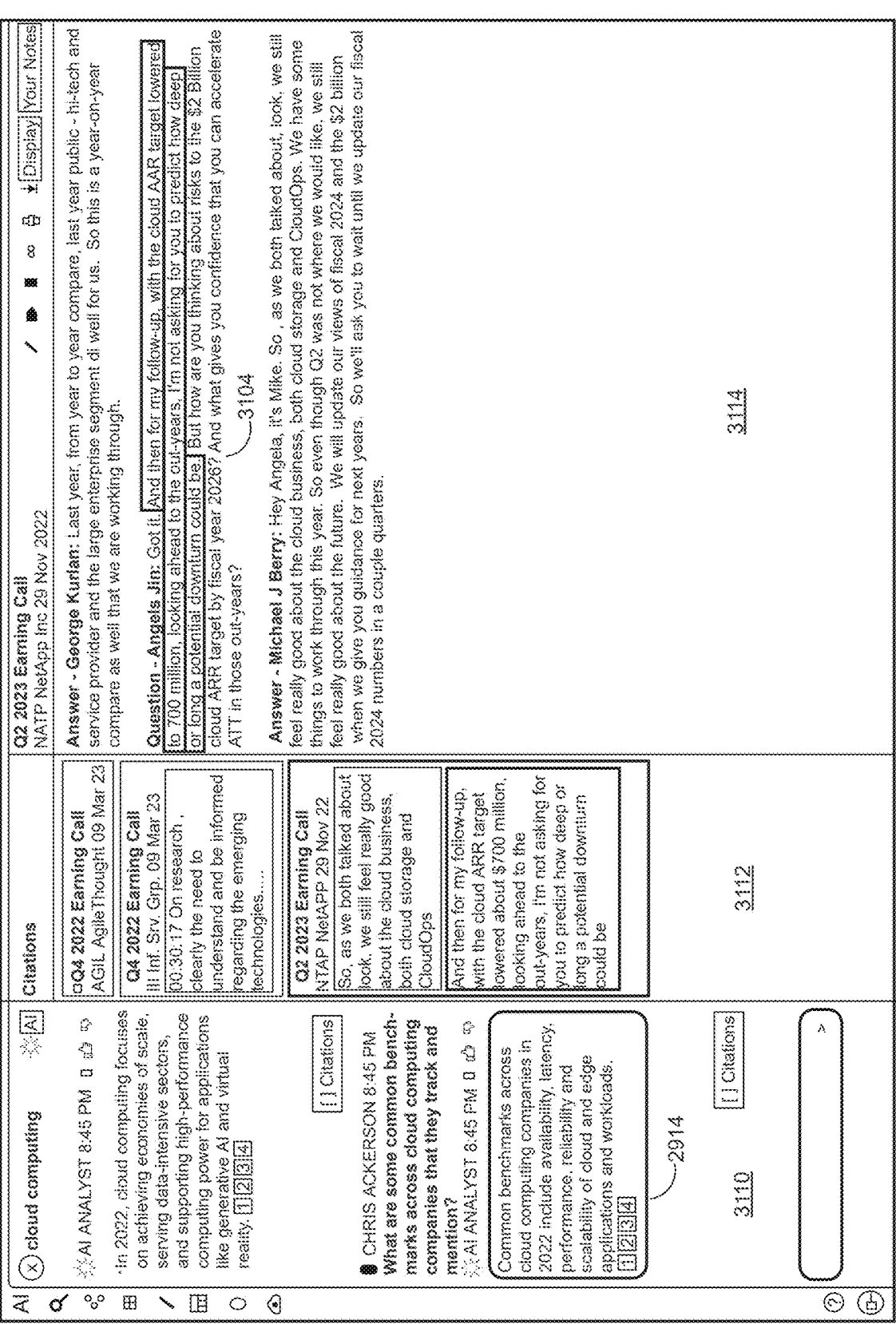

FIG. 31 depicts an example of an interactive chat-based user interface with citations and document sources according to the subject matter disclosed herein.

Figure 32:
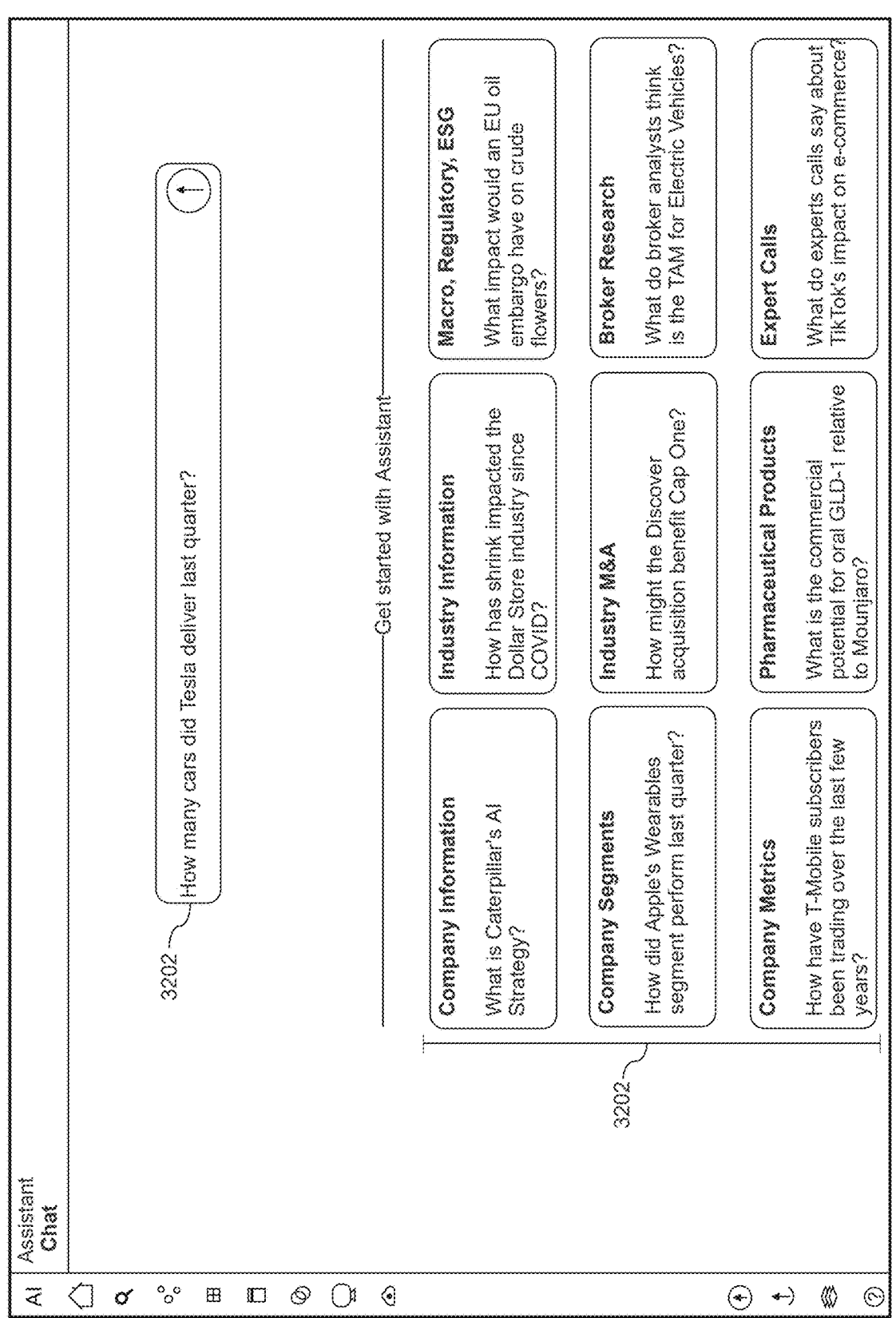

FIG. 32 depicts an example of an interactive chat-based user interface according to the subject matter disclosed herein.

Figure 33A:
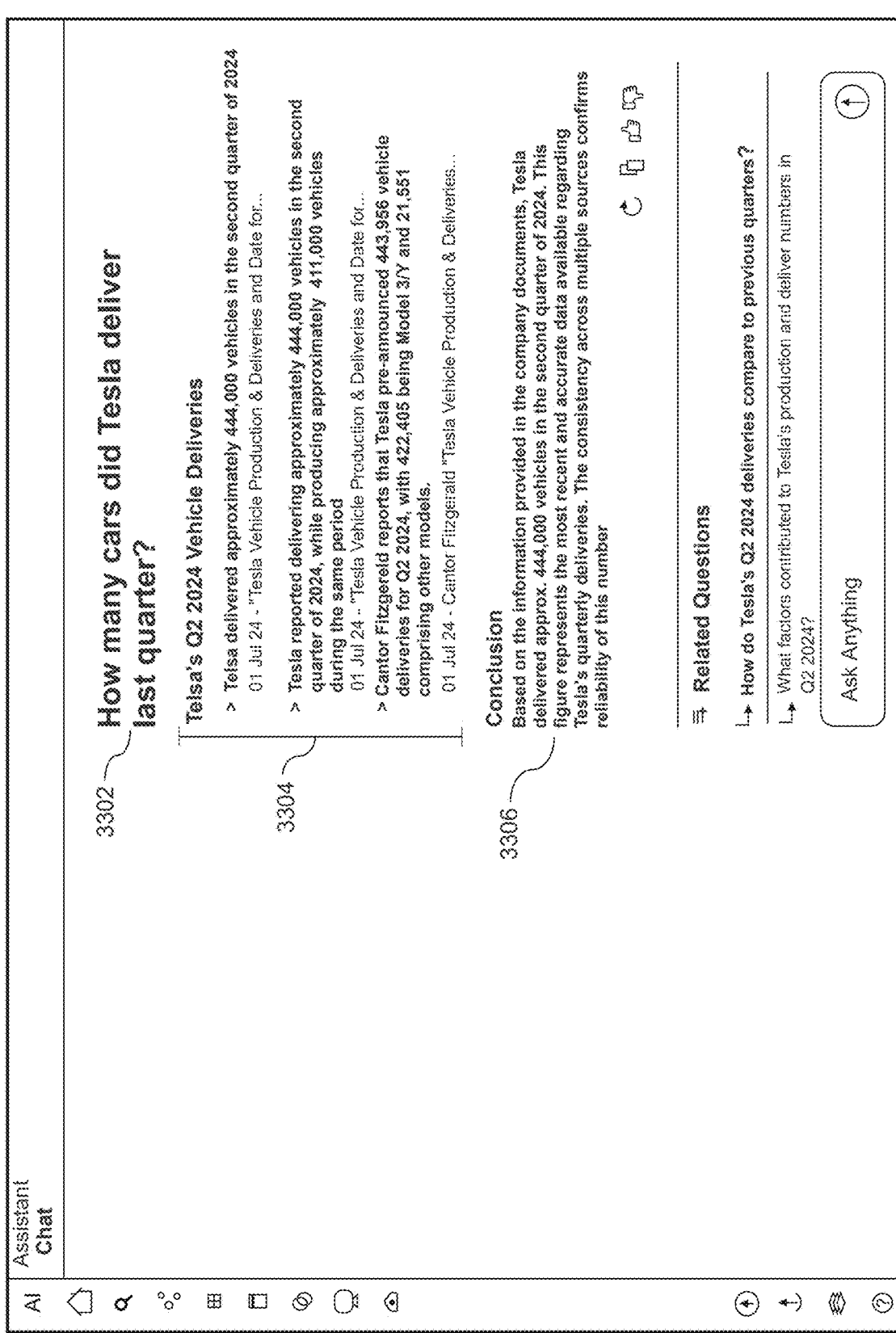
Figure 33B:
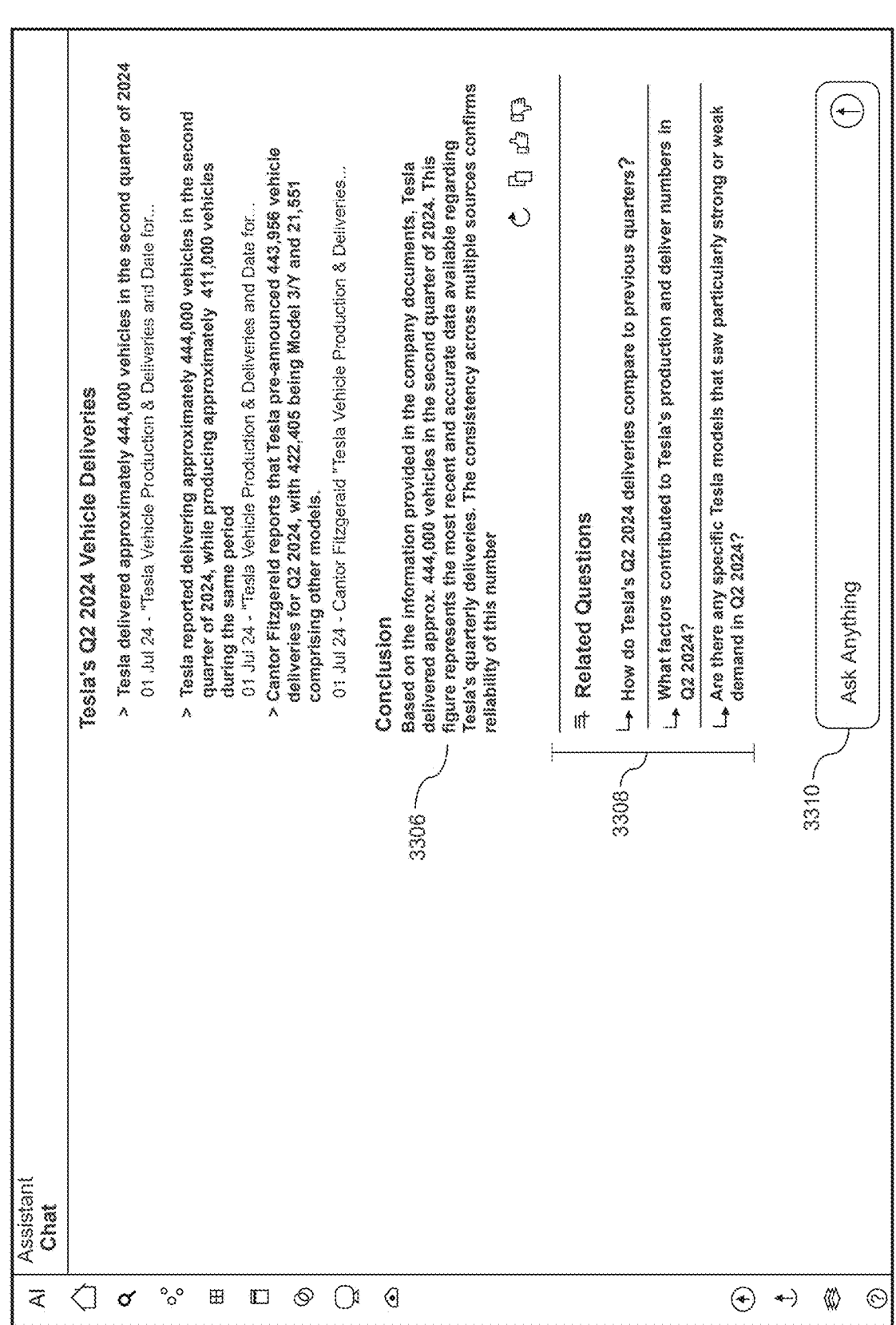
Figure 33C:
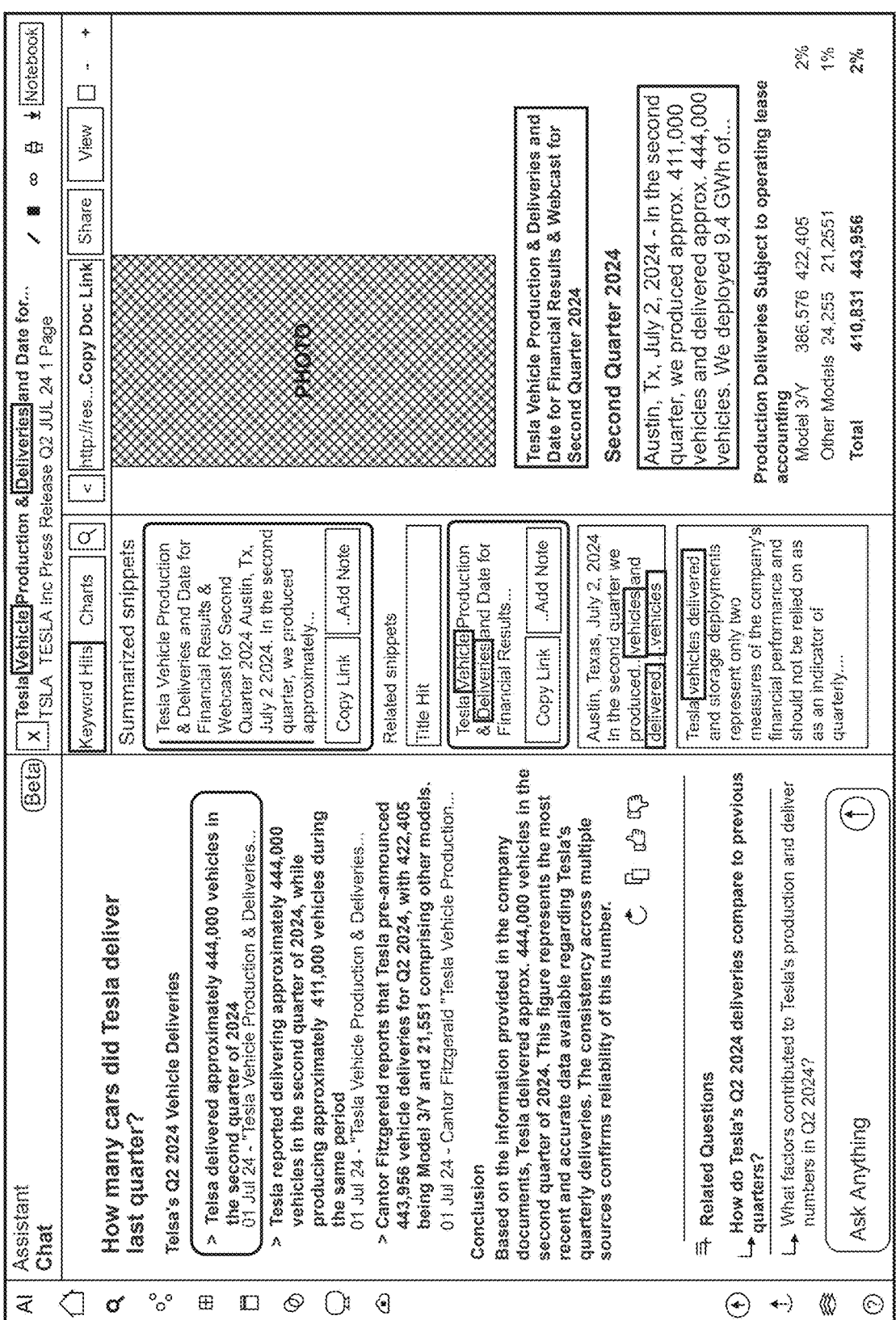
Figure 34A:
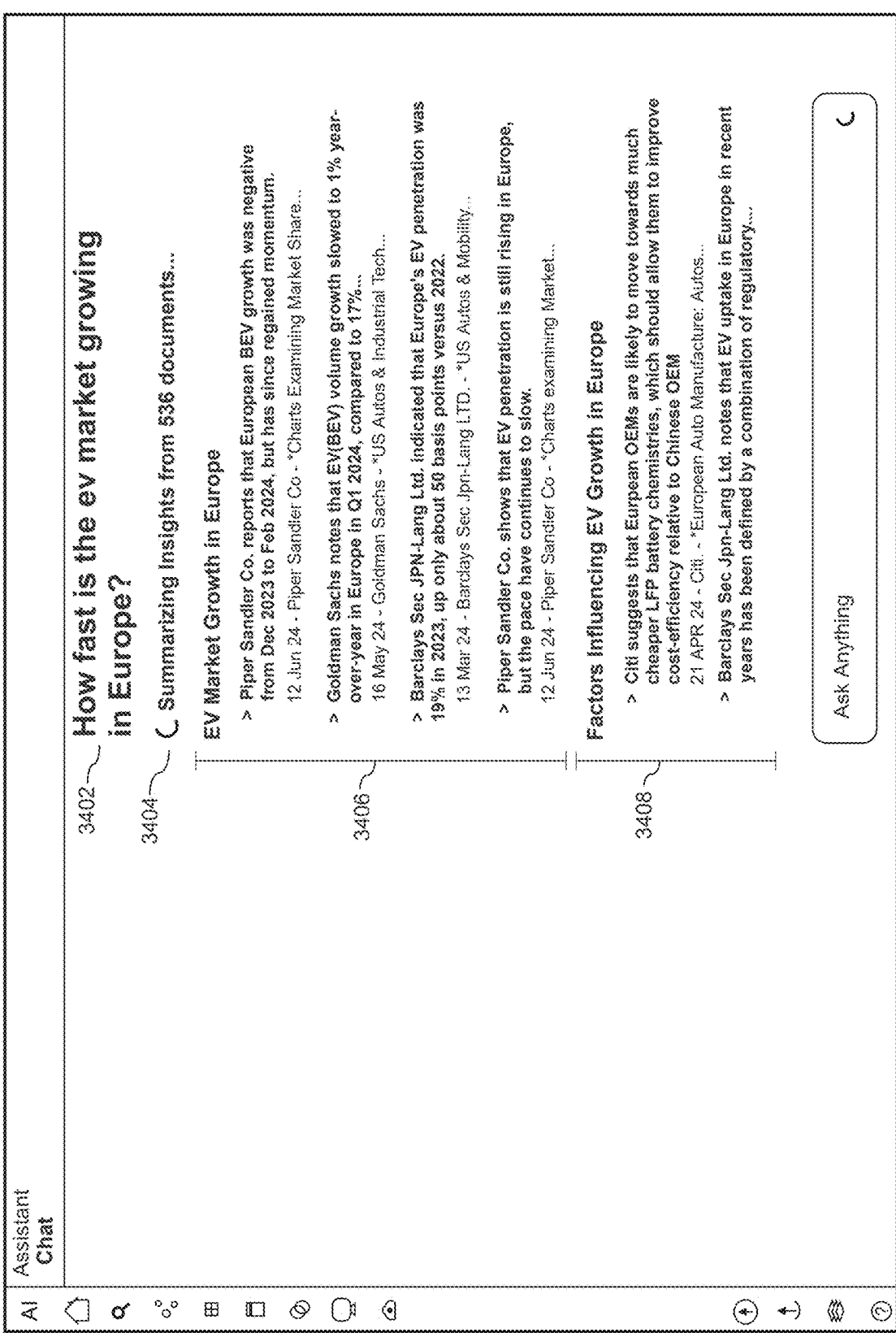
Figure 34B:
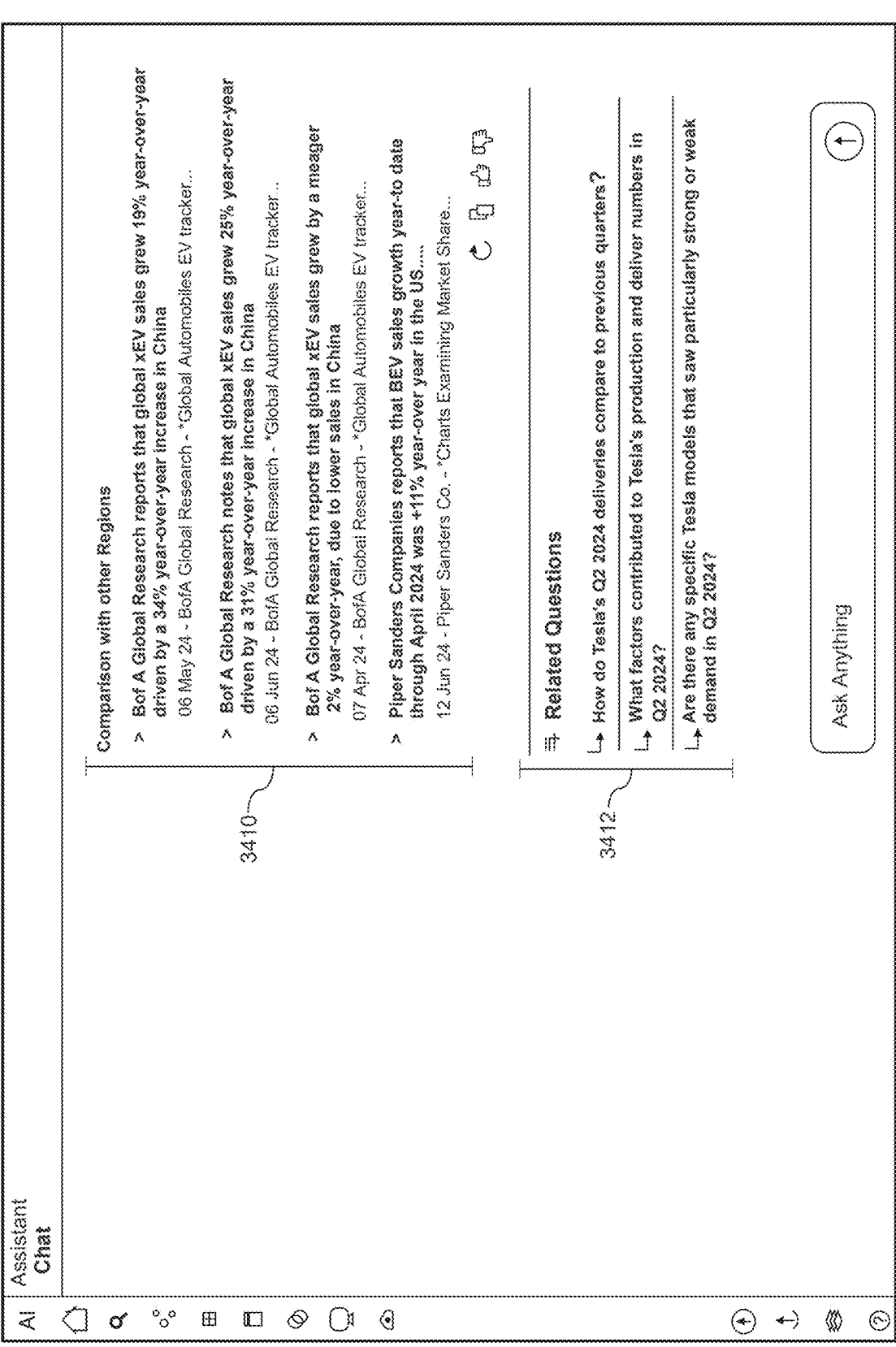

FIGS. 33A-33C depict an example of an interactive chat-based user interface according to the subject matter disclosed herein FIGS. 34A-34B depict an example of an interactive chat-based user interface with citations and document sources according to the subject matter disclosed herein.

FIGS. 35A-35D depict an example of an interactive chat-based user interface performing a comparison across documents according to the subject matter disclosed herein.

Figure 36A:
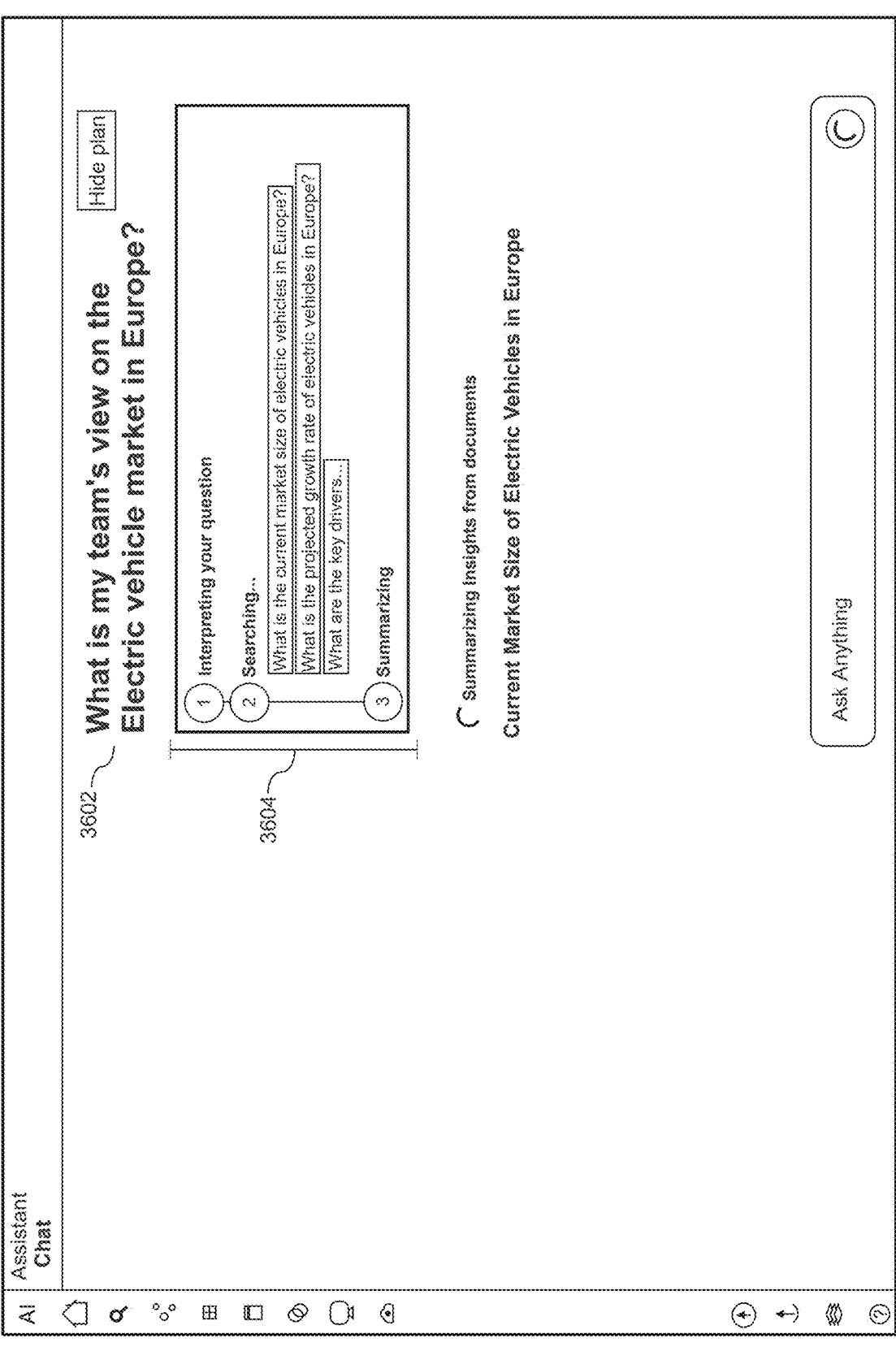
Figure 36B:
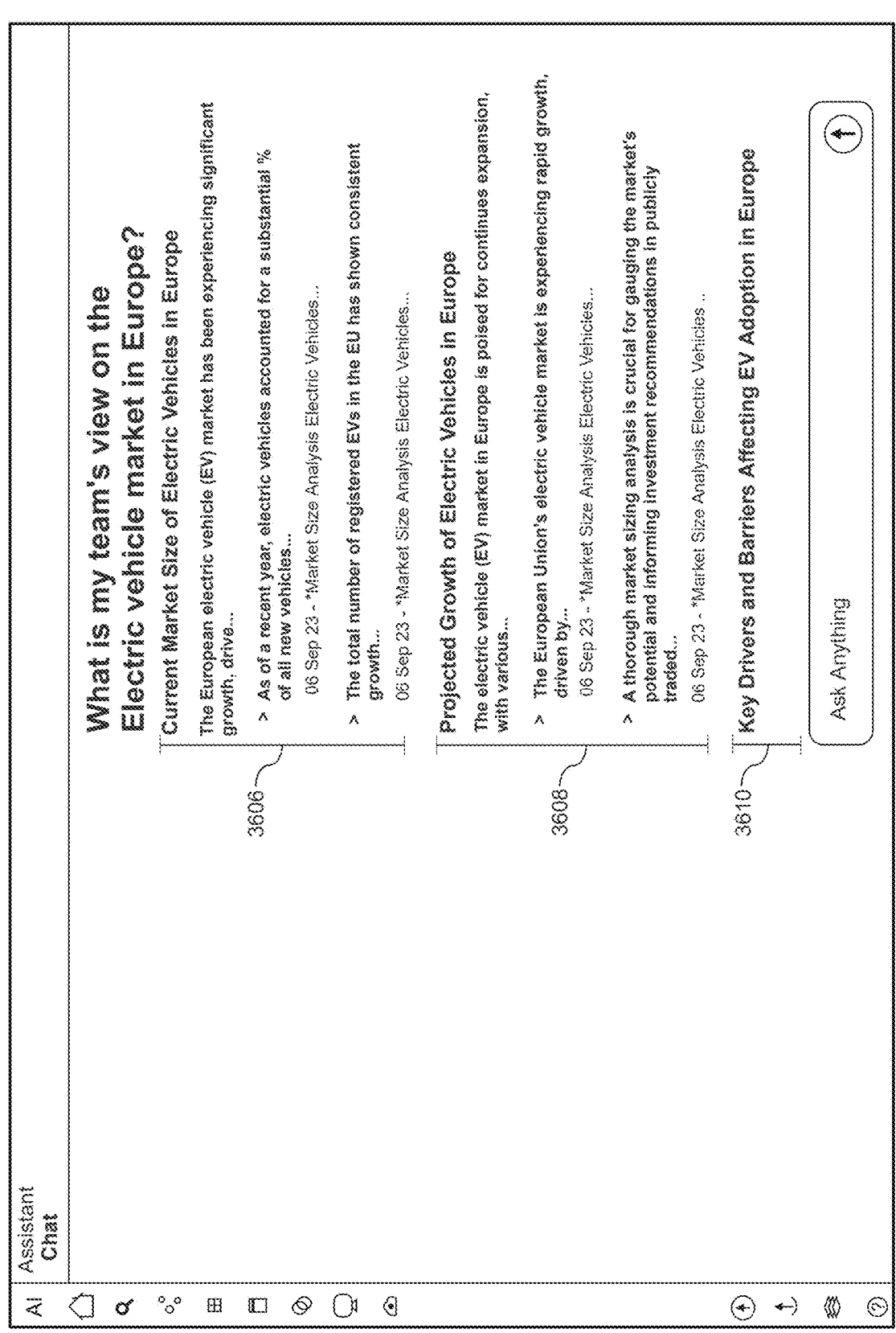
Figure 36C:
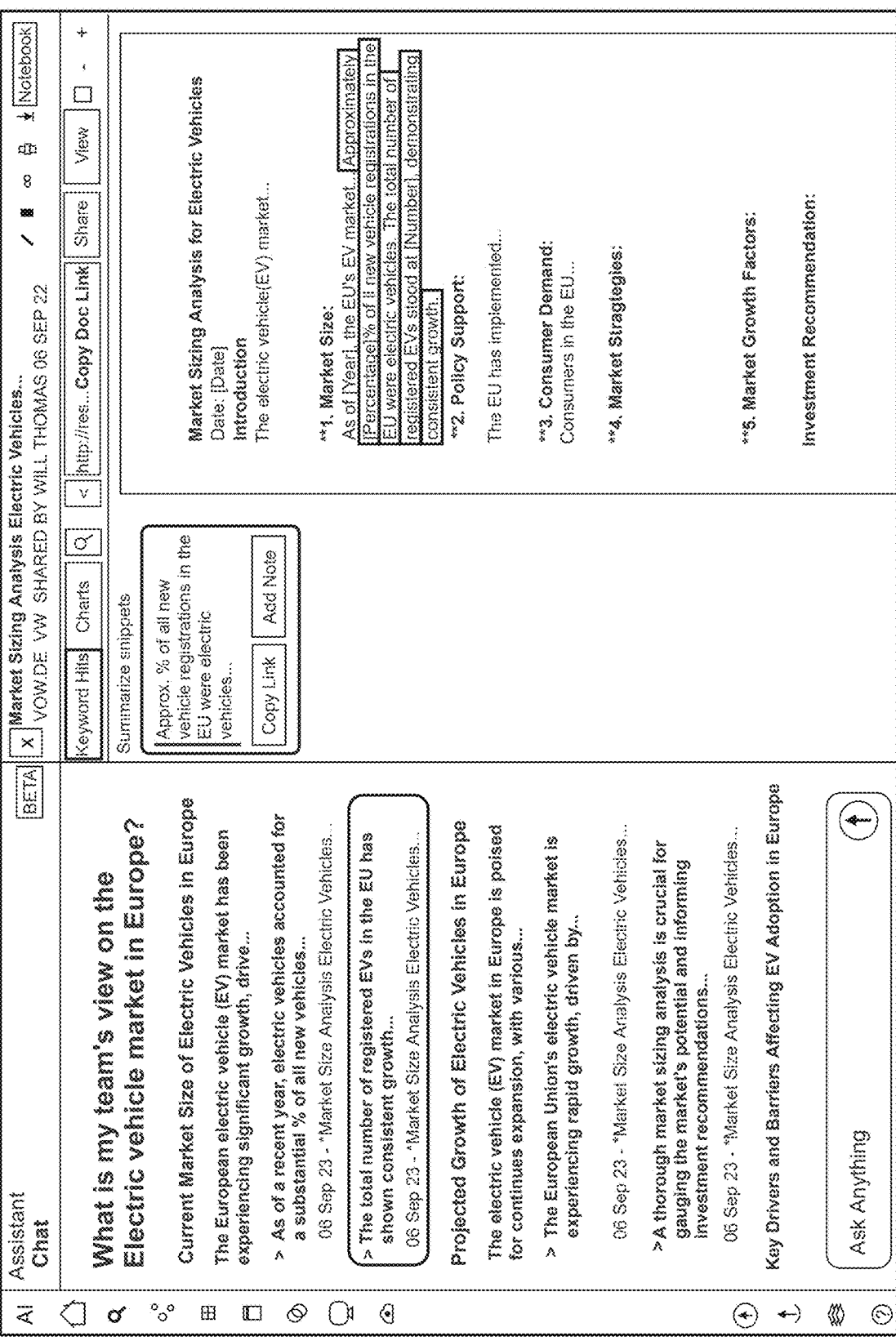

FIG. 36A-36C depict an example of an interactive chat-based user interface using private enterprise documents according to the subject matter disclosed herein.

Figure 37A:
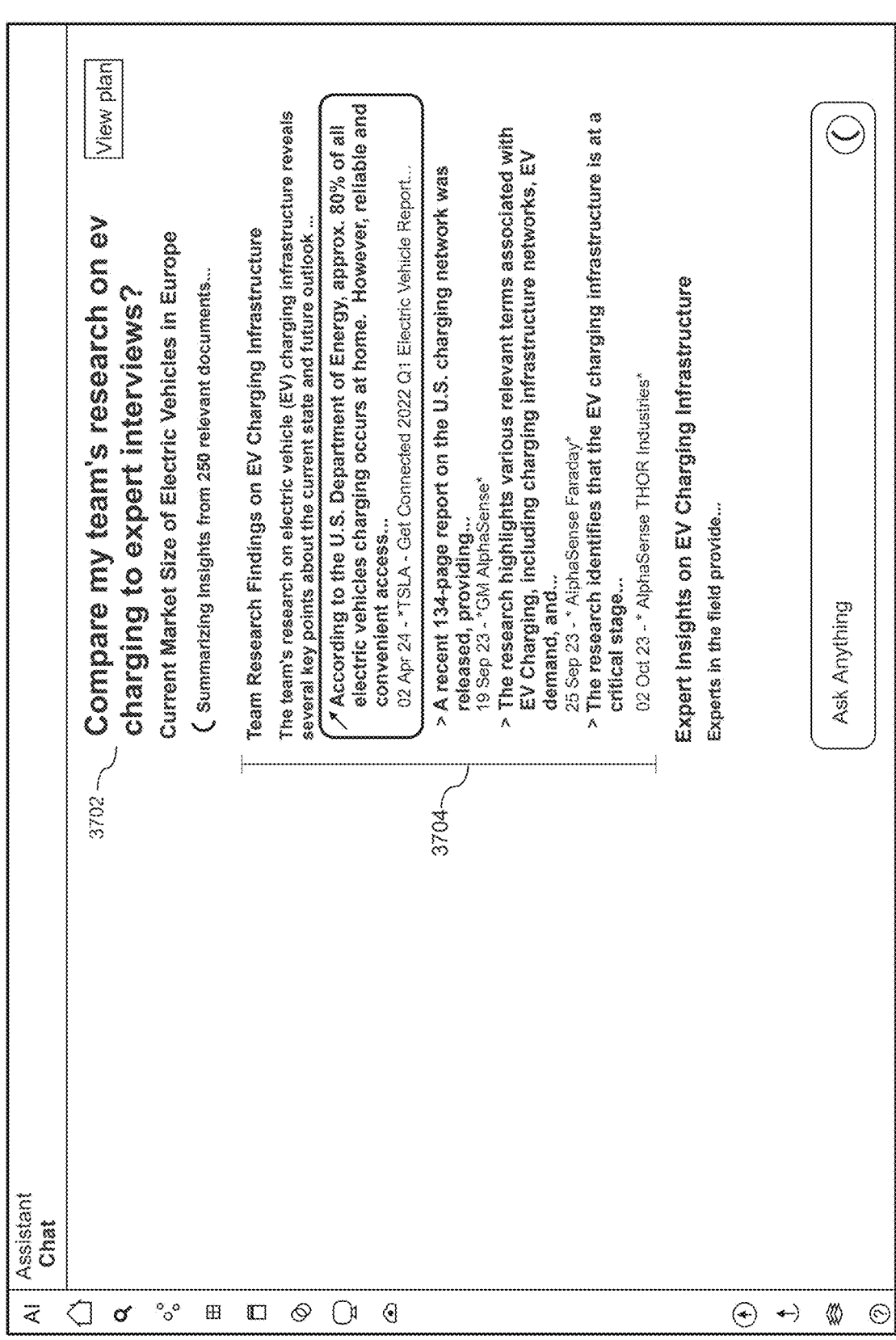
Figure 37B:
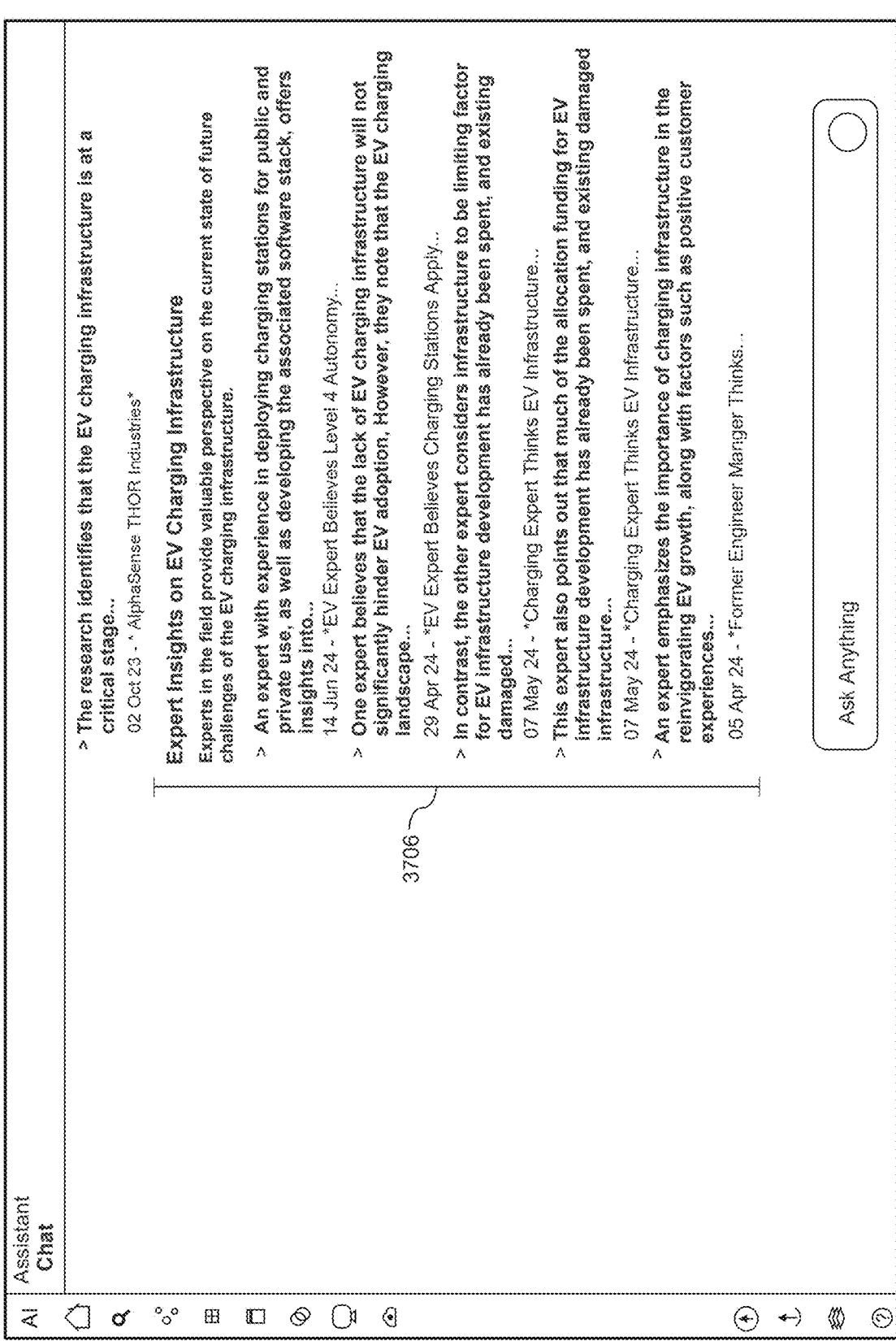

FIG. 37A-37C depict an example of an interactive chat-based user interface performing a comparison between private enterprise documents and public documents according to the subject matter disclosed herein.

FIG. 38A depicts a process flow for creating a workflow agent according to the subject matter disclosed herein.

Figure 38B:
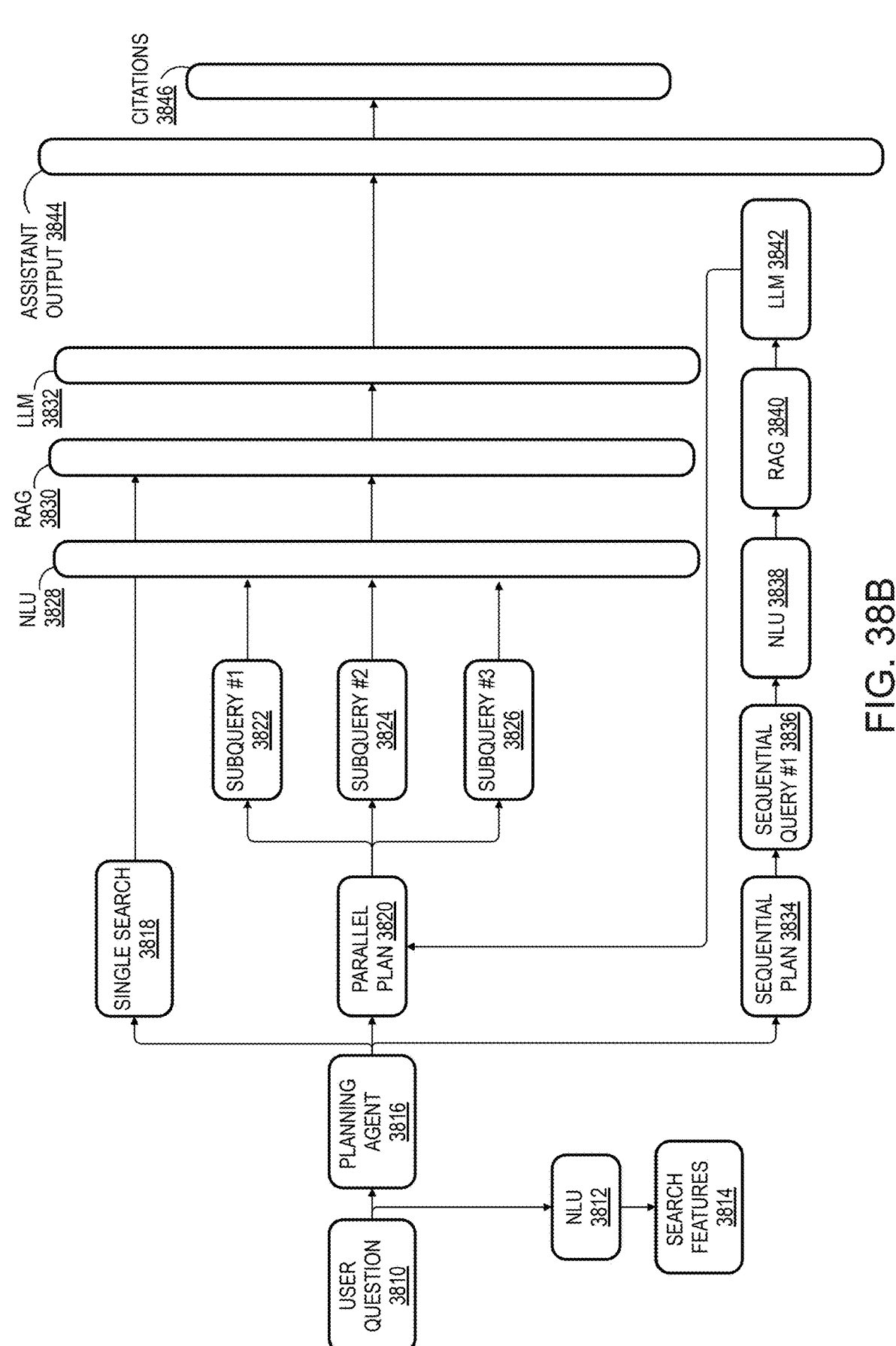

FIG. 38B depicts a process flow for a workflow planning agent according to the subject matter disclosed herein.

Figure 38C:
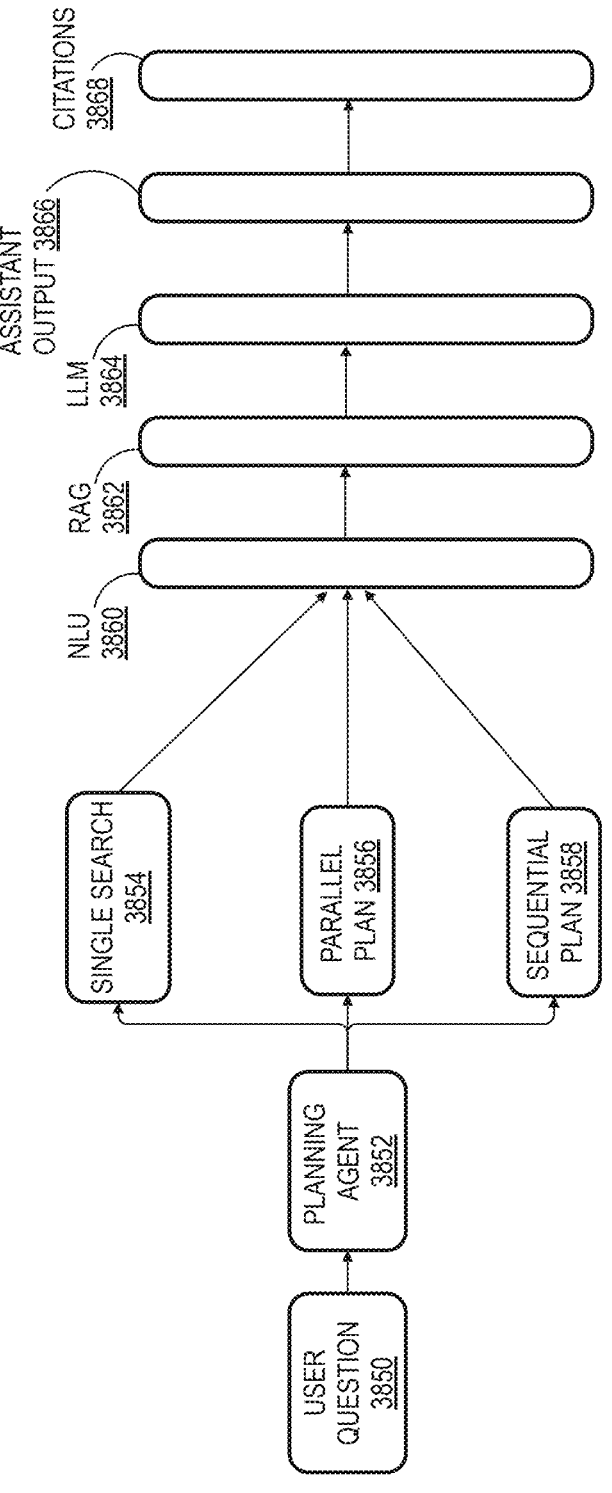

FIG. 38C depicts a process flow for a workflow planning agent according to the subject matter disclosed herein.

Figure 39:
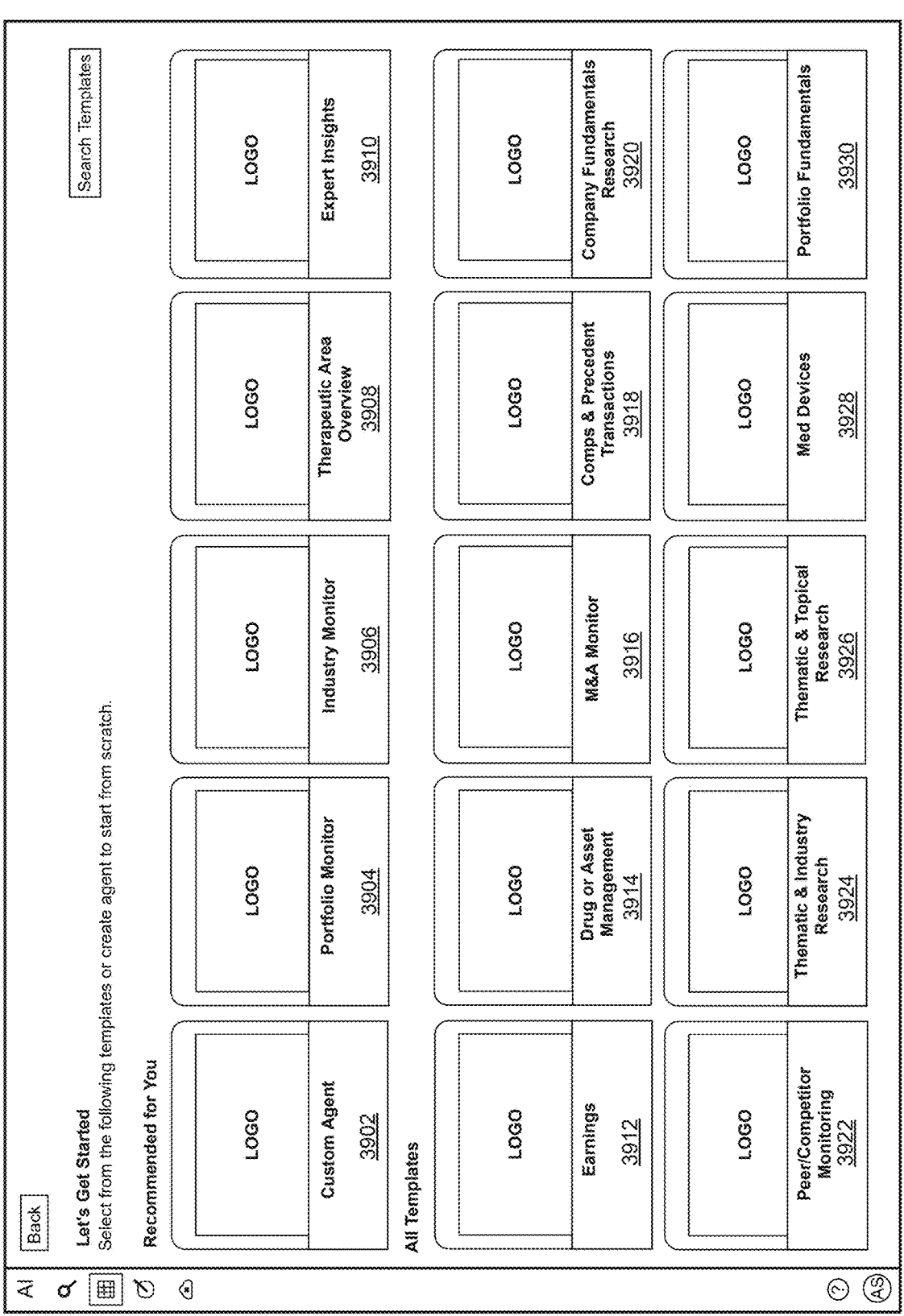

FIG. 39 depicts examples of templates for creating workflow agents according to the subject matter disclosed herein.

FIG. 40A depicts a user interface for managing a workflow agent according to the subject matter disclosed herein.

Figure 40B:
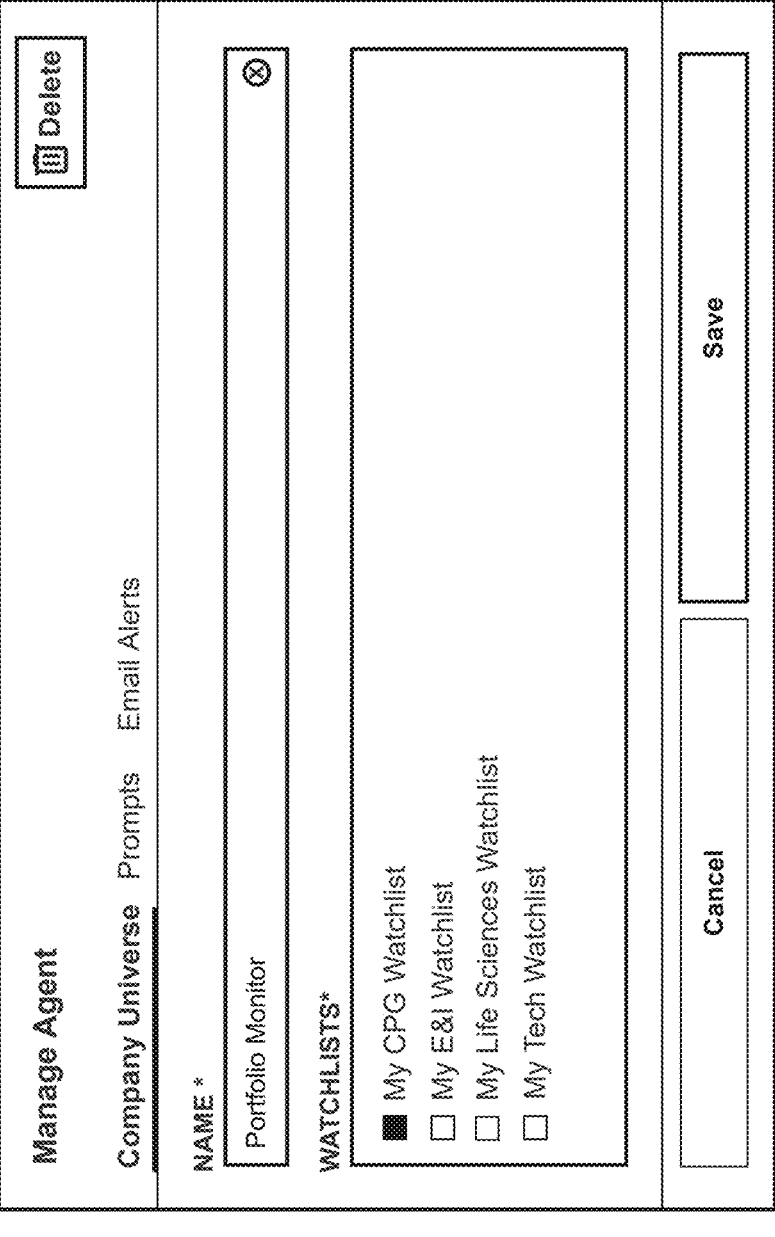

FIG. 40B depicts a user interface for managing a workflow agent according to the subject matter disclosed herein.

FIG. 40C depicts a user interface for managing prompts of a workflow agent according to the subject matter disclosed herein.

Figure 40D:
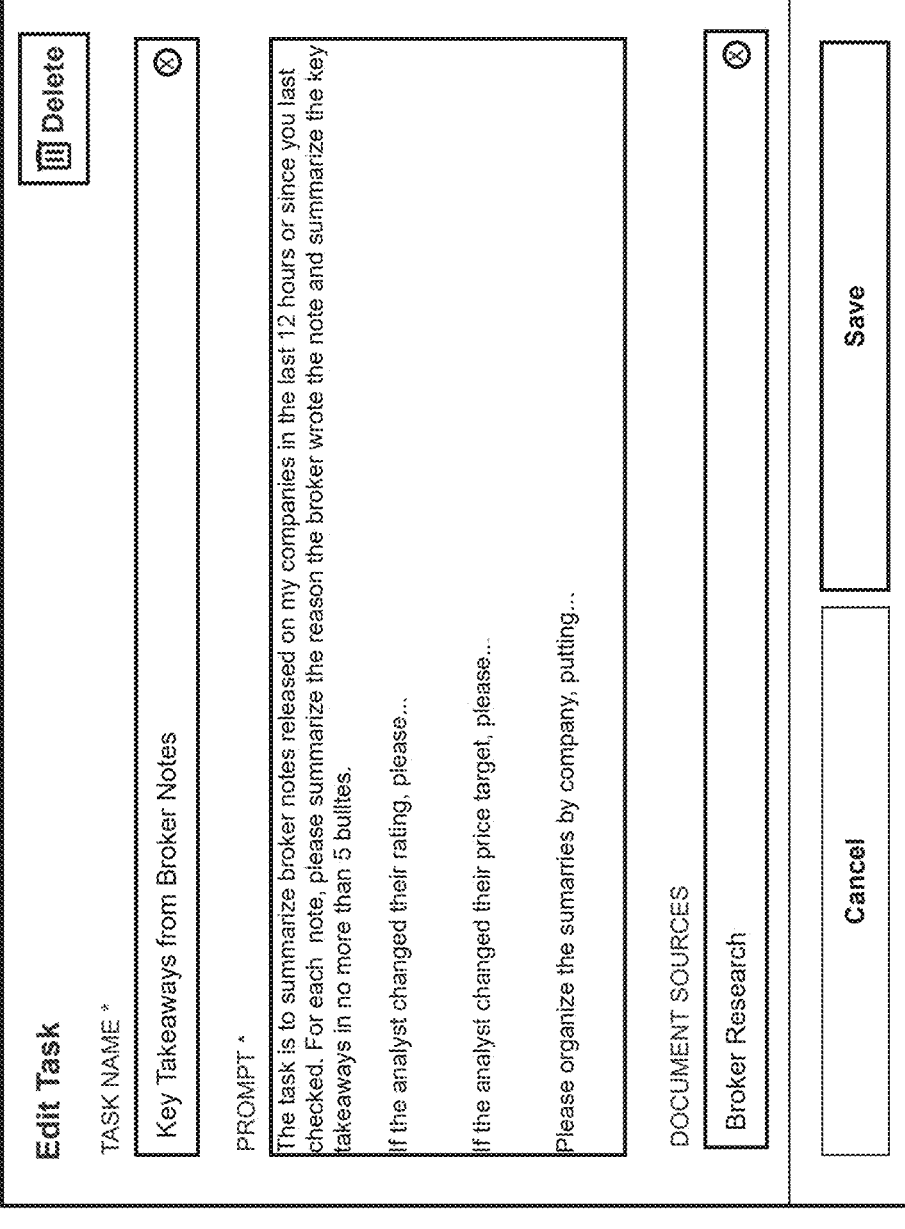

FIG. 40D depicts a user interface for managing prompts of a workflow agent according to the subject matter disclosed herein.

FIG. 40E depicts a user interface for managing notifications of a workflow agent according to the subject matter disclosed herein.

FIG. 40F depicts a user interface for managing notifications of a workflow agent according to the subject matter disclosed herein.

FIG. 40G depicts an example of a notification from a workflow agent according to the subject matter disclosed herein.

Figure 41A:
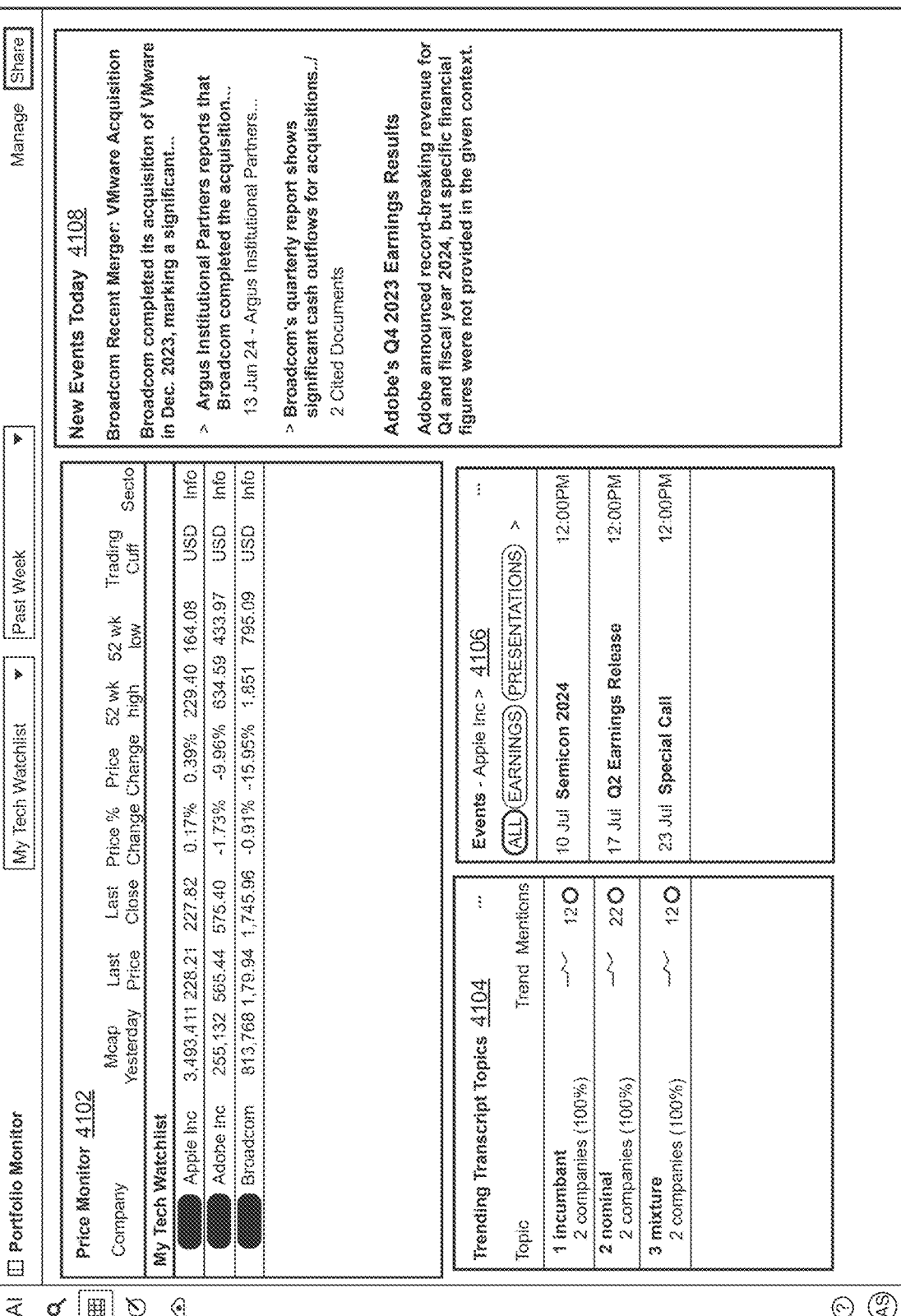

FIGS. 41A-41B depict an example of a user interface dashboard according to the subject matter disclosed herein.

Figure 42:
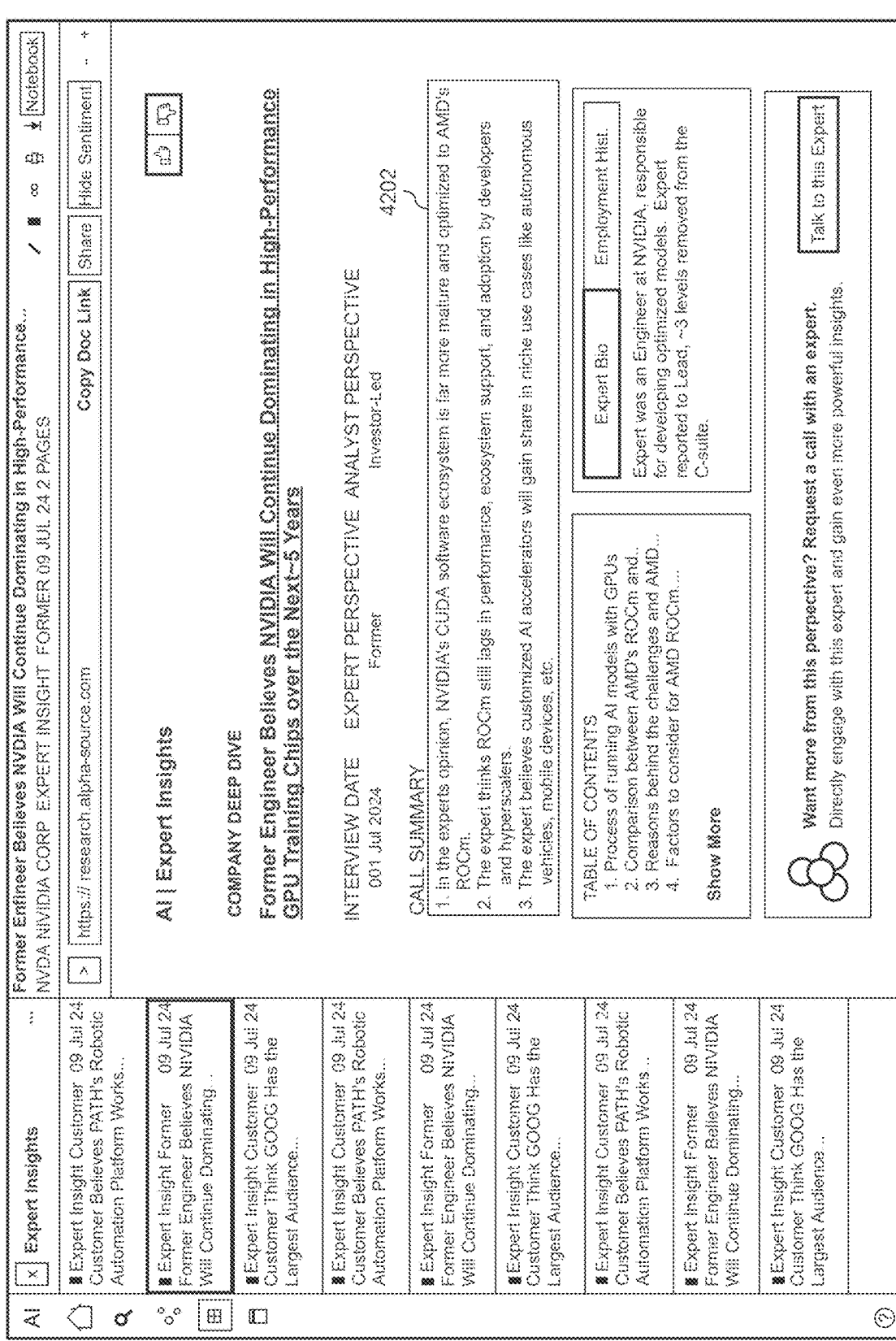

FIG. 42 depicts an example of a user interface according to the subject matter disclosed herein.

Figure 43:
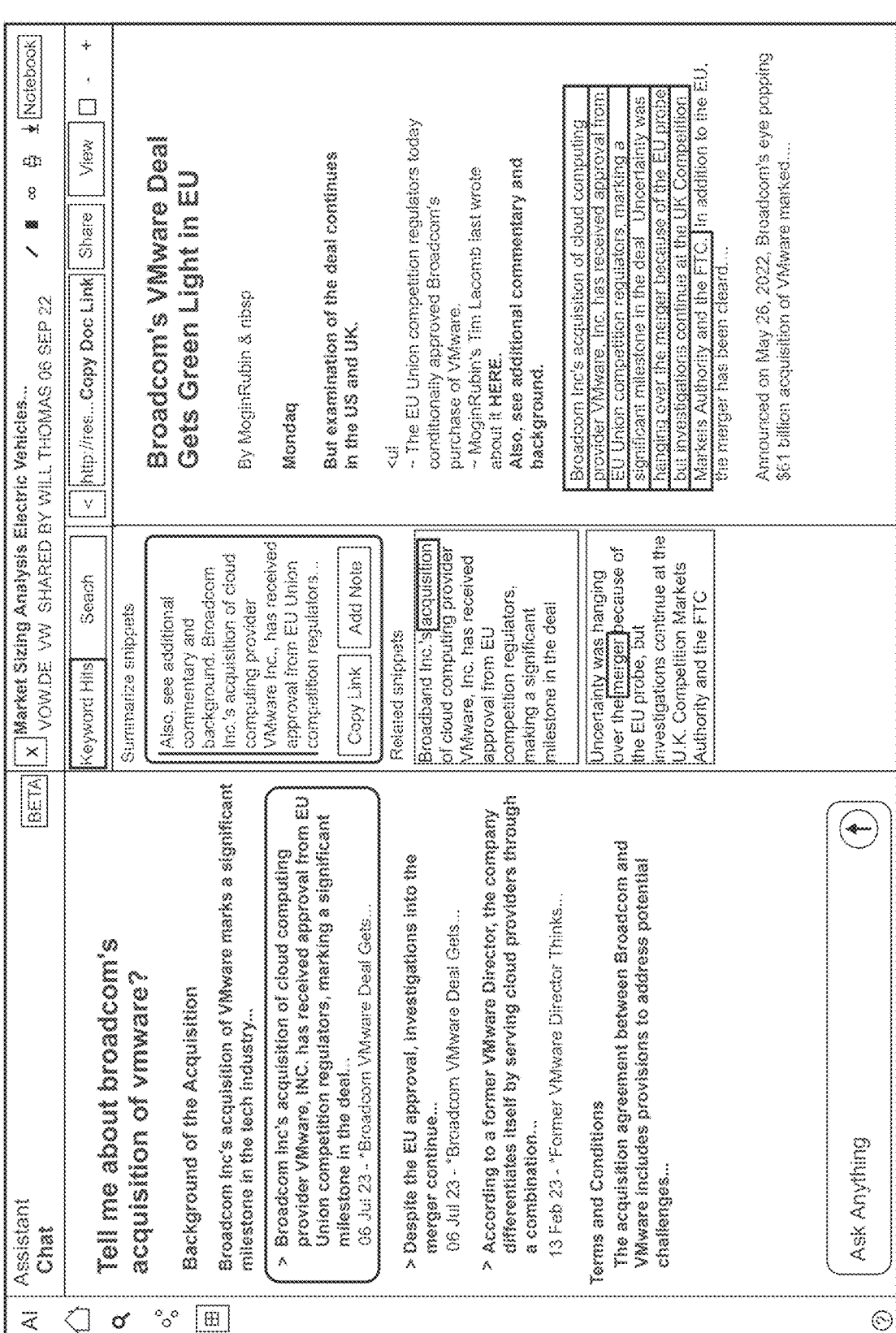

FIG. 43 depicts an example of a user interface according to the subject matter disclosed herein.

DETAILED DESCRIPTION

The disclosure is applicable to a web-based client-server architecture that uses artificial intelligence (AI), machine learning, reinforcement learning, natural language processing, retrieval augmented generation, and/or large-language models (LLMs) (e.g., generative AI) to analyze and summarize documents to provide market intelligence related to the financial industry, and it is in this context that the disclosure will be described. As used herein, market intelligence refers to the information on an industry or market segment that informs strategy with the goal that it gives a company a competitive advantage. The subject matter disclosed herein provides an AI-powered search engine for market intelligence. This allows for real-time or near-real-time synthetization of financial documents and information based on an individual user's needs. It will be appreciated, however, that the systems and methods in accordance with the disclosure provided herein have much greater utility since they can be used for summarizing documents in other industries or with other types of pieces of content (such as the legal industry and legal documents, the medical industry and medical documents, etc.) and the system can be implemented using other computer system architectures and the system is not limited to any particular computer architecture.

For illustration purposes, the summarization system and method implemented in the financial industry is now described in more detail.

The subject matter described herein includes a market intelligence platform for searching financial documents to identify relevant documents and/or relevant snippets of text within the documents, and to generate summaries of those documents. The identified snippets of text may be characterized within the documents, and, in some embodiments, the snippets of text may be used to identify particular documents to summarize using one or more trained AI models. The summaries of the individual documents may then be fed into one or more AI models for creating summaries across multiple companies, sectors, industries, peer groups, and the like.

The systems and methods are configured to perform a document search across a collection of documents in one or more electronic data sources, in the financial domain, over time, guided by concepts, topics, and/or trends identified by one or more AI models. The document search may be performed using natural-language processing, textual search, semantic search, vector search, or the like. In one embodiment, the subject matter described herein (a) recognizes semantically defined unique and recurring scenarios within the textual material, consisting of a partial or whole sentence or multiple sentences, (b) analyzes and classifies each scenario based on tense recognizing linguistic rules and natural language processing techniques, (c) analyzes sentiment and subjectivity to determine if the scenario is objective or subjective, (d) determines the polarity and strength of sentiment relative to the company associated with the textual information and the likely impact on the company's performance, its stock price or the price of its other securities; (e) provides a human-like chat interface to allow users to query information about one or more companies or industries in a conversational manner; (f) generates summaries of one or more companies; (g) generates summaries of one or more industries or sectors; (h) generates summaries of earnings calls, which include identification of questions and corresponding answers; (i) generates summaries comparing companies or industries to one another; (j) generates summaries describing change over time; and (k) validates one or more AI-generated summaries for accuracy. The summaries and/or analyses provide graphical information to the user that allows for rapid understanding and decision-making, while likewise providing citations to underlying sources for the information presented in the summaries that allows the user to further investigate (i.e., "drill-down") on any desired aspect of the summaries.

The sentiment, subjectivity, the polarity and strength of the sentiment and the impact of the information may be stored as metadata associated with each piece of content. Based on this metadata, the systems and methods enable sophisticated searching within and across pieces of content, such as documents, SEC or other regulatory filings, transcripts of investor calls and presentations, videos, blogs, posts and the like, to find and summarize the specific information that is relevant to the user query. The system identifies snippets of text within the relevant documents and scores the sentiment of those snippets or documents in real-time or near real-time on a continuous scale from negative to neutral to positive, and enables a user to rank and screen companies or topics to generate new investment ideas and make better investment decisions.

The subject matter disclosed herein learns which companies, markets, topics, and trends are important to users. Trends are automatically summarized from across datasets of company-issued documents, research reports, thought leadership, regulatory bodies, expert calls, and news. Relevant insights from the documents are surfaced to provide actionable intelligence when and where users need it for example in desktop applications, mobile applications, CRMs, chat applications, websites and research portals. The subject matter described herein provides a conversational interface for users to access and interact with this information.

The subject matter described herein may be configured to operate solely on internal, proprietary content, or it may be configured to operate on publicly available content. The internal proprietary content includes internal research, investment memos, client deliverables, strategy presentations, newsletters, meeting summaries, expert perspectives, and the like. This content is fed into the system in real-time or near real-time.

The subject matter described herein may be configured to provide views of trends and summaries over time, as well as how they change over time. They may be time-limited or time-specific.

The subject matter described herein combines one or more of the following components to provide users with a comprehensive market intelligence platform that provides real-time summaries with citations and links to underlying document sources: (1) document search; (2) document summarization and comparison; (3) industry/sector summarization and comparison; (4) real-time conversational summarization and interactions; and (5) user-specific recommendations based on or including summarization. In various embodiments, these components may be implemented across public documents, across internal proprietary documents, or in a hybrid manner that incorporates both public documents and internal proprietary documents without exposing the internal proprietary documents outside of the private environment.

The subject matter described herein combines document search (e.g., NLP-based search) to identify relevant snippets of text with AI-based summarization of the identified documents and/or relevant snippets of text. The summarization may be accessed using a real-time AI-based chat model. Thus, in some embodiments, the subject matter described herein combines search functionality with chat functionality to provide a user interface that allows for easy, real-time access to relevant financial information. The user interface may be presented in a multi-pane format, for example a three-column format, with a first column displaying a search summary, a second column displaying a search overview, and a third column displaying a document overview. The user interface includes a multi-pane user interface configured to display (1) summaries relevant to one or more of user queries; (2) citations to the underlying documents for each summary; and (3) the underlying documents, with the snippets that were used for the summarization identified within the underlying documents.

Summaries across documents, companies, sectors, and industries with a conversational chat-based user interface allow users to ask questions in real-time about documents to gather market intelligence. The summaries are generated in response to a user query, and they provide the user with underlying supporting documentation to allow the user to follow-up and/or confirm as necessary. The user query is used to perform a search to identify relevant documents and relevant snippets within the documents. The relevant snippets and/or documents are then fed into an AI model (e.g., LLM) for summarization. The AI model uses metadata associated with the documents from the document search to rank the snippets for summarization.

The subject matter described herein is implemented using artificial intelligence models. The artificial intelligence models may be large-language models, or they may be other types of AI models. These AI models may be deployed across both internal and external content, which allows for proprietary information to remain proprietary. The subject matter described herein uses a traditional document search or artificial-intelligence based search to identify relevant documents for summarization using the artificial-intelligence models.

The knowledge base for the market intelligence platform described herein includes multiple document sources. The multiple document sources may include existing knowledge base documents that have been ingested into the market intelligence platform. Such documents are ingested from publicly available sources or licensed from third-party data providers, such as companies' websites, analyst websites, SEC filings, and stock market data. The publicly available content includes all available public documents that can be accessed by web crawlers or other tools. The multiple document sources may further include additional structured knowledge bases. The multiple document sources may further include image, audio, and/or video repositories, which in some instances may be searchable using image search, metadata search or AI-generated transcripts or captions. The multiple document sources may further include proprietary knowledge bases that are owned and maintained for internal use only by companies or other organizations. In addition to being configured to operate on internal documents or public documents, the subject matter described herein is further configured to operate in a hybrid manner using publicly available documents in combination with internal proprietary documents, while protecting the internal proprietary documents through information security techniques like encryption, segregation and access control. The knowledge base for the market intelligence platform described herein may be any combination of these multiple document sources, and may further include additional document sources that can be accessed either publicly or privately. The market intelligence platform described herein allows for user-selection of one or more of the multiple documents sources to include/exclude when performing a search or other type of user query. In one or more embodiments, the market intelligence platform is configured to automatically determine one or more of the document sources to include/exclude when performing a search or other type of user query based on the search or query itself.

Figure 1:
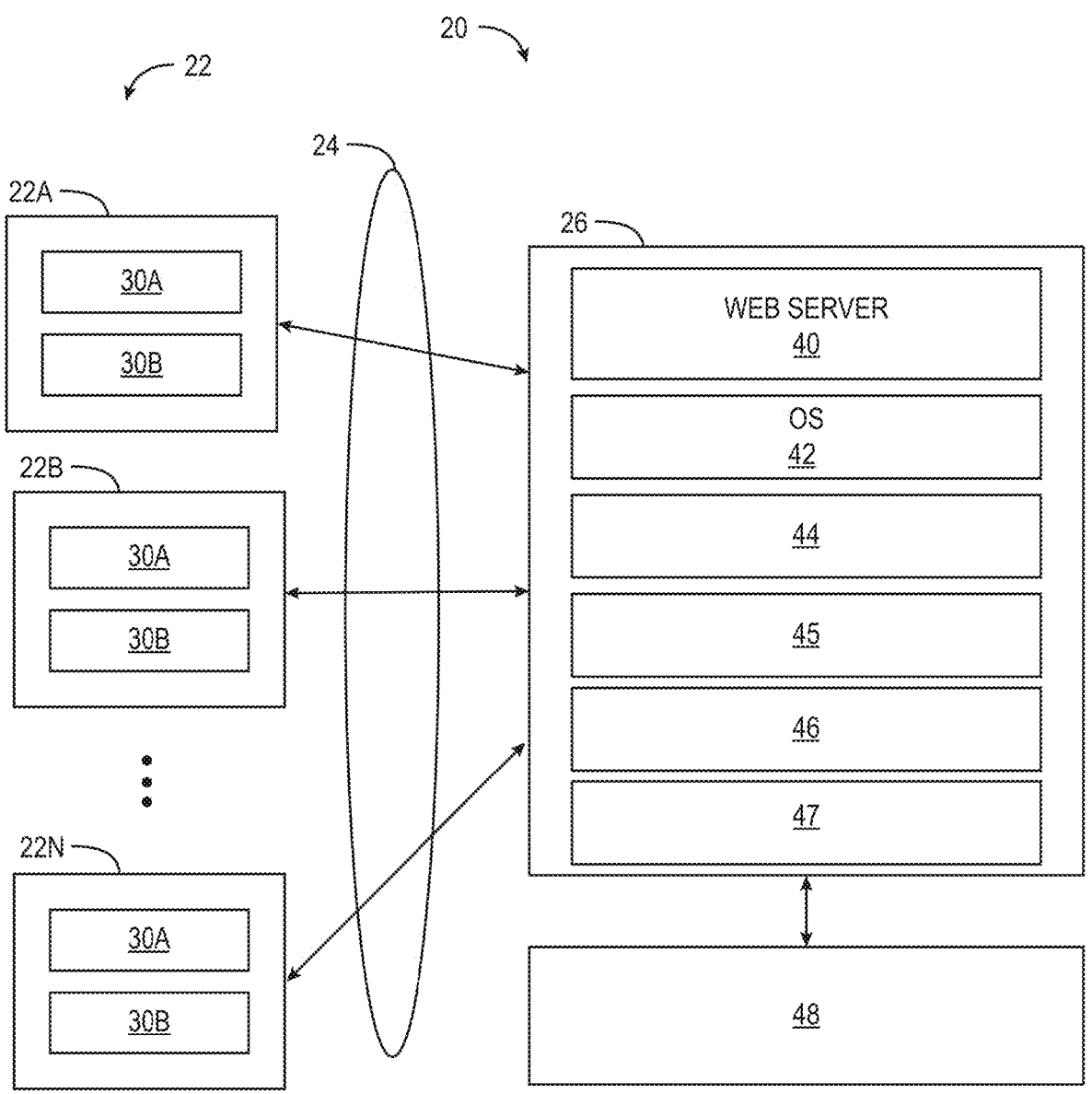
FIG. 1 illustrates an example of an implementation of a search system for efficiently conducting contextual and sentiment-aware deep search within a piece of content.

FIG. 1 illustrates an example of an implementation of a search system 20 for efficiently conducting contextual and sentiment-aware deep search within a piece of content, such as a document, a piece of text, a blog, a posting and the like. The system may be implemented as a client-server type architecture as shown in FIG. 1, but may also be implemented using other architectures, such as cloud computing, software as a service model, a mainframe-terminal model, a stand-alone computer model, a plurality of lines of code on a computer readable medium that can be loaded onto a computer system, a plurality of lines of code downloadable to a computer and the like which are within the scope of the disclosure.

The system 20 may be one or more computing devices 22 (such as computing devices 22a, 22b, . . . , 22n) that connect to, communicate with and/or exchange data over a link 24 to a search system 26 that interact with each other to provide the contextual and sentiment-aware deep search within a piece of content. Each computing device may be a processing unit based device with sufficient processing power, memory/storage and connectivity/communications capabilities to connect to and interact with the system 26. For example, each computing device 22 may be an Apple iPhone or iPad product, a mobile product that executes the Android operating system, a personal computer, a tablet computer, a laptop computer and the like and the system is not limited to operate with any particular computing device. The link 26 may be any wired or wireless communications link that allows the one or more computing devices and the system 26 to communicate with each other. In one example, the link may be a combination of wireless digital data networks that connect to the computing devices and the Internet. The search system 26 may be implemented as one or more server computers (all located at one geographic location or in disparate locations) that execute a plurality of lines of computer code to implement the functions and operations of the search system as described below in more detail. Alternatively, the search system 26 may be implemented as a hardware unit in which the functions and operations of the back-end system are programmed into a hardware system. In one implementation, the one or more server computers may use Intel® processors, NVIDIA GPUs, run the Linux operating system, and execute Java, Ruby, Regular Expression, Flex 4.0, SQL, etc.

In the implementation shown in FIG. 1, each computing device 22 may further comprise a display 30a and a browser application 30b so that the display 30a can display web pages generated by the search system 26 and the user can fill in forms to provide search queries and the like to the search system 26. The browser application 30b may be a plurality of lines of computer code executed by a processing unit of the computing device. Each computing device 22 may also have the usual components of a computing device such as one or more processing units, memory, permanent storage, wireless/wired communication circuitry, an operating system, etc.

In the implementation shown in FIG. 1, the search system 26 may further comprise a web server 40 (that may be software based or hardware based) that allows each computing device to connect to and interact with the search system 26 such as sending web pages and receiving information from the computing devices and a typical operating system 42 that is executed by one or more processing units that are part of the search system implementation. The search system 26 may further comprise a content extraction unit/engine 44, a linguistic analysis and word/phrase tagging unit 45, a sentiment analyzer 46, a search engine 47 and a store 48, that may be implemented as a software based or hardware based database, that may store the pieces of content associated with the system, the metadata generated by the search system for each piece of content, user preferences and the like. The content extraction engine/unit 44 may a) recognize semantically defined scenarios within the textual material, consisting of a partial or whole sentence or multiple sentences. The linguistic unit 45 analyzes and classifies each scenario based on linguistic rules and natural language processing techniques to determine subjectivity that are described below. The sentiment analyzer 46 analyzes sentiment and subjectivity to determine if the scenario is objective or subjective and determines the polarity and strength of sentiment of the sentence, paragraph or appropriate part of the piece of content relative to the company releasing the textual information and the likely impact on its stock price or the price of its other securities. The search engine 47 can perform searches based on the metadata, generate content to be displayed on the user interface of the system as well as generate reports of the system that are described below in more detail. In one implementation, the search engine may be the SOLR search engine which is open source enterprise search platform from the Apache Lucene project (additional information about SOLR can be found at http://lucene.apache.org/solr/which is incorporated herein by reference). The store 48 also contains an archive of "raw" pieces of content (unprocessed or tagged) and tagged piece of content. The user interface of the search system (implemented as a user interface unit/portion) allows a user to conduct topical and sentiment filter based deep searches as described below in more detail.

Figure 2:
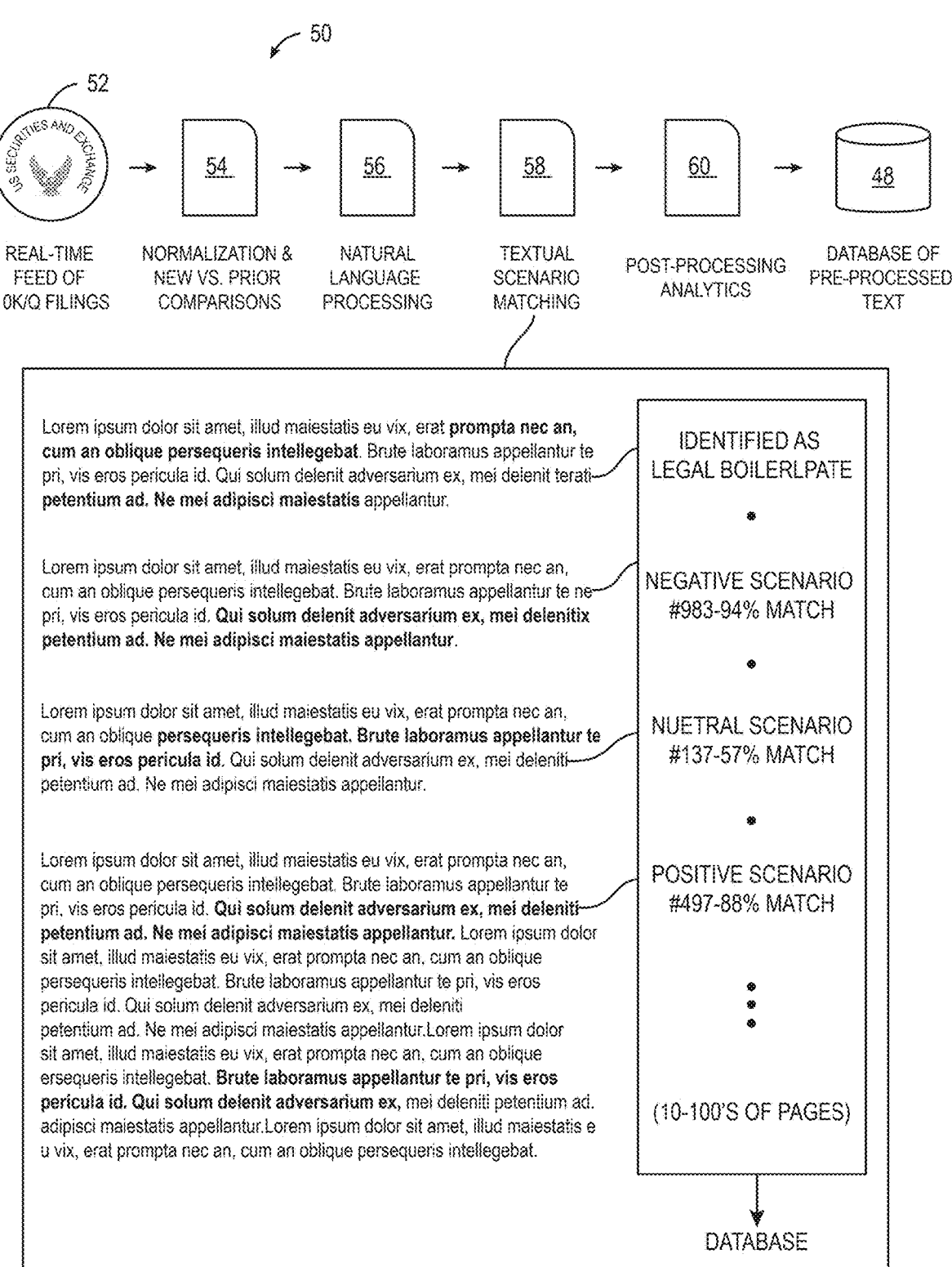
FIG. 2 illustrates an overview of the deep search process.

FIG. 2 illustrates an overview of the deep search process 50. In the process, the search system receives feeds, that may be real-time, of pieces of content (52) such as financial documents including 10K, 10Q or other SEC filings, or investor conference call transcripts or earnings transcripts, in the financial example. The content extractor unit of the system cleans the incoming pieces of content and normalizes the pieces of content (54). The content extractor unit of the system also extracts zones (particular sections of a document such as header, body, exhibits, MDA, and Footnotes in SEC filing documents) and sentences so that unique, meaningful information is separated from recurring or other boilerplate information during natural language processing. Often financial filings contain a large portion of recurring text that is repeated from the prior quarter, and this is typically less interesting to investors than new statements. In the content extractor unit and linguistic unit of the system, using thousands of structured concepts and scenarios defined through careful expert analysis, semantic tags are assigned by linguistic and machine learning processes trained by domain experts (56). The linguistic unit also discerns the topic of the content using special linguistic rules, which is different from traditional search engines where a search is performed using word and phrases without contextual understanding of the text. For example, the linguistic analysis unit tags sentences based on their tense, to determine whether they talk about something that happened in the past, is continuing, or is expected to happen in the future. This is accomplished through a combination of linguistic analysis and domain-based language models that understand, for example, that a noun phrase like "deferred expenses" implies something about the future. In the system described here, the custom linguistic rules specifically designed for the financial domain, provide highly specialized and accurate context.

The sentiment analyzer unit of the search system then analyzes each piece of text for subjectivity, performs textual scenario matching and filters the subjective sentences and assigns appropriate polarity based on supervised training rules, by deciding if the particular sentence or paragraph is favorable or unfavorable to the price of the asset in the case of the financial industry example (58,60). Examples of the polarities (negative, neutral, and/or positive scenarios) are shown in FIG. 2.

The sentence or paragraph extracted from the piece of content may be marked with the topic tags, polarity tags, index markers, sentiment values etc. and stored in the store 48 that is coupled to the context search engine, the sentiment engine and the linguistic components. The traditional sentiment analysis is focused on the document level, helping users to find whole documents that in the aggregate have a positive or negative tone, as opposed to the sentence or paragraph level where the topic of interest is located. For example, the document level sentiment scores may be computed based on the sentence level scores as a net sentiment percentage of the total possible count. For example, Number of positive statements-Number of negative statements divided by the total number of statements may be used to determine sentiment score of the document, although other methods may be used to determine the sentiment score for the document. In the system described here, the sentiment tags and the topic tags at the sentence, sub-sentence and/or paragraph level provide the user with granular search capabilities and let them find the relevant text that can explain or help predict price changes for a given asset. The search system may then store the final results of all the tagged information in the store 48 associated with the search system.

The system presents a user interface to the user (see FIG. 3, for example), in which the user interface may provide a reading/browsing/searching user interface 62 described below in more detail, a heat map user interface 64 described below in more detail and an aggregated sentiment user interface 66 described below in more detail. Thus, the user interface presents the subjective categories related to financial concepts (in the financial industry example being used for illustration purposes) along with the sentiment categories. The user interface program controls the context search engine by directing the sentiment and contextual topic analyzing subsystems to extract relevant information and return the results back to the user's machine. The information extraction based on the user's preferences may be performed at periodic intervals as new files show up at the data sources. During a search operation, the search agent reviews the text obtained from one or more information sources, identifies the document or documents relevant to the query. Then it performs the context and sentiment extraction at the sentence, paragraph, or at appropriate granular level to find the text portions that match the stated request, highlights the sentiment appropriately, filters or underlines the sentences that match the topic(s), and brings back the result in an easy-to-read format to the user. The users may be given the choice to quickly drill down to the specific portions and find out the sentiment level, with matching topics and retrieve relevant text that enables them to make better investment decisions in the financial industry example being used for illustration purposes.

FIG. 4 illustrates more details of the deep search process 50 in the financial domain. The process shown in FIG. 4 may be performed for each document/piece of content. In FIG. 4, some of the processes are the same as those shown in FIG. 2 above. Thus, in the financial domain, the retrieving/downloading process 52 may involve the daily or intra-day download or other periodic retrieval of financial documents, such as 10K and 10Q documents from the SEC, which are processed by the system.

Once the financial documents are retrieved, the system performs a data cleansing process 62 in which the system, among other things, removing extra tags, removing styles, removing extra HTML code and reformatting the financial document as HTML without tags. In addition, for example for SEC packages of documents, the system may extract the HTML and text documents from the SEC package and append them into one HTML document. In more detail, the document is received as an HTML formatted document and plain text documents. In order to identify sentences of text in the documents, the system determines what chunks of text are useful statements, where a sentence starts and ends and how HTML may alter the document. In particular, to determine what text chunks are real statements that state something about a matter of affairs, such as: ComEd has no remaining costs to be recognized related to the rate relief commitment as of Sep. 30, 2010, as compared to text chunks that are titles, page footers and headers, such as: Table of Contents or (Dollars in millions, except per share data, unless otherwise noted), the content extracting unit uses a combination of sentence features, such as HTML tags, end-of-sentence punctuation signs, and length thresholds of sentences (in number of words and characters), to separate useful content from the extraneous content. To determine where a sentence begins and ends, the content extraction unit splits sentences at punctuation signs, but takes abbreviations and acronyms into account, such as Mr., Inc., and U.S. If a document is HTML, sentences can usually be expected to occur entirely within one pair of enclosing tags, such as begin and end of paragraph: <p> . . . </p>. There may be multiple sentences within one paragraph, but sentences are not usually split over multiple paragraphs.

However, if a sentence is split over a page break, or if the document is plain text without any HTML formatting, the system concatenates chunks of text to reconstruct the paragraphs in the text by using some heuristics based on the spacing of the text and the occurrence of page footer and header clues, so as not to erroneously concatenate text that does not belong together, such the end of a paragraph and a following section title. When the particular document is split into sentences, each sentence is saved as plain text under TxtData/and the document is saved as HTML with each sentence embedded with <span> tags, which are used by the search system to highlight sentences when the sentences are displayed to the user.

Once the extraneous content in the document is removed, the content extraction unit extracts the key sentences/portions in the piece of content (64) (such as the Management's Discussion and Analysis (MDA) portions of an SEC filing). An SEC filing contains different sections, such as a document header, document body, and exhibits section. Within the body and exhibits, there are subsections, such as the Management's Discussion and Analysis (MD&A) and the Notes to the Financial Statements. The location of these sections are identified by a combination of regular expression patterns, and some information of the size and order of sections in the document, and some excluding patterns that disqualify matching patterns that occur in the wrong context, such as in the table of contents. The system thus extracts these key portions of the document.

The content extraction unit may also extract recurring/boilerplate sentences in the content (66) (such as sentences that are the same as in prior documents for each asset in an SEC filing).

As companies file on a quarterly basis, typically some of the text they submit is repeated from earlier reports. The content extraction unit identifies the recurring statements and indicate that they are "less interesting" than the new statements by coloring the recurring statements grey in the user interface when shown to the user and by storing them in the store 48 with an indicating that they are recurring statements. Recurring statements are identified by comparing each statement in the current filing to all statements in the previous filing of the company (through the use of the store 48) and a comparison is performed on normalized statements, where some stop words and whitespace characters are ignored. Thus, the system also extracts these recurring portions of the document from the document and store them in the store 48. In one implementation, information about all filings that are currently in the system for a company (in the financial example) are stored in a FORM_TBL table in the store (that may be implemented using MySql) and the recurring sentences are tagged in the files in TxtData/. As in the following steps, each file is read from TxtData/, modified, and written back to TxtData/.

Once the various sentences have been extracted from the document, sentiment, topic, recurring/boilerplate classification and tagging (68) are performed in order to tag and classify each sentence in the document including tags for sentiment, topics, tense, tone, etc. Using a topic taxonomy that is specific to the industry or field in which the documents pertain, the search system identifies which topics are present in the sentences (such as Revenue, Cash flow, Risks, etc for the financial industry). The search system may also perform part-of-speech tagging using a linguistic tagger to identify the parts of speech of the words in the sentences (nouns, verbs, etc.) and the results may be saved under PosTagged/. The system may also identify sentences that are forward looking (containing present and future tense, plans, intentions, . . . ) where part-of-speech tags in combination with industry knowledge based taxonomies are used here for disambiguation (forward looking statements in SEC filings). Boilerplate sentences that typically occur in all filings (such as those explaining what "Forward looking statements" mean) may be similarly recognized and tagged for removal.

The range topics for a particular industry are selected since some topics are of particular interest to financial analysts, such as Sales, Orders and Backlog, Same Store Sales or Net Interest Income. To tag the topics for a particular industry, like the financial industry, the system provides key topic search queries that have been predesigned by financial experts and that identify statements in the text that contain references to the topics. For example, the Orders and Backlog topic may correspond to the following example search query:

([orders] or [sales order] or [services order] or FOLLOW (5, [order], cancellation) or [order rate] or [commercial order] or [delivery order] or [order amounts] or [order activity] or backlog or [task order] or [signings] or [order value] or NEAR(5, [order], customer) or [customer order] or NEAR(5, [order], delay) or NEAR (5, [order], cancellation) or FOLLOW(5, time, [order]) or [change order] or [order volumes] or [order volume] or [ordering patterns] or [order is taken] or [order size] or FOLLOW(5, [order], shipped) or FOLLOW(5, return, [order]) or [product order] or FOLLOW(5, convert, [order]) or [subscription order] or [order growth] or FOLLOW(5, completion, [order]) or [average order] or [order exists] or [new order] or [order book] or [firm order] or bookings) and not ([auction rate securities] or [court] or [courts] or [court's] or [obligations] or [commitments] or [in order to])

This query contains the boolean operators or, and, and not that combine different search terms into one query. Words or phrases enclosed in square brackets are literal matches; e.g., [orders] matches the word "orders" (irrespective of character case). Words without square brackets are stemmed before matching; e.g., customer matches any inflected form of "customer": "customer, customers, customer's". The special functions FOLLOW and NEAR indicate a set of words that have to occur within a window of predefined size, allowing for stray words within the window that do not match any of the words in the query; e.g., FOLLOW(5, [order], cancellation) indicates that the word "cancellation" may occur at a maximum distance of 5 words from the word "order", in the given order: "order" before "cancellation". The function NEAR works as FOLLOW but the order of the words within the clause is free.

An example of the results for tagging sentences for boiler, forward looking statements and topic may be:

The document title/filing: 0001193125-10-241317.txt
Company:
Google Inc
Form type: 10Q
Filed on: 20101029
Sentence: On an ongoing basis, we evaluate our estimates, including those related to the accounts receivable and sales allowances, fair values of financial instruments, intangible assets and goodwill, useful lives of intangible assets and property and equipment, fair values of stock-based awards, income taxes, and contingent liabilities, among others.
Sentence id: 112773 is boiler: yes
zone: footnotes, document body Forward Looking
Sentence: yes
Topics: Accounting Policies; Working Capital; Revenue; Capex & Depreciation;
Capital Liquidity; Profit & Costs
Sentence: A discount factor was applied over these estimated cash flows of our ARS, which is calculated based on the interpolated forward swap curve adjusted by up to 1,700 basis points to reflect the current market conditions for instruments with similar credit quality at the date of the valuation and further adjusted by up to 400 basis points to reflect a discount for the liquidity risk associated with these investments due to the lack of an active market.
sentence id: 243505 is boiler: yes
zone: footnotes, document body
fls: yes
topics: Cash Flow; Accounting Policies; Derivatives and Hedging; Revenue; Capital Liquidity; Risks
Sentence: For all acquisitions completed during the nine months ended Sep. 30, 2010, patents and developed technology have a weighted-average useful life of 4.1 years, customer relationships have a weighted-average useful life of 3.3 years and tradenames and other have a weighted-average useful life of 4.0 years.
sentence id: 384406 is boiler: no
zone: footnotes, document body
fls: no
topics: Revenue
As described above, the linguistic unit also discerns the topic of the content using special linguistic rules. The linguistic rules may be, for example:
@MACRO@ @V-MODAL@
(could|may|might|must|shall|should|will|wo|would)/
MD
Or the following macros:

| @MACRO@ | @@ | ( ) | // Left/start edge of expression |
|---------|----|-----|----------------------------------|
| @MACRO@ | @@ | ( ) | // Right/end edge of expression |
| @MACRO@ | \w | [\a-\z\A-\Z\_\0-\9] | // A word character |
| @MACRO@ |    | @VB@ | (\w+/VB) // Head verb base form |

The natural language processing may include, for example:
We add linguistic knowledge to the statements by using a part-of-speech tagger or syntactic parser. An example of a statement with part-of-speech tags is:
The/DT latter/JJ action/NN would/MD cause/VB some/ DT delay/NN in/IN the/DT effectiveness/NN of/IN rates/NNS that/WDT might/MD otherwise/RB become/VB effective/JJ in/IN June/NNP 2011/CD./.

This linguistic annotation is used in a consequent step that assigns tense to the statement. This means that we identify whether the statement is forward-looking, referring to a future event.
The system defines macros for some frequently occurring constructs, e.g., a macro for modal and auxiliary verbs examples of which are described above for the linguistic rules.
The macros are regular expressions containing information on the words and the part-of-speech tags of the words in a statement. The macros can be used in rules, such as in the following rule:
@ @ADVP@? @V-MODAL@ @ADVP@? @VB@ @ADVP@? @@
For fast matching, the regular expressions are compiled into Finite State Automata using finite-state algebra.
The search system may also use a syntactic parser, e.g., a dependency parser. For example, the dependency parse of the sentence:
The company has available a $750 million bank credit facility that expires in December 2010.
looks like this:
det (company-2, The-1)
nsubj (has-3, company-2)
dep (has-3, available-4) det (facility-11, a-5)
num (facility-11, $-6)
number ($-6, 750-7)
number ($-6, million-8)
nn (facility-11, bank-9)
nn (facility-11, credit-10)
dep (available-4, facility-11)
nsubj (expires-13, that-12)
rcmod (facility-11, expires-13) prep (expires-13, in-14)
pobj (in-14, December-15) num (December-15, 2010-16)
Each dependency consists of a relation (e.g., det=determiner) between a head word (e.g., company) and its dependent (e.g, The). Each word token has an ID number attached to it (e.g., company-2) by which it is possible to uniquely identify that word occurrence; this is necessary if the same word occurs multiple times in the sentence, in different syntactic positions.
Rules can be expressed using dependencies. For instance, the sentence above is classified as forward-looking because the dependency prep (expires-13, in-14) matches the rule:
prep(({V} (expire|expires|expiring) @ID@), (at|before|in-|on|within) @ID@)//expires on

Example of Results

The/DT latter/JJ action/NN would/MD cause/VB some/ DT delay/NN in/IN the/DT effectiveness/NN of/IN rates/NNS that/WDT might/MD otherwise/RB become/VB effective/JJ in/INJune/NNP 2011/CD./.

The above rule determines that the statement "The latter action would cause some delay in the effectiveness of rates that might otherwise become effective in June 2011." is forward-looking, because it contains the constructs: would/MD cause/VB and might/MD otherwise/ RB become/VB.

The sentiment analyzer unit may classify sentences in a document/piece of content as objective (=neutral sentiment)

vs. subjective (=positive or negative sentiment). Sentiment extraction involves three steps:

1. Feature extraction: Terms, phrases, or co-occurring words that are judged to be relevant from the point of view of sentiment classification are selected by a domain expert according to the approaches described in above. Another alternative is using n-grams or a combination of features.

2. Objective vs. subjective classification: Supervised machine learning is utilized to learn to distinguish between objective and subjective statements based on the features of step 1. The machine learning techniques can be linear regression, Support Vector Machines, decision trees, or artificial neural networks, to name a few.

3. Positive vs. negative classification: If the sentiment is in step 2 is classified as subjective, then a further classifier classifies the statements as positive or negative or neutral, based on pattern matching against a large database of positive, negative and neutral textual features built by financial domain experts. The open source Support Vector Machine algorithm (LibSVM) is trained based on the annotators results by letting it figure out the key features that happen to affect the predictions the most. This part of the algorithm is based on the open source implementation. The features and the guidelines that drive the annotations described earlier, determine the effectiveness of the classification results and thus distinguish our sentiment prediction from other approaches that happen to use the SVM or other machine learning techniques.

In some embodiments of the system, processes 2 and 3 above may be combined into one single machine learning step. Consider, for instance, the following rule-based approaches to feature extraction for sentiment:

a. A rule is expressed as an accurate search query with Boolean logic, as described above:

FEATURE_OUR_PROJECTION:

FOLLOW(3, [our] or [its] or company or management, estimate or estimation or target or forecast or forecasted in, making, its) or FOLLOW(3, realizable, value) or FOLLOW(3, discounted, cash, flow))

b. A rule is expressed as a regular expression taking into account both the surface forms of words and potentially their part-of-speech tags, as described above:

FEATURE_REVENUE_VOLUMES_REVENUE-_GROWTH:

@@ (revenue|sales|royalty|business) @WORD6@ (growth|grow|expansion|expand|increase| increasing|enhancement|improvement|improving|improve) @@, where the macro @WORD6@ corresponds to a sequence of stray words, minimum zero and maximum six words:

@MACRO@ @WORD6@ @WORD®? @WORD®? @WORD®? @WORD®? @WORD®? @WORD®?

A rule is expressed as one or multiple dependency relations between words.

c. If a full syntactic parser is not available or not a feasible solution (e.g., due to heavy computational requirements), shallow parses can be produced using a set of cascaded rules that are applied on a part-of-speech tagged sentence. Shallow parses are parses of chunks or phrases within a sentence, not necessarily covering the syntax of the entire sentence.

If we start with the following part-of-speech tagged sentence:

The/DT company/NN has/VBZ available/JJ a/DT $/$750/CD million/CD bank/NN credit/NN facility/NN that/WDT expires/VBZ in/IN December/NNP 2010/CD./.

We get the following shallow parse:

<NP> The company</NP>
<VP>has</VP> available/JJ
<NP>a $750 million bank credit facility</NP>
<NP> that</NP>
<VP>expires</VP>
<PP> in December 2010</PP>
./.

Which contains the chunks:

```
DP      62      0
<DP>The</DP>
DP      62      1       <DP>a</DP>
TIME-NP 78      2    num(December, 2010)<TIME-NP>December 2010</TIME-NP>
NUM     85      3       number(million, 750)<NUM>$ 750 million</NUM>
NOM     87      4       nn(facility, bank credit)<NOM>bank credit facility</NOM>
NOM    101      5       num(bank credit facility, 750 million)<NOM>$ 750 million bank
credit facility</NOM>
NP     108      6       det($ 750 million bank credit facility| a)
                <NP>a $ 750 million bank credit facility</NP>
NP     109      7       det(company, The)<NP>The company</NP>
PP     119      8     pobj (in, December) <PP>in December 2010</PP>
VP     148      9          <VP>has</VP>
VP     148     10       <VP>expires</VP>
NP     150     11    <NP>that</NP>
``` or [projected] or [projection] or [we project] or [company projects] or [management projects] or [we estimate] or [company estimates] or [management estimates]) and not (FOLLOW(3, sales or selling or marketing, expense or expenditure or cost)) and not (FOLLOW(3, require, us, to, estimate) or FOLLOW(3, estimate, that, have, realized) or FOLLOW(3, we, review, our)) and not (FOLLOW(3, tax, rate) or FOLLOW(3, fair, value) or FOLLOW(3, ongoing or going, basis) or FOLLOW(3, continually or continuously, evaluates) or FOLLOW(3, useful, life) or FOLLOW(3, To extract sentiment topic features, dependency rules can be written that operate on the dependencies discovered by the shallow parser.

As a result of the processes above, the store 48 has a plurality of sentences for each document with each sentence or other portion of the document having one or more topics tags and sentiments associated with each portion of the document. This combined data is them used to perform the deep searches as described below and generate the user interfaces that are described below.

Once the tagging and classification has been completed, the sentences, sentiments of the sentences and other asset specific information for qualitative, trend and heat map analysis may be loaded into a database (70) so that for example, the heat map as shown in FIG. 7 may be generated by the system.

In addition, the sentences and key paragraphs may be loaded into a SOLR database (72) during indexing so that the search engine can performs its deep searches based on the portions of the documents, the topic tags and the sentiments. In more detail, XML is created that corresponds to the SOLR entries, both on sentence level (TopicXml) and filing level (FullFilingXml). In addition, the data is posted to SOLR, which makes the filing appear in the web application. For historical reasons, the sentence level info is stored in SolrTopic, and the filing level info is stored in SolrMda. In addition, the system also highlights sentiments in the sentences of the document (74) for later viewing as described below in which the sentiments are "tagged" to the sentences and some HTML is added to reflect the highlighting.

FIGS. 5A and 5B illustrate an example of a search user interface 80 for the deep search system for an initial query and a list of results, respectively, in the financial industry. The user interface has a find documents portion 82 that allows the user to specify search criteria for the search by sectors, industries, portfolios, stocks, market capitalization ranges, date ranges, keywords, saved queries and the like. The user interface also has a viewing portion 84 that in FIG. 5A has a form to enter specific search criteria and in FIG. 5B has a list of responsive documents based on a search. The user interface 80 may also have a topics portion 86 that lists the topics associated with the particular subject matter area, the financial industry documents in this example. When the system is used in a different subject matter area, such as the law, the system would like a different set of topics in the list. The list of topics portions can be used at any time during the viewing of documents to change the topics of interest. Any time that the user changes the topics, the viewing portion 84 is dynamically updated as the user changes the topics, for example. In FIG. 5B, if the user selects one of the returned documents shown in the viewing portion 84, the user interface displays the extracted sentences and sentiments for each extracted sentence as shown in FIG. 6. As shown in FIG. 6, the different sentiments of the sentences are shown in different colors (red for negative sentiments 90, green 92 for positive sentiments and plain black/uncolored for neutral sentiment statements). Specific cue words used in determining sentiment, topic or tense may also be underlined or otherwise marked (although none are shown in the example). In addition, since the system extracts recurring sentences, the user interface may also shown recurring sentences as grayed out (although none are shown in FIG. 6 since the filter to hide boiler sentences has been activated in FIG. 6). The search system viewing as shown in FIG. 6 allows the user to rapidly review a long document, such as a new SEC filing, and quickly see sentences in the document that are positive, negative or neutral. For the financial world, this deep search engine allows the user to quickly review company SEC filings and determine the effect of the sentences in the filing on the stock price of the company, for example, or to screen a large number of filings for new negative or positive statements on a given topic of interest, where the topic of interest could be "all new negative forward looking statements made by large-cap retail companies in the most recent quarter about their sales in Asia" (which would be done by appropriate selection of filters and searches within the example system).

FIG. 7 illustrates an example of a sentiment heat map user interface 100 of the deep search system. Due to the documents having sentences tagged with sentiment, the sentiment heat map is able to calculate and show the sentiment by industry (such as oil 101, integrated circuits (chips) 102 and the beer industry 104) or other criteria, the colors show the level of positive or negative or neutral outlook for the companies in the industry and the size of rectangle in any one industry corresponds to the market value of the company in the industry in which the larger rectangle indicates are larger market value company. For example, in the oil industry, the larger market value companies have negative sentiments, but a smaller company has a positive sentiment as shown by the smaller green rectangle 1011. In the sentiment heat map, the user can click on any rectangle, see the company name and then select that company to see its documents and the sentiments of the sentences in the documents for the company that led the system to calculate a given sentiment score and display it on the heatmap. The user can alter selections such as the recurring, topic and tense filters, which are dynamically reflected in the heatmap display, with a new sentiment number calculated for all the companies shown.

FIG. 8 illustrates an example of a search results user interface of the deep search system, where the viewing interface allows the user to compare documents side by side that is made possible by the deep search system and processes described above.

The processes of the deep search system and method described above can be used to generate reports for the user that help the user quickly review a quick "cliff notes" summary of the document or a range of documents because the system as described above can identify relevant sentences within a large document, or many documents, based on the user's custom criteria (e.g. topic, tense, tone, recurring, keyword search, industries, market caps, etc. . . . ), and create the document summary of summary of a range of documents. Thus, using the system, a user can skim-read through a pre-highlighted document or multiple documents, focusing on what he had pre-defined as important (and what the system thus highlighted), as opposed to having to read everything. The deep search system may further have a report generator unit that generates reports, such as those shown in FIGS. 9A-10B below based on the processes above.

FIGS. 9A and 9B illustrate portions of a document highlighted that is made possible by the deep search system. In particular, the document is an SEC filing for a company and the system has modified the document to make it easier for a user to quickly review. Using the content extraction, linguistic/tagging process and the sentiment determination process described above, the system highlights different sentences of the document. For example, the system highlight one or more sentence(s) 110 in yellow that match a user's indication of interest in the sentence based on various criteria but are recurring sentences and shown by the grayed out text, highlights one or more sentence(s) 112 is blue that are identified by the system but are recurring sentences and shown by the grayed out text, highlights one or more sentence(s) in yellow that match a user's indication of interest in the sentence based on various criteria and are not recurring sentences and highlights one or more sentence(s) in blue that are identified by the system and are not recurring sentences. In the example in FIGS. 9A and 9B, the user search term was for "new forward looking statements about revenue"—i.e. incorporating both topic and tense into same query, while filtering (or graying) out recurring statements (i.e. those that were simply repeated from the prior filing). The value of this is to help the user quickly skim-read through a pre-highlighted document, focusing on what he had pre-defined as important (and what the system thus highlighted), as opposed to having to read everything.

FIGS. 10A and 10B illustrate an example of a multi-document summary that is made possible by the deep search system. Traditional search engines return full documents that had something potentially relevant in them, and a user has to spend endless amounts of time clicking through those documents to see if there is something potentially useful. However, using the processes of the deep search system, the user can have a custom report generated as shown in FIGS. 10A and 10B which is a user-defined summary of what a selection of companies said about a topic of interest to the user. The example in FIGS. 10A and 10B shows what chip makers said about inventory during the past quarter, an indicator of the business cycle in that industry. As shown, the portions of the documents for each company are shown side-by-side 120-124 with the of interest sentences (based on the user's expressed interest) are highlighted so that the user can quickly review the documents of the three companies in the same industry.

In an implementation of the deep search system, the content extraction processes may include a rule parsing algorithm that emulate key functions such as NEAR, PHRASE, FOLLOW, FUZZY, EXACT, DICTIONARY etc with the rules being expressed as XML and interpreted by our rule process execution engine wherein the rules are applied to extract the topic features for each sentence. In the same implementation, the linguistic process uses an open source finite state machine, regular expression optimizers and PERL style Regular Expression generators. In the same implementation, the sentiment analyzer process uses a combination of linguistic rules and machine learning techniques such as SVM (Support Vector Machine) and Neural Network models. In the sentiment analysis, the system is seeded with the topic features based on topic extracting rules and linguistic features based on shallow and some deep parsing algorithms. Then, the machine learning algorithm select the appropriate features based on human annotated sentences.

The above descriptions of the focus on document search. As explained above, document search may be used to identify relevant documents and snippets within those documents. The snippets and/or documents may include metadata generated during the document search process, such as topics, sentiment, synonyms, labels, source, data, user-generated tags, and the like. The following discussion focuses on the summarization and interaction with the summaries through one or more artificial-intelligence models, including through conversation-based interactions.

Initial User Query

In one or more embodiments of the market intelligence platform, the process begins with a document search. The user may specify, for example, a specific company (e.g., company name or ticker) for which they would like a summary to be generated, an industry for which they would like a summary to be generated, or a natural language or keyword search for topics or information for which they would like a summary to be generated. The user may select/deselect one or more databases or document sources from to include in the search and summarization. The document search finds relevant content based on the user's query.

The document search may be text-based, NLP based, or machine-learning (or artificial-intelligence) based. For example, the document search may be a vector search or a semantic search that includes topics, synonyms, and/or proximity, based on natural-language processing and/or deep search techniques. Vector search may be used to convert words in the documents into vectors that allow for embeddings that are used for synonyms, semantics, topics, and/or clustering. In one embodiment, an AI model, such as an LLM, may be used to first provide vector representation of one or more documents. The document search identifies snippets within the documents using one or more of the document search techniques described herein. The documents and/or the identified snippets from the documents returned by the document search are then provided as input into an AI model (e.g., a proprietary LLM) that is used to generate summaries based on the document search results. Post-processing may then be applied to validate the generated summaries.

The market intelligence platform uses multiple document sources that may include existing knowledge base documents that have been ingested into the platform. The documents that have been ingested into the platform may be stored in one or more datastores. The datastores are indexed. Similarly, metadata associated with the documents in the datastores is also indexed. The metadata includes, for example, information about the sources of the documents, dates of the documents, user-generated tags, industry tags or labels, country tags or labels, etc. The metadata may be used as part of the document search and/or summarization process to filter data. The user may provide user-specific filters. The search engine may use the metadata to determine the most relevant results. The artificial-intelligence based summarizer may further use the metadata to generate the most relevant and coherent summaries.

In one embodiment, the document search is performed using an inverted index. The search engine returns the documents. The user then selects the documents to apply to a vector search. The document search and the vector search are integrated into a hybrid search. The subset of results, metadata and relevance scores from the document search is used to aid in ranking the results from the vector search engine. The vector space represents the content and also the metadata that is in the search engine. In other words, the metadata associated with the snippets that are returned by the document search are leveraged for the vector search.

Snippet retrieval as part of the document search may be performed as a multi-stage retrieval. The multi-stage retrieval includes retrieving document ids from a document search, which is based on user-provided search parameters. In parallel, snippets are retrieved from documents identified through hit content or vector search. Retrieved snippets are combined. Snippet ranking is used to extract the most relevant snippets from the combined results.

In one or more embodiments, vector search is used to identify relevant documents. For vector search, queries are converted into a numerical representation (vector/embedding). The vector/embedding is used to search a vector database for text snippets that are most relevant to the query or question. This is accomplished by matching one or more of the topic, tone, and/or linguistic properties that dictate their numerical representation.

In one or more embodiments, keyword search is used to identify relevant documents. For keyword search, relevant documents are identified based on exact matches or smart synonyms that are found within the document. These documents typically contain a variety of relevant information that can be used to answer user questions.

In one or more embodiments, hybrid search is used to identify relevant documents. For hybrid search, a combination of vector search and keyword search is used. This approach captures text snippets that are a close match based on their numerical representation in a vector database, as well as documents with relevant keyword matches. This ensures there is a comprehensive representation of content required to effectively answer user questions.

The reranker prioritizes snippets based on one or more of diversity, bad snippet filtering, and enhanced snippet context.

Regardless of how the snippets are ranked, the results of the snippet retrieval are passed to a summarization model. The summarization model generates and returns a summary.

Artificial-Intelligence Models

The subject matter described herein uses one or more AI models for the various search and summarization tasks detailed herein. For example, one or more purpose-trained proprietary models may be used. In one embodiment, the proprietary models may be based on one or more open-source models, such as Llama, as just one example. In other embodiments, the models may be third-party models or foundation models that are accessed using APIs. In one embodiment, the subject matter described herein provides for switching between third-party or publicly available models accessible through APIs and in-house or proprietary models. The choice of AI model (e.g., a machine learning model, or a specific LLM, etc.) to use may be based on numerous factors. For example, a proprietary model has been seen to outperform a third-party model in factual and numerical consistency (i.e., fewer hallucinations), writing coherent or fluent summaries, providing detailed summary bullet points that include information such as KPI numbers and drivers, writing less redundant or repetitive summaries, and in coverage. The AI models used for the search and summarization tasks are not limited to LLMs, and may include other types of neural networks or other AI models.

The AI models may be deployed on one or more hardware graphics processing units (GPUs) (e.g., the NVIDIA A10G) for accelerating the search and summarization tasks.

The summaries are generated using a summarization model. In one or more embodiments, the summarization model may be an open-source model. The open-source model uses a known API to retrieve the summary. In one or more embodiments, the summarization model is an in-house (i.e., proprietary) model that serves the summaries from internally hosted sources. The in-house model may be hosted on cloud instances with GPUs, with needs varying depending on the size of the LLM model being used. In one embodiment, the in-house model may be a medium-sized model that can run on V100 GPUs. In other embodiments, the in-house model may be larger and run on A100 GPU instances.

In one embodiment, the summarization model may be combined with the processor system and hosted on one or more GPU instances that house the model and perform the summarization. This reduces latency and/or cost from sending request data to the LLM and receiving the summarization from the LLM.

A summarization processor performs pre-processing and post-processing of the summarization model. In one embodiment, the pre-processing and post-processing may be implemented as a Python service, which also communicates with the summarization model to get the summaries.

A citation generator generates as many citations for the bullet points as there are matching snippets. The summarization processor further includes a filter that allows for filtering of snippets based on the documents in which the snippets are contained and whether a user is allowed access to those documents.

In one embodiment, a single endpoint accepts the snippets and any metadata and returns the summaries and any citation data that is generated.

The subject matter described herein may include separate endpoints for different content sets or use-cases. For example, in one embodiment, three endpoints are a FAQ module endpoint, an earnings call summary endpoint, and a broker research summary endpoint. The broker research summary endpoint allows for serving summaries separate from the FAQ module questions to support enforcement of real-time user entitlements.

Summaries

The subject matter described herein provides smart summaries to users. Smart summaries may be generated at the document level, at the topic level, at the company level, at the sector level, at the industry level, at the market level, or across any user-defined criteria (e.g., user-defined watchlists, all companies that meet user-defined parameters, etc.). Smart summaries may be generated for any company-issued documents, such as earnings call transcripts, SEC filings (such as 10-Ks and the like), research relating to companies including analyst research and/or notes, news articles, expert interviews, and/or government regulatory documents. The company-issued documents may include public-facing documents, or they may include company proprietary or internal documents that make up part of a company's knowledge base.

The summaries may be based, at least in part, on a pre-defined query or prompt. Additionally or alternatively, summaries may be automatically generated without a user search or query, for example, to extract topics and/or trends from documents in real-time or near real-time. The smart summaries as described herein may be generated "online," which refers to being generated in real-time or near real-time. This allows for responses to relevant user queries as they are presented. The smart summaries may further be generated "offline," which refers to being generated automatically, without the need for a user query. This allows for summaries to be generated for common queries (i.e., FAQs). It further allows for trends and topics to be identified without the user necessarily first knowing what they are looking for.

Regarding earnings call transcripts, smart summaries may be generated for all earnings transcripts for all companies for which transcripts are available. In various embodiments, the transcripts may be pulled directly from the company's website, or they may be pulled from online databases, such as the SEC's document archival system, or they may be pulled from other third-party websites where they are available. The earnings call transcripts may be in the format of a text document. In other embodiments, the earnings call may be in a recorded audio format, and the systems and methods first perform speech recognition and diarization to convert the audio format to a text-based format. The smart summaries may further include a browser extension that allows users to request generation of summaries directly from their web browser.

Regarding company summaries, smart summaries may be generated for all companies of a predefined list or group, for example, in the Russell 1000. In one embodiment, the company summaries may be performed based on document-level summaries.

As an example, new documents may be collected for the top 500 companies (e.g., the S&P 500), and summaries are regenerated for companies with new documents. The number of summaries generated is optimized to streamline FAQ generation. Search queries are pulled from an existing list and run against the search engine to generate document results. Documents returned from the search engine are passed to the snippet ranker to get the best snippets for the search. This can be done in various ways. For example, in one embodiment, a cross-document snippet rank may be run. This returns a more relevant set of snippets across the documents. In one or more embodiment, the snippet ranker may be run for each document individually, returning the top N snippets from the top X documents. This process can be parallelized, which allows for adjusting batch size to optimize latency as much as possible.

Company-level summaries may be triggered to be generated or updated on a periodic or regular basis. They may further be triggered when a new document is added to a document processing queue. Company-level summaries may be generated for each document as they are received and/or ingested, and the industry/market-level summaries may be generated on a different schedule, for example, daily, weekly, monthly, or as set based on a user preference.

Sector summaries include smart summaries across a given industry. They allow for an industry ticker search, an industry map, topics, outlook, positives, and negatives. The sector summaries may provide a summary across any sector or other grouping of companies. The groupings for sectors may be industry-defined, for example, the Global Industry Classification Standard (GICS) classification, or they may be user-defined or selected, for example, a user-defined watchlist or companies that meet a set of user-defined criteria (e.g., all companies with more than 5,000 employees, all companies with a CEO under 40 years old, etc.). The sector summaries may identify positive trends, negative trends, guidance trends, trends across analyst questions, and topics within the sectors.

Group summaries may be generated for a range of use cases that provide insight into a set of summaries that are related, a set of companies that are related, or a set of sets of companies. Group summaries can be an organized set of summaries or a summary of summaries or both. For example, summaries of company earnings calls, analyst expectations for earnings calls and analyst reactions to earnings calls may be grouped. In another example, summaries of earnings transcripts across multiple companies within a specific industry may be generated. Market summaries may be based on industry-level summaries.

Summaries may be generated based on relationships between groups. For example, Group B may consist of the customers of Group A, and a user may want to generate a summarization about how the changes in Group B outlooks will affect the outlooks for Group A. This relies on groups and/or relationships that are defined within the market intelligence platform. Numerous summaries may be generated for each group depending on which relationships they have.

Group summaries are generated from the summaries from individual documents and/or companies. Thus, complete summaries for multiple companies are generated before a complete summary for a peer group/industry is generated.

The smart summaries, regardless of the level of summary they provide, may include "positive," "negative," and "outlook" sections.

Topics

The summaries described herein may be topic-based, in that they are organized around topics or use topics to provide structure for the summaries. Topics allow for content to be extracted from any document or group of documents and provide structure to the summary. Topics may be created and/or tagged at the document, company, industry, or market level. Topics may be run on event transcripts, expert calls, broker research, thought leadership and internal content. Summaries are generated by feeding topics and associated snippets into one or more AI models for summarization at the desired level (e.g., document, company, sector, etc).

The smart topics may be used as a basis for grouping companies, sectors, or trends. The smart topics may further be used as a means for providing structure to smart summaries. A fixed template cannot be defined for all documents the same way it can for earnings calls, for example. Using smart topics enables extraction of the most meaningful content from any document or group of documents and provides useful structure to any summary. One or more AI models are used to identify and generate topics across documents. For example, the AI models may identify that a particular document focuses on two separate concepts: earnings and supply-chain problems. In such a scenario, the models assign an earnings topic and a supply-chain topic to the document or to portions of the document identified as relevant for each of those topics. Then, when a user searches for earnings, the earnings topic may be used to identify that particular document and/or particular sections from that document as relevant to the user's search. Similarly, the topics are used to organize summaries. In such a scenario, the models may generate a first summary that summarizes the document as it relates to earnings and a second summary that summarizes the document as it relates to supply chain. This allows for multiple topic-focused or topic-specific summaries within a single document. Using topics for summaries in this way allows users to avoid needing to go into each document to determine if a given topic is of interest. In another example, topics may be identified in transcripts or earnings calls based on questions asked, which allows for a categorization of commonly asked questions across companies, industries, and/or sectors. Smart topics may be run on event transcripts, stream transcripts, broker research, thought leadership and internal content.

Similarly, the AI models may identify smart topics across a company, an industry or sector. For example, the models may determine that most analysts are currently focusing their discussions on a particular topic, such as commercial real estate. Thus, the models identify the topic of commercial real estate as relevant across the industry. This information and topic may then be used to analyze trends as they relate to commercial real estate in one or more industries.

Topics may be automatically identified and generated offline, and those topics may be updated in real-time or near real-time as additional documents are ingested and/or added to the various document sources. This allows for real-time or near real-time identification of momentum and/or relevance of topics, which may be used to automatically surface trending topics providing insight to users without the users specifically requesting those insights or needing to know what topics they are interested a priori.

The topics and their associated snippets are provided as input to the summarization engine, which generates summaries based on the topics and snippets. The topics allow for the summarization engine to perform aspect-based summarization organized around the topics.

In one embodiment, the market intelligence platform may provide a daily summary (or a summary on another time frame) that is generated based on a user's preferences, recommendations, and/or predicted actions. As the user interacts with the system, the system is configured to learn about the types of information the user is interested in, and when the user is interested in that information.

Integrating Public and Private Clouds

In one or more embodiments, the subject matter described herein may be deployed as a cloud service. The cloud service may be accessible by any outside users (with proper credentials and/or authorization). In one or more embodiments, the subject matter described herein may be deployed in a third party's private cloud as a single-tenancy architecture, for example, a cloud that is hosted and managed by a particular entity. The private cloud integrates with a separate datastore to maintain data integrity between the private cloud and the separate datastore. In these embodiments, the third party's internal content always remains on the private on-premises or cloud servers. Search results from the public cloud are imported into the private cloud, and then used for the summarization on the private cloud. In various embodiments, the document search, summarization, and AI-based conversational user interface is implemented solely on the private cloud to provide additional ways of accessing and interacting with the third-party's proprietary data.

User Interface

In various embodiments, the systems and methods described herein provide a multi-pane user-interface that allows users to drill into relevant content and underlying source documentation for summaries, for example, through citations provided to the underlying source documents, to get a complete view of the relevant information and summaries. Thus, in one or more embodiments, the subject matter described herein maintains an audit trail for the underlying documents that provide the content for the summaries. This audit trail allows the user to access the source documents to confirm the accuracy and/or to dig deeper into the source documents. The components/functionalities listed above work together in an integrated manner to create a data flow that provides valuable insights based on information in document databases that is relevant or responsive to user queries and/or user prompts in a freeform, conversational manner. For example, the search and the chat functionality may be integrated to allow the user to search documents in a natural, conversational-based manner. The search functionality and the summarization functionality are integrated such that the summarization component summarizes the documents found as a result of a user search or in response to a user prompt or question.

Conversational Interactions and Access to Documents

In one embodiment, the subject matter described herein includes an interactive chat-based user interface that provides conversational chat-based interactions and access to documents. The chat-based interactions may generate responses, summaries, and other information from internal content, or they may generate responses, summaries and, other information across external content. The chat-based interactions may use or include the following components: (1) an internal proprietary model (such as a large-language model (LLM)); (2) vector/hybrid search; (3) dialog management; and (4) chat user interface. The chat user interface integrates with the document search. In various embodiments, the responses may be organized by content type. This may be performed using labeling and/or tagging. In various embodiments, the user interface may further include a level that groups the answers by the various databases from which the underlying documents were located. For example, the answers may be grouped by whether they came from third-party analysts, SEC filings, a proprietary database, or the like.

The AI models (e.g., internal proprietary LLMs) may include trained foundation models to support multiple downstream tasks. The dataset for the chat-based interactions may be built on a dataset of existing proprietary documents and information. The AI models (e.g., internal proprietary LLMs) are configured to support the chat-based interactions. The AI models (e.g., internal proprietary LLMs) are further designed to support deployment in a single tenant.

The vector/hybrid search includes a scalable vector search database to support integration of existing proprietary documents and information. The vector/hybrid search is configured to work in conjunction with the document search. Keyword search is combined with vector search to retrieve relevant snippets.

Natural language understanding (NLU) refers to an AI-based approach to understanding the intent and meaning behind human language. In the systems and methods described herein, natural language understanding components are used to understand user intent. The NLU components extract entities (e.g., companies, timeframe) for users' questions or queries. It may perform stopword removal. The vector/hybrid search is integrated into the dialog management to retrieve snippets relevant to user questions.

A natural-language service is used to translate natural language search queries into document search queries. Natural language search provides users the ability to search using everyday language similar to how they normally speak. A natural language question is converted to a search on the back-end using one or more AI models (e.g., LLMs). The one or more AI models understand the intent of the question and formulate a search query based on one or more of company identification, keyword extraction, time frame extraction, industry recognition, region identification, and/or relevance of sources. Follow-up questions or queries from the user are in natural-language format and may be translated to support keyword snippet retrieval.

In one or more embodiments, conversational chat-based interactions are launched from a search performed by the user. In other words, an initial search is performed by the user, and then follow-up interactions based on the search results are performed via chat. Snippets referenced in answers from the chatbot are sourced from the search results list. The full search parameters may be used to retrieve a set of documents for summarization matching the search filters applied.

A chat conversation may include a conversation id, which is a unique id generated by the backend. In one or more embodiments, the conversation id may be the user id plus the timestamp of the conversation. The backend uses the conversation id to store search parameters, documents, and conversation history. A summary field may include a page and sentence id fields to support highlighting.

In various embodiments, after receiving a summary as a result of a search, users may ask one or more freeform follow-up questions. In one embodiment, the conversation is bounded by the active search. In other embodiments, the conversation is not bounded by the active search. In other words, a new conversation may be initiated outside the context of an existing search. An optional message field may be used if freeform text is possible in the response.

In one or more embodiments, historical conversations may be loaded to allow a user to return to previous conversations.

The one or more AI models, such as the LLMs used for summarization, generate output token-by-token. Waiting for the output to complete before sending to the user increases the perceived latency. To avoid this, in one or more embodiments, token streaming for streaming responses via server-sent events may be used. Pending requests may be canceled. In the context of live search summarization, users are likely to quickly iterate on a search by changing keywords, filters, etc. By canceling a pending request, the load on later services, such as snippet retrieval and LLM summarization, is reduced. Similarly, a timer or delay may be used before requesting live search summarization.

The systems described herein may include feature-storage or cloud storage for the chat. This allows for conversation history to not be sent with each new chat message. It simplifies the API and reduces request size, and it enables the back-end to store any additional data required, such as documents used in summaries. In one or more embodiments, the stored conversation history is provided as a dataset for analysis and/or summarization. Conversation threads may be stored so that they can be provided to the user. Feature storage supports fetching the most recent conversations for a user. Users may return to conversations, for example, conversations in which they asked follow-up questions.

One or more database layers may be used for implementing the search, summarization, and user interfaces described herein. The database layer includes, for example, a company table, a peer group table, an industry table, a meta group table, a company-to-peer group table (i.e., many-to-one) used for looking up which peer group a company belongs to or which companies are in a peer group, a peer group-to-industry table (i.e., many-to-one) used for looking up which industry a peer group belongs to or which peer groups are in an industry, and an industry-to-meta group table (i.e., many-to-one) for looking up which meta group an industry belongs to or which industries are in a meta group. The industry-to-meta group table may not be needed because all industries are wrapped up into a single market overview, rather than having separated groups of industries.

FIG. 11 depicts a group summarization process flow for regularly updated company summaries. Referring to FIG. 11, the summary-generation workflow 1100 is orchestrated to identify when summaries have been generated for all of the summaries in one or more groups that are needed. This may include a database layer that stores the status of a given job that is updated as different pieces finish.

Triggers may be used for summarization jobs. For example, event listeners listen for new jobs that need to be created. These new jobs are used to initiate the company-level summaries that need to be generated, along with an entry in orchestration database 1128. The summaries report their completion back through another type of event, and those events check to determine whether all the individual company summaries have been generated. If all the individual company summaries have been generated, the summary job for the group/group of groups summaries is initiated. An event for errors that fire and for the group summarization being finished is included to update the orchestration database, so that the error and/or timeout rates of the jobs can be tracked, as well as identifying which jobs had issues.

Event generators are used to initiate the jobs and to report completion of those jobs. For those that are scheduled to be daily/weekly, a cron job may be used, and generators are used to fire off events to kick off these jobs, as shown with group summary cronjob fired 1102. For those that need to be updated every time a company has a new summary generated or an old summary updated, a generator is added to kick off the job, as shown with new document summary generated 1104.

An optional parameter may be added to the summary generator and the summary processor to make sure that the id of the group summary that is being run can be tracked so it can report back and update the incremental success or failure as needed.

Summaries are generated initially, and the group summaries are generated by providing the generated document summaries as inputs to the group-level summarization. The same applies for group of groups summaries (or meta-group summaries).

The NewGroupSummaryEvent 1106 is fired when a new group summarization needs to be kicked off. The caller provides the necessary information to indicate which groups need to be run (and by extension, which companies). The event inserts a record into the orchestration database 1128, which includes the meta-group summarization id if it is started by that event. This may be used to kick off the document/company-level summaries through another set of events, or the existing model may start the summarization process.

One or more NewCompanySummaryEvents 1108, 1110, and 1112 are generated from the NewGroupSummaryEvent 1106. For each NewCompanySummaryEvent that is generated, the company summary generation process is performed, as shown for 1114, 1116, and 1118. The CompanySummaryFinished event 1120, 1122, and/or 1124 fires when the respective company summary process has finished that has a group summary id attached to it. The caller provides the company info and the group summary id that is being run. The event marks the company as completed for that group summary job. Each event may also check the whole job to see if every company that needs to be run for a specific group is finished. If so, it fires a GenerateGroupSummaryEvent 1126.

The GenerateGroupSummaryEvent 1126 fires when all of the summaries for the companies within a group have finished. The event kicks off the summarization process to generate a single summary for the entire group. If there is also a linked meta-group summarization id, the completion updates the orchestration data 1128 to indicate that the group has finished, checks for the completion of other groups, and fires a NewGenerateMetaGroupSummary event (as shown in FIG. 12) if the others have completed.

FIG. 12 depicts a meta group/industry summarization event process flow for the peer-group, industry, and meta-group seven-day trailing digest updates and the earnings season updates. As discussed in the context of FIG. 11, the GenerateMetaGroupSummary event 1224 fires when all of the group summaries have been generated within a meta summarization. The event kicks off the process for the meta summarization generation.

The NewMetaGroupSummaryEvent 1204 is fired when a new meta group summarization needs to be kicked off, for example when a meta group summary cronjob is fired 1202. These are round-up summaries of other group summaries, for example, either read-through summaries or market-level summaries. The event inserts a record into the orchestration database 1226. This event kicks off one or more NewGroupSummaryEvent events 1206, 1208, and 1210 based on the necessary metadata provided by the caller.

One or more NewGroupSummaryEvents 1206, 1208, and 1210 are generated from the NewMetaGroupSummaryEvent 1204. For each NewGroupSummaryEvent that is generated, the group summary generation process is performed, as shown for 1212, 1214, and 1216. The GroupSummaryFin-
ished event 1218, 1220, and/or 1222 fires when the respec-
tive group summarization process has finished. The event
marks the group summarization as completed. It checks
whether that group was part of a meta group summarization
and updates the orchestration metadata accordingly.

A MetaGroupSummaryFinished event fires when the
meta group summarization has finished. It updates the meta
group orchestration metadata.

Entitlements may be handled by generating a single group
summarization for each major broker.

In one or more embodiments, summaries are generated
and then frequently updated. In one or more embodiment,
summaries are generated once and then fully replaced when
new groups/relationships are created.

FIG. 13 depicts a group and meta-group summarization
generation process flow for generating summaries for a
group at a higher level than the company level. This occurs
when other summaries are used to generate the prompt for
the resulting summarization, as opposed to company sum-
maries, which are generated from the search results from the
platform. Referring to FIG. 13, a new group or new meta-
group summary event fires 1302. When a new metagroup
summary event fires, the included meta groups are retrieved
1304. The meta group summaries for the included meta
groups are gathered 1306. The gathered meta group sum-
maries are sent to summary-processor 1310. A prompt is
generated 1308. The generated prompt is sent to an artificial-
intelligence model for summarization 1312. A response to
the prompt is received from the summarization, and citations
for the response are generated 1314. A summary and the
corresponding citations are received and stored in a sum-
mary data store 1318. Upon completion, a summary finished
event fires 1316. When a new group summary event fires,
the included companies are retrieved 1322. The company
summaries for the included companies are gathered 1320.
The gathered company summaries are sent to summary-
processor 1324. A prompt is generated 1326. The generated
prompt is sent to an artificial-intelligence model for sum-
marization 1330. A response to the prompt is received from
the summarization, and citations for the response are gen-
erated 1328. A summary and the corresponding citations are
received and stored in a summary data store 1332. Upon
completion, a summary finished event fires 1334.

FIG. 14 depicts an embodiment of the systems and
methods for providing a user interface for use with a search
engine for searching and summarizing financial related
documents. Referring to FIG. 14, user interface 1402 sends
requests to and receives responses from graphql 1404.
Graphql 1404 sends summary requests and receives sum-
mary responses through summarization API 1406. The sum-
mary responses may be filtered by entitlements, to ensure the
users are received responses that are based on the correct
documents for the particular user.

The summarization API 1406 is a layer that the front-end
connects with to provide summaries to the user interface.
The summarization API 1406 connects to feature storage
1410 to retrieve and return the summaries to the interface
layer. The summarization API 1406 connects to the entitle-
ments service 1408 to filter out bullet points in summaries
that come from documents that are not available for a
specific user. Summaries are loaded into feature storage
1410 from summarization backup 1412 if needed.

To enable this filtering functionality, the generation pro-
cess creates a main citation for the best match, as well as a
citation for each other match for the summary. Thus, a
summary that has no entitled documents may be removed. If the summary includes a citation to a document that the user
is entitled to, then the cited document is updated to that
document, if it is not the primary document from that bullet
point.

The order in which to return the brokers may be deter-
mined using various methods. For example, heuristics may
be used.

FIG. 15 depicts an embodiment of the systems and
methods for providing a user interface for use with a search
engine for searching and summarizing financial related
documents. Referring to FIG. 15, summarization generator
1534 hosts the code that generates the summaries and writes
them to storage. The subject matter described herein
includes a snippet ranking service 1506 or model. The
snippet ranking service 1506 includes APIs to provide the
ranked snippets to the user interface. The summarization
generator is communicatively coupled to the snippet ranking
service 1506.

In one or more embodiments, the summarization genera-
tor includes multiple parts, which are split into separate
repositories to separate the deployment of the cron job from
the queue processor.

One part—the first part—handles summarizing an indi-
vidual document. It listens to document processing queues
to determine when new documents are added to the docu-
ment repository. In this phase, all documents that are not
earnings calls are ignored. For earnings calls, a call to the
snippet ranking service 1506 is made to retrieve the top
snippets from the document, up to a pre-determined limit.
The pre-determined limit may be selected for latency and/or
accuracy reasons. The retrieved snippets are sent with any
other relevant document metadata that is added to the
summarization model. A summarization is returned. The
returned summarization is stored, for example, by docu-
ment-id, in the datastore for retrieval as needed. The data-
store may be a Redis datastore. The summarization may also
be written to a separate datastore as a backup to the primary
datastore. Backfill of this data may be needed, so a job may
be created to fill the IDs needed in a backfill queue.

The snippets and summaries may need to be fetched for
each of the different questions that are being answered
during this process. They may all be stored together and
pieced apart at retrieval time as necessary, or they may be
returned to the front-end all together.

Another part—the second part—is a document processing
queue for broker research documents only from bulge
bracket brokers and/or major brokers for documents tagged
with upgrade/downgrade. This document processing queue
functions in much the same way as the earnings call pro-
cessing queue, with different questions being answered by
the summaries. One difference is the way the API handles
and serves these summaries, as some need to be filtered
since different users have access to different brokers.

In one or more embodiments, all of the different broker
research document summaries are stored within the same
object and then filtered at the API level, if necessary. This
allows for batch returns to be added to the front-end more
easily, as only one document needs to be retrieved, and
irrelevant information can be dropped to minimize the
response size to the client. For example, the object may be
organized as a dictionary of broker→question→summary.

Another part—the third part—provides generation of the
summaries of the FAQs that are multi-document summaries.
This third part may include two phases. First, the summa-
rization runs on a cron job to get it running initially. It runs
a search query for each of the multi-document queries for
each company. For example, it may be run on each of the 500 companies in the S&P 500. Second, the documents returned for each search for each company may be cached, and these documents can then be compared against the documents returned from the searches to prevent generation of new summaries where they are not needed.

In one embodiment, separate queries may be avoided by connecting to an alerts system, adding saved searches for each of the multi-doc summary searches for each company. A queue of queries may be populated that need to be run to confirm that new documents are available, as there still needs to be a comparison against the cache to confirm that new documents are appearing in the document set in the search that is used to generate queries. The alerts system 1530 identifies when a new relevant document is received or ingested, and the alerts system may cause notifications to be sent to the user identifying relevant information from the newly received or ingested document.

FIG. 16 depicts a block diagram of an embodiment of the systems and methods for providing a user interface for use with a search engine for searching and summarizing financial related documents. Referring to FIG. 16, server 1602 performs document search 1604 (as described herein), snippet ranking 1606 (as described herein), offline generation 1608 for summarization, summarization model 1610, which may be, for example, an LLM, and/or summarization pre-processing and summarization post-processing 1612. Remote computer 1616 communicates with server 1602 via one or more APIs. Remote computer 1616 generates one or more multi-paned user interface 1618 for displaying results from server 1602, as well as chat-based user interface 1620 for allowing the user to interact with server 1602 using conversational prompts.

FIG. 17A depicts a block diagram of a first embodiment of the systems and methods for providing a user interface for use with a search engine for searching and summarizing financial related documents in which a federated private cloud is used. Referring to FIG. 17A, public cloud server 1702 is separate from private cloud server 1710. Public cloud server 1702 provides document search 1704 (as described herein) and snippet ranking 1706 (as described herein). The documents and/or metadata for public cloud server 1702 are stored, for example, in feature storage datastore 1708. Private cloud server 1710 comprises offline generation 1712, summarization 174, and summarization pre-processing and post-processing 1716. The documents and/or metadata for private cloud server 1710 are stored, for example, in private storage datastore 1718.

FIG. 17B depicts a block diagram of a second embodiment of the systems and methods for providing a user interface for use with a search engine for searching and summarizing financial related documents in which a federate private cloud is used. The architecture shown in FIG. 17B makes the market intelligence platform available in a centralized, secure system that can be deployed within a private third-party cloud infrastructure, such as third-parties with strict data governance and security requirements. The private cloud solution may be deployed in all the three major cloud providers: AWS, GCP, and Azure. This architecture layers the market intelligence platform's search and AI-based capabilities on top of internal, proprietary content using data connectors.

Referring to FIG. 17B, customer private network 1736 includes one or more authorized users who access the network through computing devices 1738. Customer private network 1736 comprises one or more private subnets, such as private subnet A 1748 and private subnet B 1750. Private subnet A 1748 comprises one or more virtual machines, such as Kubernetes pod 1744. Private subnet B 1750 comprises one or more virtual machines, such as Kubernetes pod 1746. Private load balancer 1742 manages the load between private subnet A 1748 and private subnet B 1750. Customer private network 1736 interacts with platform 1720 to provide additional relevant information or documents that are separate from the internal, proprietary documents. Virtual machines 1744 and/or 1746 access platform 1720, which is external to the private network, using mutual authentication transport layer security (mTLS) 1734. Platform 1720 includes, for example, expert calls 1722, broker research 1724, company documents 1726, news 1728, regulatory documents 1730, and intellectual property documents 1732. The internal private content from private subnet A 1748 and/or private subnet B 1750 is provided to routing tale 1756, and then sent to one or more SQL databases 1752 and/or blob storage 1754.

Federated search capabilities are provided through mTLS (mutual authentication Transport Layer Security). The internal content never leaves the private network. An encrypted search request for content on the platform is provided through an allowlisted enterprise gateway, and search results are delivered through a private, secure mTLS network. The traffic that flows through the mTLS connection may be audited by using a proxy or a firewall (e.g., intrusion detection or intrusion prevention system (IDS/IPS)).

As internal content is ingested into the market intelligence platform, the AI model learns from the internal content and brings the domain expertise found in the content to the forefront as insights.

The private cloud described herein may include one or more search and/or management APIs to extend and customize the platform's search capabilities to the third-party's needs. SAML-based SSO integrations provide access to the platform while maintaining control of the third-party's policies. Managing user permissions and content entitlements within the platform is customizable to allow third parties to configure the visibility of documents to the users of the system and mirror the permissions of the third-party's sharing policies.

FIG. 18 depicts a block diagram showing data sources provided to the systems and methods described herein. Referring to FIG. 18, server 1808 is communicatively coupled to remote computer 1810. Server 1808 receives documents from one or more of web sources 1802, data feed 1804, and/or document repositories 1806. Data feed 1804 may be a real-time data feed, such that documents are provided as they are generated. Data feed 1804 may be a near real-time data feed, such that documents are provided promptly after they are generated, but not necessarily in real-time. Data feed 1804 may provide documents on a schedule, for example, multiple times per day, nightly, weekly, or the like.

FIG. 19 depicts an example of a user interface providing earnings summaries according to the subject matter disclosed herein. Referring to FIG. 19, the user interface shows industry map 1910, topics 1920, topic summaries 1930, outlook 1940, positives 1950, and negatives 1960. Industry map 1910 shows a list of companies within a particular industry, in this case Automobile Parts & Components. Topics 1920 shows the most relevant topics for the particular industry. Topic summaries 1930 includes LLM generated summaries relevant to the selected topic shown in topics 1920. As can be seen, the topic summarization includes multiple bullet-point summaries 1932, with one or more citations 1934 (e.g., "1", "2", "3", "4", and "5") that link to the underlying documents from which the topic summaries 1932 were generated. Clicking on any of the citations 1934 take the user to the underlying citation document. As can be further seen from topic summaries 1930, the summaries shown are based on management statements, for example, from an earnings call transcript. Outlook 1940 shows LLM-generated summaries that relate to outlook for the selected industry. Each of the outlook summaries 1942 includes one or more citations 1944 that link to the underlying source documents. Similarly, the positives 1950 and negatives 1960 each show LLM-generated summaries that relate to positive or negative sentiment, respectively, for the industry. Each of the positive summaries 1950 and negative summaries 1960 include one or more citations 1954 and 1964, respectively, that link to the underlying source documents.

FIG. 20 depicts an example of a user interface providing earnings summaries according to the subject matter disclosed herein. FIG. 20 is similar to FIG. 19, except that the topic summaries 2030 shown are based on Analyst Q&A transcripts, as opposed to management statements (shown in box 1930 of FIG. 19). As can be seen, the topic summaries 2030 include summaries of Questions and corresponding Answers from the earnings call transcript. In one or more embodiments, the subject matter described herein identifies the questions and corresponding answers as part of the document analysis. Each summary 2032 includes one or more citations 2034 that link to the underlying source documents. This identification of questions and corresponding answers may be performed across all transcripts. In one or more embodiments, commonly asked questions across all transcripts for a particular company or industry are identified. Doing so allows the market intelligence platform to surface questions that a user should be asking because other interested parties are asking those questions.

FIG. 21 depicts an example of a user interface providing earnings summaries according to the subject matter disclosed herein. FIG. 21 is similar to FIG. 20, except that the topics shown (e.g., pricing strategy, cost reductions, sales, production, margins, pricing, and value impact) are topics associated with a selected company from the industry map 1910, as opposed to topics associated with the industry (shown in FIG. 20). As can be seen, the topic summaries 2130 include summaries 2132 of Analyst Q&A from the earnings call transcript relevant to the selected topic, including citations 2134. In one or more embodiments, the subject matter described herein identifies the questions and corresponding answers as part of the document analysis. Each summary 2032 includes one or more citations 2034 that link to the underlying source documents.

FIG. 22 depicts an example of a user interface providing topic summaries according to the subject matter disclosed herein. The user interface shown in FIG. 22 shows a multi-pane view with topic summaries 1930 in the left column. The topic summaries 1930 are the same as (or similar to) the topic summaries shown in FIG. 19. The middle column shows summary citations 1970 for the user-selected topic summarization from the left column. The citations from the topic summaries 1930 correspond to underlying source documents. The summary citations pane 1970 shows each of the underlying source documents from the citations corresponding to the user-selected topic summarization. In summary citation pane 1970, each of the underlying source documents is displayed with one or more relevant snippets of text from within the document that was used for generating the selected topic summary. The right-hand pane 1980 of FIG. 22 shows a more complete view of the user-selected underlying source document from summary citation pane 1970. In document pane 1980, the user-selected snippet 1972 shown in summary citation pane 1970 is highlighted or displayed differently in document pane 1980 to show where within the source document the snippet is found.

FIG. 23 depicts an example of a user interface providing sector summaries according to the subject matter disclosed herein. The user interface provides, in the embodiment shown, a grid-based layout that displays summaries for one or more sectors per topic. The topics pane 2310 on the user interface shown in FIG. 23 shows the topics from topics pane 1920 from FIG. 19. The remaining panes 2340, 2360, and 2380 shown in FIG. 23 show topics summaries 2342, 2346 for comparative sectors (e.g., auto manufacturers 2340, auto parts and components 2360, and semiconductor industry 2380), broken down by topic (e.g., China market 2312, motion 2314, price reduction 2316, EV batteries 2318, claims processing cost 2320, and interest rate hike 2322), again with citation boxes 2344 and 2348 to underlying source documents.

FIG. 24 depicts an example of a multi-pane user interface showing search summaries according to the subject matter disclosed herein. As can be seen from FIG. 24, the user has searched for "R&D spend." The search summary pane 2402 shows the AI-generated search summaries, which may be generated as described in detail herein. Each of the two search summaries is based on a particular underlying source document, which are shown in "cited documents" pane 2404 of FIG. 24. The cited documents pane 2404 further shows additional document results that further relate to or support the AI-generated search summarization. Overview pane 2406 displays content from one or more of the cited documents from cited documents pane 2404.

FIG. 25 depicts an example of a multi-pane user interface showing search summaries according to the subject matter disclosed herein. As can be seen in FIG. 25, when the user selects a particular search summarization, the underlying document shown in the search overview pane 2404 is displayed with the relevant snippets of text 2408 and 2410 shown.

FIG. 26 depicts an example of a multi-pane user interface showing search summaries according to the subject matter disclosed herein. As can be seen in FIG. 26, the search summarization pane 2602 includes the interactive chat-based user interface, as described herein. The interactive chat-based user interface allows the user to ask follow-up questions 2606 about the summaries and/or documents shown. The interactive chat-based user interface responds with additional summaries 2608, 2610, and the search results overview pane 2604 is updated to show the documents cited for the chat-based response summaries. Overview pane 2406 displays content from one or more of the cited documents from cited documents pane 2612.

FIG. 27 depicts an example of a multi-pane user interface showing search summaries with an interactive chat-based user interface according to the subject matter disclosed herein. Referring to FIG. 27, filter pane 2702 shows user-selectable filtering that can be performed on the underlying source documents shown in results pane 2704 to guide the results of the search summaries. Summary pane 2706 shows AI-generated summaries 2708, 2712 and the cited documents 2710, 2714, along with the determined most relevant expert calls 2716. The user interface further includes trend charts 2718 showing trends for the relevant documents. User prompt box 2724 allows the user to ask a follow-up question based on the summaries shown in analyst pane 2706.

FIG. 28 depicts an example of a multi-pane user interface showing search summaries with an interactive chat-based user interface according to the subject matter disclosed herein.

FIG. 29 depicts an example of an interactive chat-based user interface according to the subject matter disclosed herein. As shown in FIG. 29, the interface provides an interactive question-and-response format that allows the user to ask natural language questions 2902, and the responses 2904, 2908 are summaries that include citation boxes 2906, 2910 to the underlying source documents. Follow-up question 2912 is provided, and responses 2914, 2918 are additional summaries that include citation boxes 2916, 2920. Citations are shown in citation pane 2924. Further follow-up questions are provided through prompt 2922.

FIG. 30 depicts an example of an interactive chat-based user interface according to the subject matter disclosed herein. As shown in FIG. 30, when a user selects a summary, such as AI-generated summary 2914, a relevant snippet is 3002 is expanded in citation pane 2924.

FIG. 31 depicts an example of an interactive chat-based user interface with citations and document sources according to the subject matter disclosed herein. As shown in FIG. 31, when the user selects a summary, such as summary 2914, from the chat-based user interface shown in FIG. 30, the user interface returns to the multi-pane display that shows the chat pane 3110, the citation pane 3112 showing some relevant snippets from the citation documents, and the selected document with the snippet from summary 2914 highlighted in the overview pane 3114.

As can be seen from the figures described above, in various embodiments, the summaries include a list of citations that indicate the documents from which the summaries were prepared. The documents form which the summaries were prepared includes the identified snippets.

FIG. 32 depicts an example of a chatbot interface according to the subject matter disclosed herein. Referring to FIG. 32, the chatbot interface accepts a user query or prompt for the chat at input box 3202. The prompt may be of a natural-language format. For example, as shown in FIG. 32, the user's entered prompt is "How many cars did Tesla deliver last quarter?" In one embodiment, the chatbot interface may include one or more suggested queries or prompts based on the user's preferences, historical context, or real-time context determined as relevant based on received documents and/or search results. For example, if a merger between Company A and Company B was recently announced, as determined by the system described herein based on searches or received documents, the chatbot interface may include a suggest prompt of "Tell me about the recent merger of Company A and Company B." Thus, even if the user was not previously aware of the merger, the suggested prompt may inform the user that it may be relevant to the user.

FIGS. 33A-33B depict an example of a chatbot interface according to the subject matter disclosed herein. Referring to FIG. 33A, the prompt entered as shown in FIG. 32 is provided at the top of the interface, and the responses are shown below. Section 3304 shows three different answers to the question. Each answer provided includes a cite to the source document from which the answer was generated. In one or more embodiments, each answer is selected by the user, which causes the system to display a user interface that shows the source document so that the user can verify the source of the answer as well as learn additional context. In one or more embodiments, the sentence(s) from which the answer was generated are highlighted or otherwise displayed differently in the displayed source document, as shown in FIG. 33C. Section 3306 shows a conclusion section that summarizes the responses shown in 3304. Referring to FIG. 33B, section 3308 shows related questions to the current question being answered. In one or more embodiments, the related questions may be AI-generated using the LLMs and architecture described herein. Section 3310 shows a user prompt for a follow-up question, which allows the user to continue researching in the same thread. In one or more embodiments, conversations are stored in memory as threaded conversations, which allows the users to return to a particular thread in the future.

Referring to FIG. 33C, the first response in responses section 3304 has been selected by the user, and the system displays a user interface that shows the source document. The portions of the source document that the response was generated from is highlighted. Additionally, in one embodiment, as shown in FIG. 33C, snippets of text from the source document that are determined to be relevant or responsive to the user prompt are displayed and highlighted for case of review.

FIGS. 34A-34B depict an example of a chatbot interface with citations and document sources according to the subject matter disclosed herein. Referring to FIG. 34A, the user's follow-up question from section 3310 of FIG. 33B is shown in section 3502. This is the follow-up prompt for which answers are generated. Section 3404 shows the number of relevant or responsive documents that are being used to generate responses to prompt 3402. The chatbot groups responses by topic, as shown in sections 3406, 3408, and 3410. Referring to FIG. 34B, section 3412 shows related questions to the current question being answered. In one or more embodiments, the related questions may be AI-generated using the LLMs and architecture described herein.

Figure 35A:
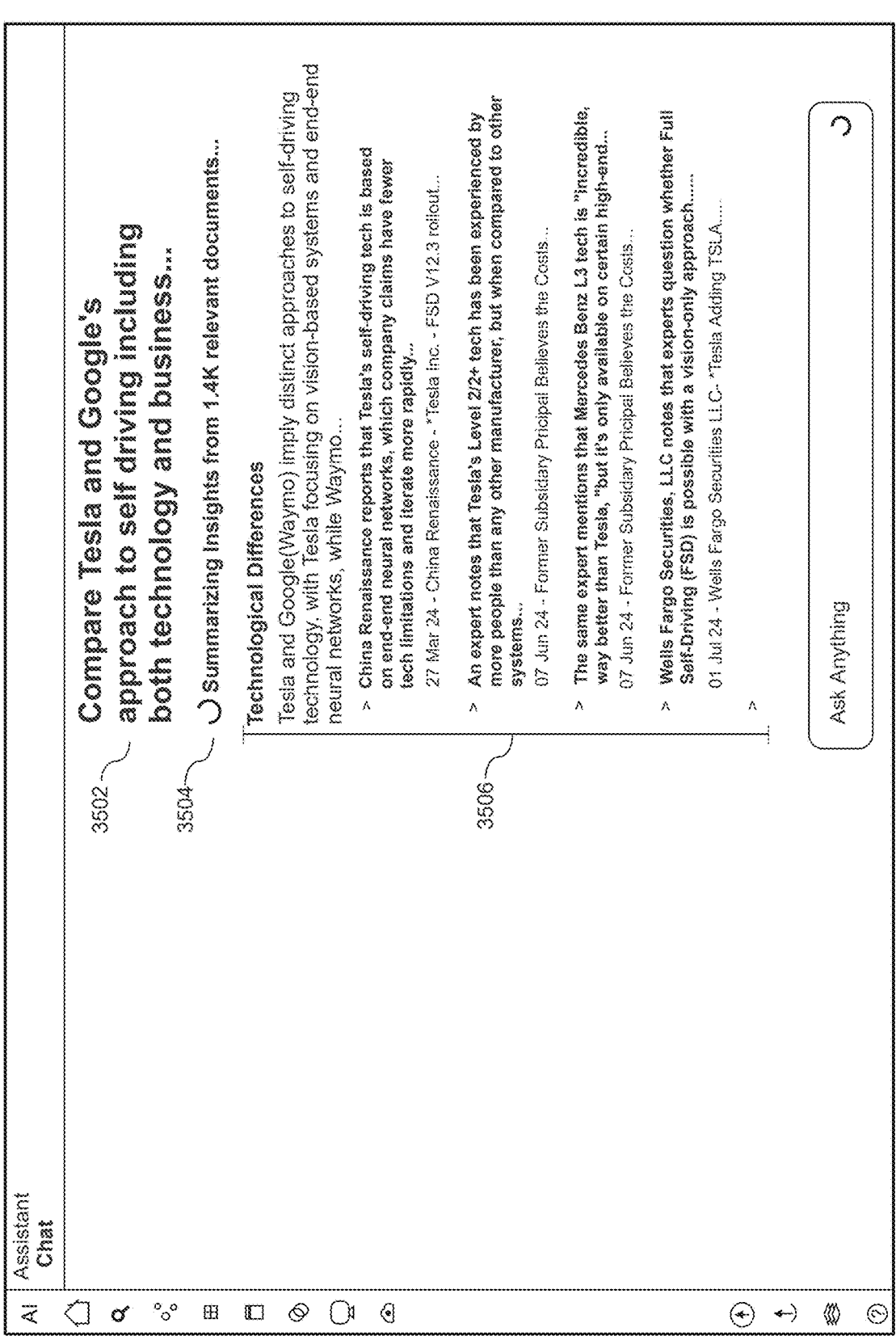
Figure 35B:
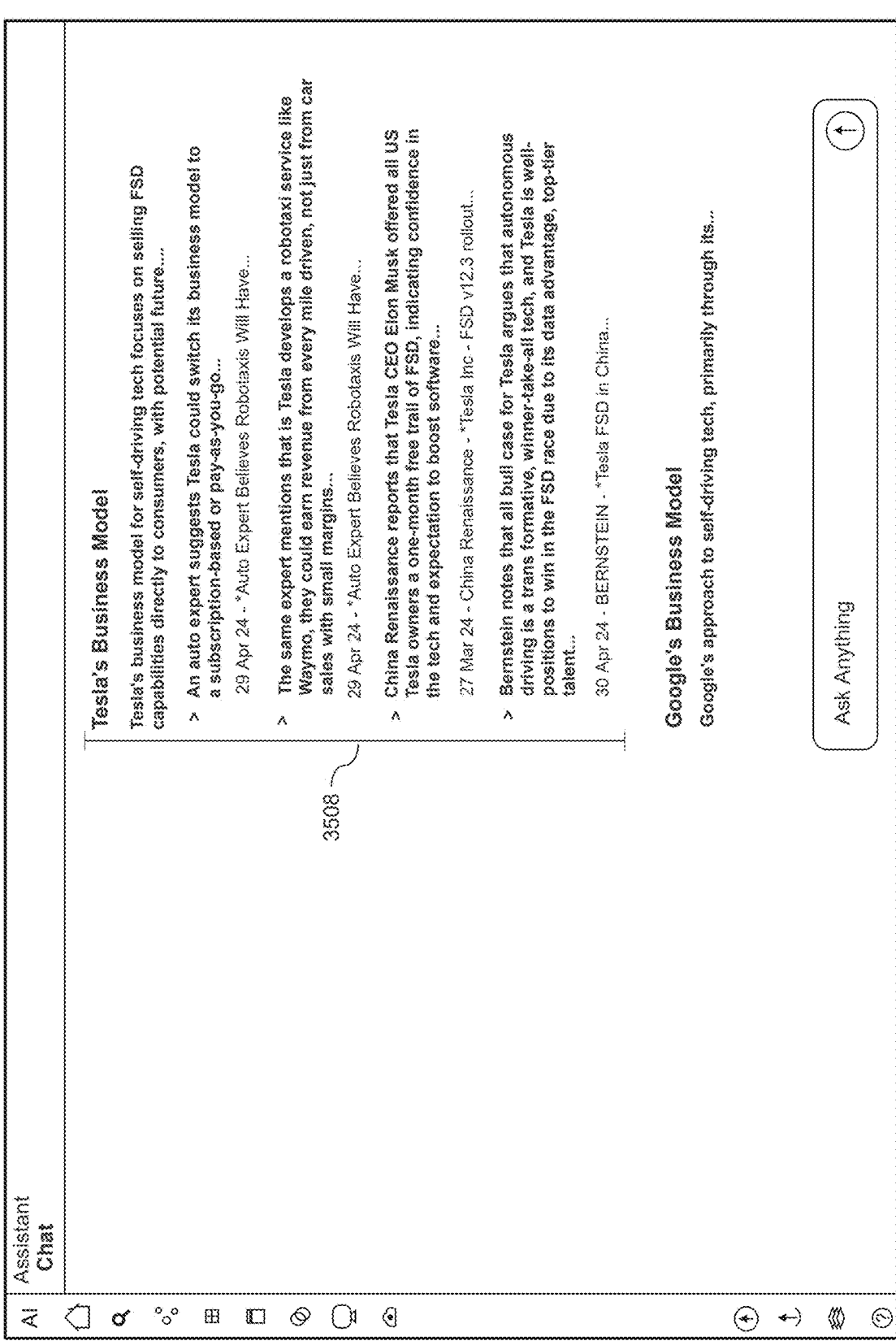
Figure 35C:
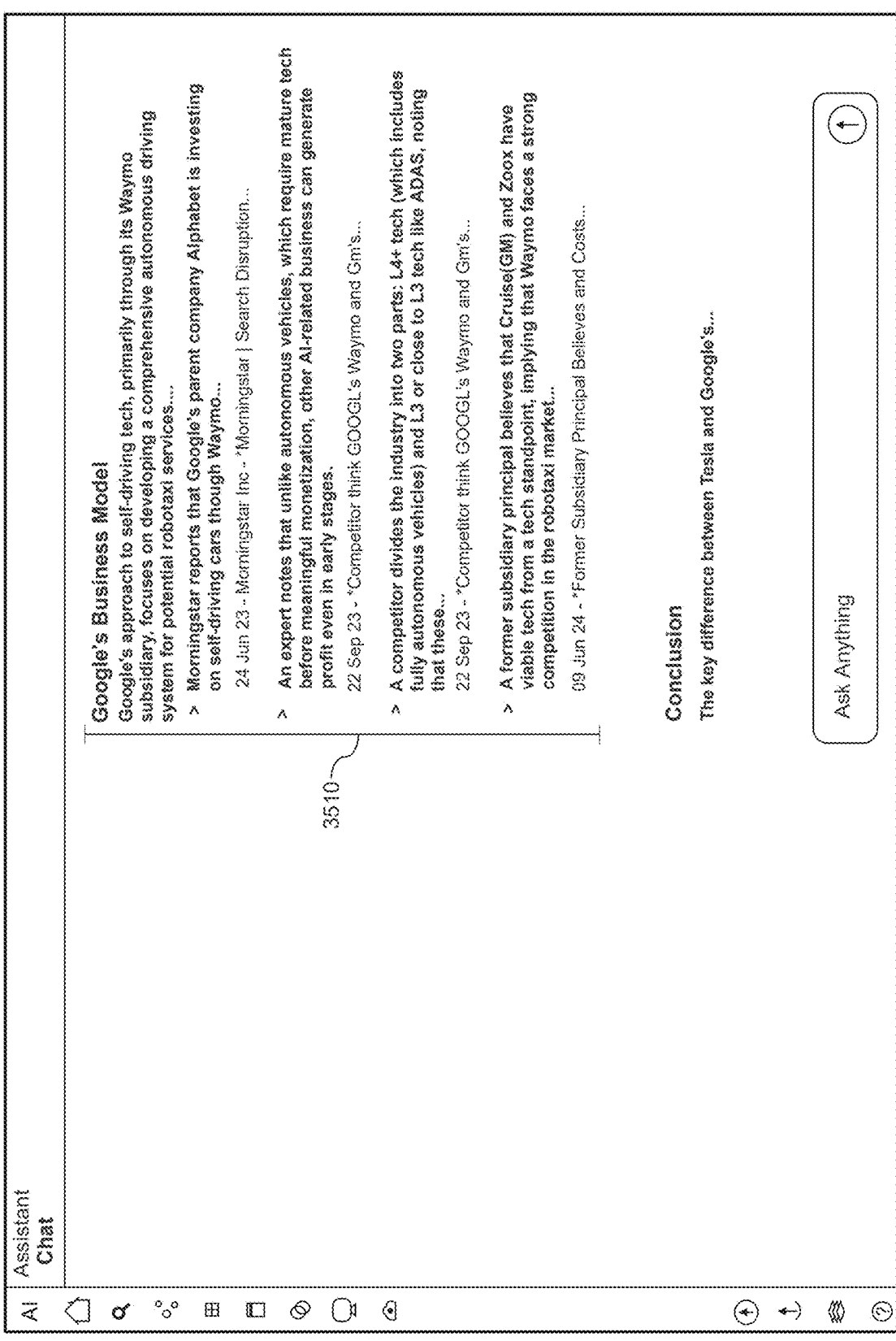
Figure 35D:
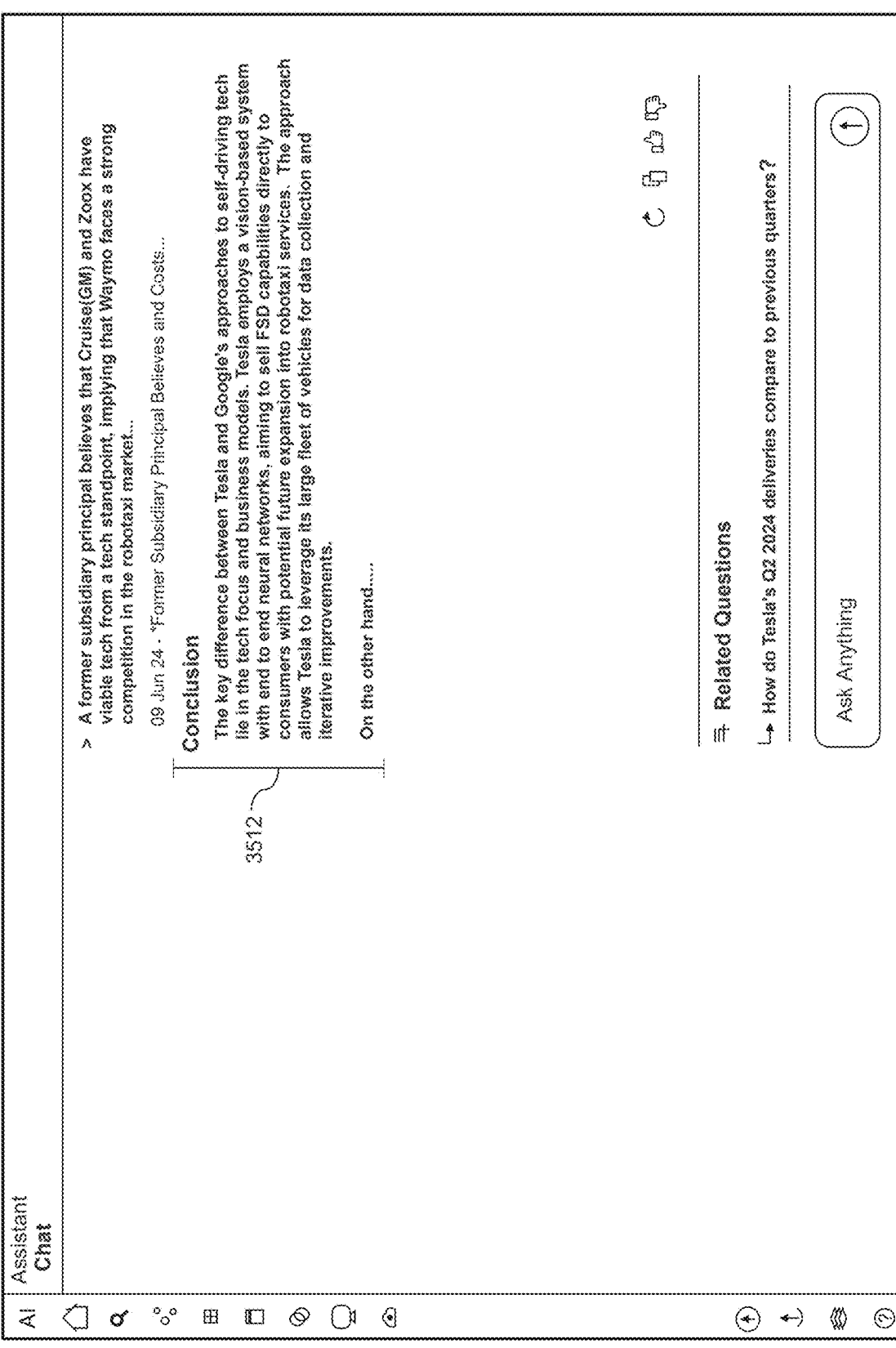

FIGS. 35A-35D depict an example of a chatbot interface performing a comparison across documents according to the subject matter disclosed herein. Referring to FIG. 35A, the user prompt 3502 asks for a comparison between two different companies (e.g., Tesla and Google), across two different types of analysis (e.g., technology and business model). Section 3504 shows the number of relevant or responsive documents that are being used to generate responses to prompt 3502. As shown in FIGS. 35A-35C, the responses are grouped (sections 3506, 3508, and 3510) based on the prompt 3502, with different sections providing responses to different aspects of the prompt 3502. Section 3512 provides a conclusion with an overall summarization of the multiple response sections to the prompt.

FIG. 36A-36C depict an example of a chatbot interface using private enterprise documents according to the subject matter disclosed herein. The subject matter disclosed herein provides AI-generated summaries and responses based on private or proprietary enterprise information. Such enterprise information may include internal thoughts, notes, presentations, analyses, and the like. These documents may be stored within an internal, private data store or behind a firewall. Referring to FIG. 36A, the user prompt 3602 asks for "my team's view." The chatbot system understands that portion 3602 of the prompt to be referring to private documents. The chatbot system interprets the prompt 3602, as shown in section 3604. For example, the system breaks the prompt down into sub-questions. In one or more embodiments, the process of breaking the prompt down into sub-questions is performed by an AI model, such as an LLM. Referring to FIG. 36B, the chatbot generates responses to each of the sub-questions as a separate section, as shown in sections 3606, 3608, and 3610. Each response includes a citation to the source document from which the response was generated. Here, because the question was asked about private internal documents, the citations provided are to private internal documents, rather than external documents.

Referring to FIG. 36C, the second response in responses section 3606 has been selected by the user, and the system displays a user interface that shows the source document, which in this instance is an internal document. The portion of the source document that the response was generated from is highlighted. Additionally, in one embodiment, as shown in FIG. 36C, snippets of text from the source document that are determined to be relevant or responsive to the user prompt are displayed and/or highlighted for ease of review.

FIG. 37A-37C depict an example of a chatbot interface performing a comparison between private enterprise documents and public documents according to the subject matter disclosed herein. Referring to FIG. 37A, the chatbot system interprets the prompt as looking for a comparison between private internal documents (e.g., "my team's research") to external documents (e.g., "expert interviews"). In one or more embodiments, the chatbot system breaks the prompt down into sub-questions. The chatbot system provides responses to each of the sub-questions determined from the prompt. For example, section 3704 provides responses based on private internal documents. Section 3706 provides responses based on expert interviews. Section 3708 provides a comparison between the private documents and the expert interview. Section 3710 provides an overall summary of the responses to the prompt.

The market intelligence platform described herein implements one or more AI-based agents to solve complex repeated workflows. For example, in one or more embodiments, agents are implemented to address monitoring challenges. The agents proactively synthesize relevant information and generate insights from raw data feeds. This can be applied, for example, to portfolio monitoring and/or industry monitoring. In one or more embodiments, agents are implemented to identify read-through insights. Read-through insights are insights that are generated based on distant relationships between seemingly unrelated events occurring.

In the context of artificial-intelligence models, an agent (such as an LLM agent) is a system or application that combines prompting models (such as LLMs) with one or more software tools to create integrations that automate complex knowledge workflows. Agents allow actions and behaviors to be specified using natural-language prompts. A monitoring agent is an AI-powered autonomous application that holds a set of tasks or questions that it seeks to continuously track and answer on behalf of the user. Each task is specified by the choice of data sources, as well as a natural-language prompt describing the task purpose and output format. Each agent may provide a dashboard, which is an interface for the agent. The dashboard reports the latest information for the tasks, summarized in a single feed. It also provides the interface to configure the agent, including managing the tasks and setting email notifications. The agent can push scheduled digests or real-time alerts outside of the platform, for example through email. The user may be able to batch or group multiple tasks into a single notification.

Agents may be further configured for checking, confirming, or verifying accuracy of the output of other models that are used, for example, for summarization, as described herein.

Agents may be configured to perform task decomposition, meaning they take large or complex specifications and break them into sequences of smaller tasks or steps. They combine the use of tools, software applications, and databases to execute multi-step workflows. They provide summarization to synthesize raw data output into actionable insights. They operate autonomously, meaning that they repeatedly or continuously execute steps without user intervention. Additionally, they use memory to "remember" interactions with users and adapt to feedback.

In the context of financial analysis and financial documents, workflows for monitoring incoming documents are characterized by the need to repeatedly run multiple queries to surface new insights. These monitoring workflows are often challenging and time-consuming to execute successfully because they are highly complex. For example, one particularly valuable workflow is to monitor for the appearance of new information, which can be valuable for making trades.

Monitoring agents generate summarized outputs. This allows them to output insights, rather than documents. Monitoring agents as described herein may use smart event triggers, so that real-time tasks are performed when an event happens, rather than only when there is a new document. Many monitoring tasks are to detect when an event has happened in the real world, rather than when there is a new document mentioning an event. Pushing data to users when nothing new has happened wastes valuable time and creates clutter, so monitoring agents as described herein first determine whether an event has occurred before generating a summary. Monitoring agents provide users with a single feed of updates for all agent tasks.

Agents may perform many tasks and therefore return a lot of information, even if summarized. To handle this, monitoring agents provide a cross-task summary, which is an AI-generated summary of all the information across the tasks. The cross-task summary may be presented as a feed in the agent dashboard and/or integrated into email notifications. In one embodiment, monitoring agents are generated from pre-optimized templates. The templates contain a set of pre-optimized tasks and notification settings that can be configured by the user as part of a configuration flow that allows the user to modify tasks, add tasks, and configure notification settings.

FIG. 38A depicts a process flow for creating a workflow agent according to the subject matter disclosed herein. Referring to FIG. 38A, step 3802 includes breaking the workflow into sub-tasks. One or more prompts or search queries may be generated for each of the sub-tasks. At step 3804, each sub-task is configured for execution. For example, a watchlist may be created, search queries may be created and/or optimized, alerts and/or notifications may be configured, a dashboard may be created and/or configured, and new data may be fetched by running searches. At step 3806, each of the sub-tasks is repeatedly performed. These sub-tasks may include, for example, identifying relevant information in new documents, extracting key details from the new documents based on the identified relevant information, and synthesizing the relevant information and/or the key details into actionable insights. At step 3808, the sub-tasks or the queries may be modified to optimize the results, for example, to minimize identification of false positives (e.g., through using NOT operators exclude particular information).

One type of workflow agent is a planning agent. A planning agent is an AI-based tool that classifies a user query and determines if the query should be answered with a single search or broken down into multiple sequential or parallel queries or questions.

FIG. 38B depicts a process flow for a workflow planning agent according to the subject matter disclosed herein. Planning agent 3816 analyzes the user question 3810 to determine whether the user question 3810 can be handled using a single search 3818 or whether it requires additional planning. Straightforward questions that can be answered using a single search can be answered directly, without needing to break it down into simpler questions. Questions that need to be broken down into multiple questions to provide a deep and comprehensive answer require planning. The types of questions that require planning include, for example, "Find me primers for insurance brokerage businesses, and explain what they do, how they operate, and market sizes;" "Bring me last quarter's earnings documents for Ford;" "Which peers have consistently delivered higher year over year Adjusted EPS growth rates than CAG?" "How has our sentiment on BA changed over time?" "How do Goldman and Morgan Stanley differ in their outlook on Spotify, and who is more bullish?" "Compare Google and Meta's capex spend and their investments over time;" "What companies constitute the car wash supply chain?" "What were the biggest M&A deals in pharmaceuticals over the last decade?"

Within the questions that require planning, the planning may be further divided into parallel plans 3820 or sequential plans 3834. Parallel plans may be used for questions with moderate complexity. These questions are broken down into several sub-questions 3822, 3824, 3826 that are asked in parallel, such that each sub-question is formulated independently of the others. The ability to formulate and ask any sub-question does not depend on the answer from other sub-questions. Answers to the respective sub-questions are collected and synthesized at the end. Each of sub-questions 3822, 3824, and 3826 are provided to natural language understanding 3828 to understand the sub-questions. The sub-questions are then provided to RAG 3830 to perform retrieval augmented generation, as discussed herein. The results from RAG 3830 are provided to one or more AI models, such as LLM 3832. The output 3844 from the AI models are provided, and citations 3846 are added.

Sequential plans may be used for questions with high complexity. These questions are broken down into several stages and handled sequentially, meaning that an answer from a previous stage is needed before the question for the next stage can be formulated. Sequential plans are used when multiple tools are used to generate the response. If the user's question is categorized as "no plan" or "parallel plan," then the summarization tool is used to generate the answer. If the user's question is categorized as "advanced plan," one or more of the following tools may be used: summarization, entity extraction, company peers, and/or quantitative extraction. Planning agent 3816 determines a sequential plan 3834, and breaks the question down into one or more sequential questions 3836. The sequential questions 3836 are provided to NLU 3838, RAG 3840, and AI models 3842 sequentially to determine the answer needed at each step. Once this has been performed, if any further parallel planning is required, those responses are provided through parallel plan 3820.

FIG. 38C depicts a process flow for a workflow planning agent according to the subject matter disclosed herein. Referring to FIG. 38C, planning agent 3852 analyzes user question 3850 to determine whether to apply a single search 3854, a parallel plan 3856, or a sequential plan 3858. The determination is then used to provide the user questions to NLU 3860, RAG 3862, and then AI model 3864, to provide output 3866, which includes citations 3868.

Natural-language understanding is used throughout the system described herein. For example, it is used for the initial user prompt as well as the sub-prompts that are generated during planning. The NLU service extracts relevant search parameters to ensure that the most effective queries are run for the search. The search parameters that are extracted include, without limitation, keywords, topics, companies, industries, regions, timeframes, source documents, and/or voices. The source documents may include broker research, company documents, expert insights, news, regulatory documents/filings, intellectual-property documents/filings, and/or internal content.

One technique for performing AI-based searches includes retrieval augmented generation (RAG). RAG refers to the process of optimizing the output of one or more AI models by referencing an authoritative knowledge base outside of the models' training data sources before generating a response. In the context of RAG, retrieval means the AI model (e.g., LLM) will retrieve top snippets from documents across the entire knowledge base. The number of top snippets that are retrieved may be pre-defined or may be determined dynamically based on the particular search being performed. After retrieving the top relevant snippets across vector and keyword search, a reranking is performed to adjust their rankings, such that the most relevant snippets are prioritized. The re-ranker prioritizes snippets based on one or more of diversity, bad snippet filtering, and enhanced snippet context.

After the collection of snippets has been re-ranked, it passes to the generation stage of RAG. The AI model (e.g., LLM) will take in the re-ranked collection of snippets, and generate an answer to the sub-question. The entire NLU and RAG process is repeated for every sub-question generated by the planning agent until every sub-question has an answer. All the answers to sub-questions are then compiled and a final answer is generated, which is provided to the user as the response. The final answer that is provided includes citations, such that the user can audit any information mentioned by the response.

FIG. 39 depicts examples of templates for creating workflow agents according to the subject matter disclosed herein. Referring to FIG. 39, exemplary templates may include, for example, a custom agent 3902, portfolio monitoring agent 3904, industry monitoring agent 3906, therapeutic area overview agent 3908, expert insights agent 3910, earnings agent 3912, drug or asset monitoring agent 3914, M&A monitoring agent 3916, comps and precedent transactions agent 3918, company fundamentals research agent 3920, peer/competitor monitoring agent 3922, thematic and industry research agent 3924, thematic and topical research agent 3926, medical devices agent 3928, and portfolio fundamentals agent 3930.

FIG. 40A depicts a user interface for managing a workflow agent according to the subject matter disclosed herein. Referring to FIG. 40A, the agent may be configured based on a company universe, prompts, and email alerts. Each agent may include a name, and may be specific to one or more user-selected or user-defined industries. As another example, and as shown in FIG. 40B, the universe of companies may be defined based on existing or newly created watchlists.

FIG. 40C depicts a user interface for managing prompts of a workflow agent according to the subject matter disclosed herein. Referring to FIG. 40C, one or more prompts may be configured for each agent. An example prompt is shown in FIG. 40D. As shown in FIG. 40D, the prompt may be limited to one or more document sources.

FIG. 40E depicts a user interface for managing notifications of a workflow agent according to the subject matter disclosed herein. Referring to FIG. 40E, the notifications for the agent may be configured. Notifications may be email alerts. The notifications may be provided in real-time or near real-time for selected tasks or prompts. The notifications may further be provided as a summary on a schedule, for example, weekdays at 9:00 am. As shown in FIG. 40F, one or more recipients for the notifications may be configured and/or specified.

FIG. 40G depicts an example of a notification from a workflow agent according to the subject matter disclosed herein. Referring to FIG. 40G, an example of an email alert is shown. The email alert includes groups of information, with responses and relevant source documents shown. The source documents in the email alert may be clickable such that when a user selects them, the user is directed into the system to review the documents.

FIGS. 41A-41B depict an example of a user interface dashboard according to the subject matter disclosed herein. Referring to FIG. 41A, the dashboard includes a Price Monitor section 4102, a Trending Transcript Topics section 4104, an Events section 4106, and a New Events section 4108. As shown in FIG. 41A, the New Events section 4108 includes the information provided in the email alert shown in FIG. 40G. Referring to FIG. 41B, the dashboard further includes a Research section 4110, an Expert Insights section 4112, a News section 4114, and an All Documents section 4116.

FIG. 42 depicts an example of a user interface according to the subject matter disclosed herein. Referring to FIG. 42, an exemplary Expert Insights dashboard is shown. The Expert Insights dashboard includes more information from the Expert Insights section 4112 shown in FIG. 41B. For example, when the user selects the Expert Insights dashboard may include one or more AI-generated summaries 4202 for a selected expert transcript.

FIG. 43 depicts an example of a user interface according to the subject matter disclosed herein. Referring to FIG. 43, the user interface provides more detail about the events shown in the new events section 4208.

Interactive Chat-Based User Interface for Market Intelligence

In one embodiment, the system receives a query from the user. The query includes information identifying a company or otherwise about a company. The query further includes identification of one or more sources that the user would like to query. For example, the user may specifically indicate that they would like to query the SEC's archives of filing (e.g., EDGAR). The system generates search results in response to the user query. The search results include documents and snippets of text from within the documents. The system generates a summary of the snippets of text. The summary is different from the source snippets of text. The system causes the summary to be rendered on the screen of a remote computer. The summary contains citations to the source documents. The system receives a follow-up query from the user. For example, the follow-up query may seek further information based on the summary that has been rendered on the screen of the remote computer. The system generates search results in response to both user queries. The search results include documents and snippets of text from within the documents. The system generates a summary of the snippets of text. The summary is different from the source snippets of text. The system causes the summary to be rendered on the screen of the remote computer. The summary contains citations to the source documents. The user may select one or more of the citations from the summary. In response to the user selection of the citation, the system causes the source snippets from the multiple documents to be rendered on the screen of the remote computer. The user may select one or more of the snippets. The system causes the source document of the snippets to be rendered on the remote computer. The snippet is displayed with highlighting or another way of calling them out in the source document.

Earnings Call Summarization

In one or more embodiments, the system processes a plurality of financial documents. The documents may come from one or more document sources, for example the SEC's archives of filings (e.g., EDGAR) and/or publicly available stock market data. As part of processing of the financial documents, the system identifies snippets of text within each document. The snippets may be identified using optical character recognition (OCR), natural-language processing (NLP), artificial intelligence (AI), or the like. The system determines a sentiment associated with the snippets. The sentiment may be positive, negative, or neutral. The system may identify or classify the snippets as various types. For example, the system may identify or classify which of the snippets represent forward-looking guidance. The snippets that represent forward-looking guidance may be identified using NLP techniques, word or synonym similarity and/or proximity, and/or AI. As another example, the system may identify or classify which of the snippets represent questions. The snippets that represent questions may be identified using NLP techniques, word or synonym similarity and/or proximity, punctuation, and/or AI. As another example, the system may identify or classify which of the snippets represent answers. The snippets that represent answers may be identified using NLP techniques, word or synonym similarity and/or proximity, punctuation, and/or AI. The system may further associate identified answers with identified questions. The system identifies topics representing trends across multiple documents. The system generates summaries of snippets for each of the positive-sentiment snippets, negative-sentiment snippets, guidance snippets, question-and-answer snippets, and/or the topics from one or more of the documents. The summaries are different from the source snippets of text. The summaries contain citations to the source documents. The system receives a query from a user. The query includes information identifying a publicly traded company. The system causes the summaries from documents from the identified publicly traded company to be rendered on the remote computer. The system further causes a list of related companies to the identified publicly traded company to be rendered on the remote computer. The list of related companies may include a category representing the list of related companies and the publicly traded company. The user may select one or more of the related companies. In response to the user selection, the system causes summaries from documents from the related companies to be rendered on the remote computer. The user may select one or more categories representing the list of related companies and the identified publicly traded company. The system causes the summaries from multiple documents from the related companies and the identified publicly traded company to be rendered on the remote computer. The user selects a citation. The system causes source snippets from the documents to rendered on the remote computer. The user selects a snippet. The system causes the source document of the snippet to be rendered on the remote computer. The snippet is displayed with highlighting or another way of calling them out in the source document.

Industry Summarization

In one or more embodiments, the system processes a plurality of financial documents from the same industry. The system identifies trends across multiple documents. The system generates summaries of snippets for each topic from the multiple documents. The summaries are different from the source snippets of text. The summaries contain citations to the source documents. The system receives a query from a user at a remote computer. The query includes an identification of an industry. The system causes the summaries from the multiple documents from the industry to be rendered on the remote computer. The user selects a citation. The system causes source snippets from multiple documents to be rendered on the remote computer. The user selects a snippet. The system causes the source document to be rendered on the remote computer. The snippet is displayed with highlighting or another way of calling them out in the source document. The system causes the list of companies from the industry to be rendered on the remote computer. The user selects a company from the list of companies. The system causes the summaries from the documents from the company to be rendered on the remote computer. The user selects a citation. The system causes source snippets from multiple documents to be rendered on the remote computer. The user selects a snippet. The system causes the source document to be rendered on the remote computer. The snippet is displayed with highlighting or another way of calling them out in the source document.

Accuracy Validation

In one or more embodiments, the system processes a plurality of financial documents. The system extracts financial information from the documents. The extracted financial information may include KPIs, values, companies, segments, and/or timeframes. The extracted financial information is stored in a database. The system processes a plurality of financial documents. The system generates summaries of the financial documents. The summaries contain financial information. The system performs a validation step. The validation step includes comparing the financial information in the summary to the financial information in the database. The summary is regenerated if the financial information does not match.

Comparison Between Companies

In one or more embodiments, the system processes a plurality of financial documents. The financial documents are from or relate to at least two different companies. The system receives a query from a user at the remote computer. The query contains an identification of the two different companies. The query contains financial information. The query further provides direction to compare the financial information of the two different companies. The system generates search results in response to the user query. The search results include documents and snippets of text from within the documents. The system generates a summary of the snippets of text, and the summary is different from the source snippets of text. The summary represents a comparison of the financial information between the two companies. The system causes the summary to be rendered on the remote computer. The summary contains citations to the source documents. The user selects a citation. The system causes source snippets from at least one document to be rendered on the remote computer. The user selects a snippet. The system causes the source document to be rendered on the remote computer. The snippet is displayed with highlighting or another way of calling them out in the source document.

Evolution Over Time

In one or more embodiments, the system processes a plurality of financial documents. The financial documents include at least two documents of the same type from or related to the same company. The system receives a query from a user at the remote computer. The query identifies the company. The query contains financial information. The query provides direction to compare the financial information over time. The system generates search results in response to the user query. The search results include documents and snippets of text from within the documents. The system generates a summary of the snippets of text, and the summary is different from the source snippets of text. The summary represents the evolution of the financial information of the company over time. The system causes the summary to be rendered on the screen. The summary contains citations to the source documents. The user selects a citation. The system causes source snippets from at least one document to be rendered on the remote computer. The user selects a snippet. The system causes the source documents to be rendered at the remote computer. The snippet is displayed with highlighting or another way of calling them out in the source document.

Aspects of the present disclosure may take the form of an entirely hardware embodiment, an entirely software embodiment as a programmatic method (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including the Julia scientific computing language or an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These non-transitory computer program instructions may also be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiments were chosen and described in order to best explain the principles of the present disclosure and the practical application, and to enable others of ordinary skill in the art to understand the present disclosure for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The subject matter described herein may include the use of machine learning performed by at least one processor of a computing device and stored as non-transitory computer executable instructions (software or source code) embodied on a non-transitory computer-readable medium (memory). Machine learning (ML) is the use of computer algorithms that can improve automatically through experience and by the use of data. Machine learning algorithms build a model based on sample data, known as training data, to make predictions or decisions without being explicitly programmed to do so. Machine learning algorithms are used where it is unfeasible to develop conventional algorithms to perform the needed tasks.

In certain embodiments, instead of or in addition to performing the functions described herein manually, the system may perform some or all of the functions using machine learning or artificial intelligence. Thus, in certain embodiments, machine learning-enabled software relies on unsupervised and/or supervised learning processes to perform the functions described herein in place of a human user.

Machine learning may include identifying one or more data sources and extracting data from the identified data sources. Instead of or in addition to transforming the data into a rigid, structured format, machine learning-based software may load the data in an unstructured format and automatically determine relationships between the data. Machine learning-based software may identify relationships between data in an unstructured format, assemble the data into a structured format, evaluate the correctness of the identified relationships and assembled data, and/or provide machine learning functions to a user based on the extracted and loaded data, and/or evaluate the predictive performance of the machine learning functions (e.g., "learn" from the data).

In certain embodiments, machine learning-based software assembles data into an organized format using one or more unsupervised learning techniques. Unsupervised learning techniques can identify relationships between data elements in an unstructured format.

In certain embodiments, machine learning-based software can use the organized data derived from the unsupervised learning techniques in supervised learning methods to respond to analysis requests and to provide machine learning results, such as a classification, a confidence metric, an inferred function, a regression function, an answer, a prediction, a recognized pattern, a rule, a recommendation, or other results. Supervised machine learning, as used herein, comprises one or more modules, computer executable program code, logic hardware, and/or other entities configured to learn from or train on input data, and to apply the learning or training to provide results or analysis for subsequent data.

Machine learning-based software may include a model generator, a training data module, a model processor, a model memory, and a communication device. Machine learning-based software may be configured to create prediction models based on the training data. In some embodiments, machine learning-based software may generate decision trees. For example, machine learning-based software may generate nodes, splits, and branches in a decision tree. Machine learning-based software may also calculate coefficients and hyper parameters of a decision tree based on the training data set. In other embodiments, machine learning-based software may use Bayesian algorithms or clustering algorithms to generate predicting models. In yet other embodiments, machine learning-based software may use association rule mining, artificial neural networks, and/or deep learning algorithms to develop models. In some embodiments, to improve the efficiency of the model generation, machine learning-based software may utilize hardware optimized for machine learning functions, such as an FPGA.

The systems and methods may support different hardware platforms/architectures, may add implementations for new network layers and new hardware platforms/architectures, and may be optimized in terms of processing, memory and/or other hardware resources for a specific hardware platform/architecture being targeted. Examples of platforms are different GPUs (e.g., Nvidia GPUs, ARM Mali GPUS, AMD GPUs, etc.), different forms of CPUs (e.g., Intel Xeon, ARM, TI, etc.), and programmable logic devices, such as Field Programmable Gate Arrays (FPGAs).

Exemplary target platforms include host computers having one or more single core and/or multicore CPUs and one or more Parallel Processing Units (PPUs), such as Graphics Processing Units (GPUs), and embedded systems including single and/or multicore CPUs, microprocessors, Digital Signal Processors (DSPs), and/or Field Programmable Gate Arrays (FPGAs).

The subject matter described herein may be executed using a distributed computing environment. The environment may include client and server devices, interconnected by one or more networks. The distributed computing environment also may include target platforms. The target platform may include a multicore processor. Target platforms may include a host (Central Processing Unit) and a device (Graphics Processing Unit). The servers may include applications or processes accessible by the clients. The devices of the environment may interconnect via wired connections, wireless connections, or a combination of wired and wireless connections.

The servers may include one or more devices capable of receiving, generating, storing, processing, executing, and/or providing information. For example, servers may include a computing device, such as a server, a desktop computer, a laptop computer, a tablet computer, a handheld computer, or a similar device.

The clients may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In one or more embodiments, the clients may download data and/or code from the servers via the network. In some implementations, the clients may be desktop computers, workstations, laptop computers, tablet computers, handheld computers, mobile phones (e.g., smart phones, radiotelephones, etc.), electronic readers, or similar devices. In some implementations, the clients may receive information from and/or transmit information to the servers.

The subject matter described herein and/or one or more of its parts or components may comprise registers and combinational logic configured and arranged to produce sequential logic circuits. In some embodiments, the subject matter described herein may be implemented through one or more software modules or libraries containing program instructions pertaining to the methods described herein, that may be stored in memory and/or on computer readable media, and may be executed by one or more processors. Other computer readable media may also be used to store and execute these program instructions. In alternative embodiments, various combinations of software and hardware, including firmware, may be utilized to implement the present disclosure.

A person having ordinary skill in the art will recognize that the principles described herein may be applied to other physical systems not explicitly described herein, as the model described herein here provides a framework that is not specific to any particular physical system but rather can be used to build surrogates that represent components of any physical system.

The descriptions of the various embodiments of the technology disclosed herein have been presented for purposes of illustration, but these descriptions are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has been with reference to a particular embodiment of the invention, it will be appreciated by those skilled in the art that changes in this embodiment may be made without departing from the principles and spirit of the disclosure, the scope of which is defined by the appended claims.

We claim:

1. A system for using one or more artificial-intelligence models to summarize insights across one or more financial documents, the system comprising:

a memory storing instructions to be executed by one or more hardware processors; and one or more hardware processors configured to execute the instructions stored in the memory, wherein the instructions, when executed by the one or more hardware processors, cause the system to:

receive a first natural-language prompt, wherein the first natural-language prompt is based on input from a user at a remote computing device;

use a workflow agent to generate a plan for responding to the first natural-language prompt, wherein the plan comprises a plurality of sub-tasks for execution to generate a response to the first natural-language prompt;

use a first large-language model ("LLM") on the received first natural-language prompt to generate a plurality of sub-prompts to use to execute the plurality of sub-tasks to generate the response to the first natural-language prompt, wherein each of the sub-prompts corresponds to one or more of the sub-tasks;

execute one or more searches of one or more datastores based on the one or more sub-prompts, wherein each of the one or more searches identifies a respective plurality of relevant documents based on identified snippets of text within each respective relevant document, and wherein the workflow agent determines, based on the first natural-language prompt, whether to use a single search, a parallel plan, or a sequential plan to execute the one or more searches;

use one or more LLMs to generate a response to each of the one or more sub-prompts, wherein each response to the one or more sub-prompts is based on at least some of the respective plurality of relevant documents identified by the search based on the respective sub-prompt; and in response to completion of the plurality of sub-tasks, generate the response to the first natural-language prompt based on the generated responses to the sub-prompts, wherein the response includes at least one LLM-generated summary and one or more citations to the relevant documents used to generate the response.

2. The system of claim 1, wherein the sub-prompts are executed in parallel when it is determined to use the parallel plan, and wherein the responses to the sub-prompts are combined to generate the response to the first natural-language prompt.

3. The system of claim 1, wherein the generated responses to the sub-prompts are combined using a second LLM.

4. The system of claim 1, wherein the sub-prompts are executed sequentially when it is determined to use the sequential plan, such that the generated response to a first sub-prompt is used as an input to generate the response to a second sub-prompt.

5. The system of claim 1, wherein the at least one LLM-generated summary is displayed on a multi-pane user interface.

6. The system of claim 1, wherein the one or more searches include a document search.

7. The system of claim 1, wherein the one or more searches include a vector search.

8. The system of claim 1, wherein the one or more searches include a hybrid search.

9. The system of claim 1, wherein the at least one LLM-generated summary is generated based on one or more topics identified based on the first natural-language prompt.

10. The system of claim 1, wherein the at least one LLM-generated summary is generated based on one or more sectors.

11. The system of claim 1, wherein the one or more data stores are selectable to determine whether a respective data store is included in each of the one or more searches.

12. The system of claim 1, wherein the instructions, when executed by the one or more hardware processors, further cause the system to, based on a selection of one of the citations received from the user identifying a selected relevant document, render on a portion of a user interface one or more of the identified snippets of text associated with the selected relevant document.

13. A method for using one or more artificial-intelligence models to summarize insights across one or more financial documents, the method comprising:

receiving a first natural-language prompt, wherein the first natural-language prompt is based on input from a user at a remote computing device;

using a workflow agent to generate a plan for responding to the first natural-language prompt, wherein the plan comprises a plurality of sub-tasks for execution to generate a response to the first natural-language prompt;

using a first large-language model ("LLM") on the received first natural-language prompt to generate a plurality of sub-prompts to use to execute the plurality of sub-tasks to generate the response to the first natural-language prompt, wherein each of the sub-prompts corresponds to one or more of the sub-tasks;

executing one or more searches of one or more datastores based on the one or more sub-prompts, wherein each of the one or more searches identifies a respective plurality of relevant documents based on identified snippets of text within each respective relevant document, and wherein the workflow agent determines, based on the first natural-language prompt, whether to use a single search, a parallel plan, or a sequential plan to execute the one or more searches;

using one or more LLMs to generate a response to each of the one or more sub-prompts, wherein each response to the one or more sub-prompts is based on at least some of the respective plurality of relevant documents identified by the search based on the respective sub-prompt; and in response to completion of the plurality of sub-tasks, generating the response to the first natural-language prompt based on the generated responses to the sub-prompts, wherein the response includes at least one LLM-generated summary and one or more citations to the relevant documents used to generate the response.

14. The method of claim 13, wherein the sub-prompts are executed in parallel when it is determined to use the parallel plan, and wherein the responses to the sub-prompts are combined to generate the response to the first natural-language prompt.

15. The method of claim 13, wherein the generated responses to the sub-prompts are combined using a second LLM.

16. The method of claim 13, wherein the sub-prompts are executed sequentially when it is determined to use the sequential plan, such that the generated response to a first sub-prompt is used as an input to generate the response to a second sub-prompt.

17. The method of claim 13, wherein the at least one LLM-generated summary is displayed on a multi-pane user interface.

18. The method of claim 13, further comprising, based on a selection of one of the citations received from the user identifying a selected relevant document, rendering on a portion of a user interface one or more of the identified snippets of text associated with the selected relevant document.

\* \* \* \* \*